(12) United States Patent
Park et al.

(10) Patent No.: US 12,007,621 B2
(45) Date of Patent: Jun. 11, 2024

(54) LENS DRIVING DEVICE, AND CAMERA MODULE AND OPTICAL DEVICE INCLUDING SAME LENS

(71) Applicant: LG INNOTEK CO., LTD., Seoul (KR)

(72) Inventors: Sang Ok Park, Seoul (KR); Seong Min Lee, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 664 days.

(21) Appl. No.: 17/269,437

(22) PCT Filed: Aug. 29, 2019

(86) PCT No.: PCT/KR2019/011065
§ 371 (c)(1),
(2) Date: Feb. 18, 2021

(87) PCT Pub. No.: WO2020/046008
PCT Pub. Date: Mar. 5, 2020

(65) Prior Publication Data
US 2021/0181459 A1    Jun. 17, 2021

(30) Foreign Application Priority Data

Aug. 31, 2018 (KR) .......... 10-2018-0103661
Sep. 6, 2018 (KR) .......... 10-2018-0106306

(51) Int. Cl.
G02B 7/105     (2021.01)
G02B 7/02      (2021.01)
(Continued)

(52) U.S. Cl.
CPC ............ *G02B 7/105* (2013.01); *G02B 7/023* (2013.01); *G02B 7/09* (2013.01); *G03B 17/12* (2013.01);
(Continued)

(58) Field of Classification Search
None
See application file for complete search history.

(56) References Cited

FOREIGN PATENT DOCUMENTS

| CN | 105988262 A | 10/2016 |
|---|---|---|
| CN | 106101494 A | 11/2016 |

(Continued)

OTHER PUBLICATIONS

English translation of WO-2018062810-A1, Park, Apr. 2018 (Year: 2018).*

(Continued)

*Primary Examiner* — James M Hannett
(74) *Attorney, Agent, or Firm* — Saliwanchik, Lloyd & Eisenschenk

(57) ABSTRACT

One embodiment comprises: a housing; a bobbin arranged in the housing; a coil arranged in the bobbin; a first magnet arranged at a first lateral part of the housing; a second magnet arranged at a second lateral part of the housing facing the first lateral part of the housing; a circuit board arranged at a third lateral part of the housing; a location sensor which is arranged at the third lateral part of the housing and which is electrically connected with the circuit board; and a first capacitor arranged at a first corner part of the housing, which is arranged between the third lateral part of the housing and the second lateral part of the housing, and electrically connected with the circuit board.

20 Claims, 26 Drawing Sheets

(51) Int. Cl.
- *G02B 7/09* (2021.01)
- *G03B 17/12* (2021.01)
- *H02K 11/215* (2016.01)
- *H02K 41/035* (2006.01)
- *H04N 23/51* (2023.01)
- *H04N 23/54* (2023.01)
- *H04N 23/57* (2023.01)
- *H04N 23/65* (2023.01)

(52) U.S. Cl.
CPC ....... *H02K 11/215* (2016.01); *H02K 41/0356* (2013.01); *H04N 23/51* (2023.01); *H04N 23/54* (2023.01); *H04N 23/57* (2023.01); *H04N 23/65* (2023.01)

(56) References Cited

FOREIGN PATENT DOCUMENTS

| | | | |
|---|---|---|---|
| CN | 106575025 A | 4/2017 | |
| CN | 108027491 A | 5/2018 | |
| CN | 108292022 A | 7/2018 | |
| EP | 3 070 514 A1 | 9/2016 | |
| EP | 3070514 A1 * | 9/2016 | ........... G02B 27/646 |
| JP | 2008-51927 A | 3/2008 | |
| JP | 2015-121819 A | 7/2015 | |
| KR | 10-2016-0017910 A | 2/2016 | |
| KR | 10-2016-0045382 A | 4/2016 | |
| KR | 20180036316 A * | 9/2016 | |
| KR | 10-2016-0139589 A | 12/2016 | |
| KR | 10-2017-0023884 A | 3/2017 | |
| KR | 10-2017-0050946 A | 5/2017 | |
| KR | 10-2017-0053274 A | 5/2017 | |
| KR | 10-2017-0056387 A | 5/2017 | |
| KR | 10-2018-0007462 A | 1/2018 | |
| KR | 10-2018-0028586 A | 3/2018 | |
| KR | 10-2018-0036316 A | 4/2018 | |
| KR | 10-2018-0061108 A | 6/2018 | |
| KR | 10-0867421 B1 | 11/2018 | |
| WO | 2017/078328 A1 | 5/2017 | |
| WO | WO-2018062810 A1 * | 4/2018 | ........... G02B 27/646 |

OTHER PUBLICATIONS

English translation of KR 20180036316 A, Park S, Sep. 2016 (Year: 2016).*
English translation of EP 3070514 A1, Han J, Sep. 2016 (Year: 2016).*
Office Action dated Jul. 20, 2022 in Korean Application No. 10-2018-0106306.
Office Action dated Dec. 14, 2022 in Korean Application No. 10-2018-0103661.
International Search Report dated Dec. 6, 2019 in International Application No. PCT/KR2019/011065.
Supplementary European Search Report dated May 2, 2022 in European Application No. 19854034.6.
Office Action dated Nov. 3, 2022 in Chinese Application No. 201980067522.4.

* cited by examiner

LENS DRIVING DEVICE, AND CAMERA MODULE AND OPTICAL DEVICE INCLUDING SAME LENS

CROSS-REFERENCE TO RELATED APPLICATIONS

This application is the U.S. national stage application of International Patent Application No. PCT/KR2019/011065, filed Aug. 29, 2019, which claims the benefit under 35 U.S.C. § 119 of Korean Application Nos. 10-2018-0103661, filed Aug. 31, 2018, and 10-2018-0106306, filed Sep. 6, 2018, the disclosures of each of which are incorporated herein by reference in their entirety.

TECHNICAL FIELD

Embodiments relate to a lens moving apparatus and a camera module and an optical device each including the same.

BACKGROUND ART

It is difficult to apply technology of a voice coil motor (VCM) used in existing general camera modules to a sub-miniature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

Embodiments provide a lens moving apparatus and a camera module and an optical device each including the same, which are capable of allowing a large-diameter lens to be mounted therein without increasing the size thereof, of realizing stable power supply to a position sensor, and of reliably eliminating noise from the output of the position sensor.

Embodiments provide a lens moving apparatus and a camera module and an optical device each including the same, in which an escape groove is formed in the portion of the cover 1100 at which an elastic member is soldered to a circuit board in order to inhibit heat loss.

Furthermore, embodiments provide a lens moving apparatus and a camera module and an optical device each including the same, in which terminals connected to a (+) coil terminal and a (−) coil terminal, in addition to VDD, GND, SDA and SCL, required for drivers are exposed to the outside so as to make it easy to evaluate AF characteristics.

Technical Solution

A lens moving apparatus according to an embodiment includes a housing, a bobbin disposed in the housing, a coil disposed on the bobbin, a first magnet disposed on a first side portion of the housing, a second magnet disposed on a second side portion of the housing, which faces the first side portion of the housing, a circuit board disposed on a third side portion of the housing, a position sensor, which is disposed on the third side portion of the housing and is conductively connected to the circuit board, and a first capacitor, which is disposed on a first corner portion of the housing disposed between the third side portion and the second side portion of the housing and is conductively connected to the circuit board.

The first capacitor may have a thickness greater than a thickness of the position sensor, and the first corner portion of the housing may include a first region, in which the first capacitor is disposed, the first region of the first corner portion having a thickness greater than the thickness of the third side portion of the housing.

The housing may include a first seating portion, which is formed in the third side portion of the housing and in which the position sensor is disposed, and a second seating portion, which is formed in the first corner portion of the housing and in which the first capacitor is disposed, and the first seating portion may have an opening formed through the third side portion of the housing, and the second seating portion is a groove depressed from an outer surface of the first corner portion of the housing.

The lens moving apparatus may further include a sensing magnet disposed on the bobbin so as to face the position sensor, and the circuit board may include first and second terminals, through which a power signal is supplied to the position sensor, a third terminal, through which a data signal is supplied to the position sensor, and a fourth terminal, through which a clock signal is supplied to the position sensor.

The first capacitor may be connected in parallel to the first and second terminals of the circuit board.

The position sensor may include a Hall sensor configured to detect a magnetic field of the sensing magnet and output an output signal, an amplifier configured to amplify the output signal output by the Hall sensor, and an output terminal conductively connected to an output terminal of the amplifier, and the first capacitor may be conductively connected to the output terminal of the position sensor.

The lens moving apparatus may further include a second capacitor, which is disposed on a second corner portion of the housing disposed between the first side portion and the third side portion of the housing and is connected in parallel to the first and second terminals of the circuit board.

The second capacitor may have a thickness greater than a thickness of the position sensor, and the second corner portion of the housing may include a first region, in which the capacitor is disposed, the first region of the second corner portion having a thickness greater than a thickness of the third side portion of the housing.

The circuit board may include a body part disposed on the third side portion of the housing and an extension part extending from the body part to the first corner portion of the housing, and the first capacitor may be disposed in the extension part of the circuit board.

The circuit board may further include fifth and sixth terminals, to which a drive signal for driving the coil is supplied from the position sensor, and the lens moving apparatus may further include a first lower elastic unit, configured to conductively connect one end of the coil to the fifth terminal of the circuit board, and a second lower elastic unit, configured to conductively connect a remaining end of the coil to the sixth terminal of the circuit board.

Advantageous Effects

Embodiments enable a large-diameter lens to be mounted therein without increasing the size thereof, realize stable power supply to a position sensor, and reliably eliminate noise from the output of the position sensor.

According to embodiments, even when soldering between a circuit board and an elastic member is performed using hot air, heat loss through a cover is minimized, thereby inhibiting a cold solder phenomenon.

Furthermore, by virtue of the escaping structure of the cover, there is an advantage in that a sealing operation between the cover and the circuit board is facilitated.

In addition, since additional terminals connected to a coil are exposed to the outside, it is possible to determine drive characteristics in CLAF and OLAF.

Furthermore, since a photo solder resist is used in the remaining region of the surface of the circuit board excluding terminals so as to reduce the tolerance, it is possible to minimize a phenomenon in which a Hall sensor is displaced and pushed after surface-mounting technology (SMT) is performed thereon.

BEST MODE

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

The "auto-focusing function" serves to automatically focus an image of a subject on the surface of an image sensor. The lens moving apparatus according to an embodiment may move an optical module, which is constituted of at least one lens, in the first direction, so as to perform auto-focusing.

In the follow description, the "terminal" may be alternatively referred to as a "pad", "electrode", "conductive layer" or "bonding portion".

Figure 1:
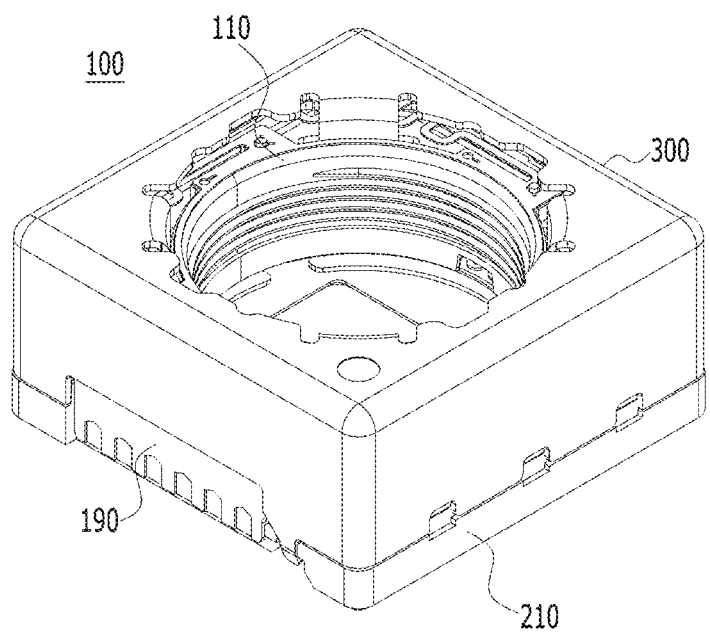
FIG. 1 is a perspective view of a lens moving apparatus according to an embodiment.
Figure 2:
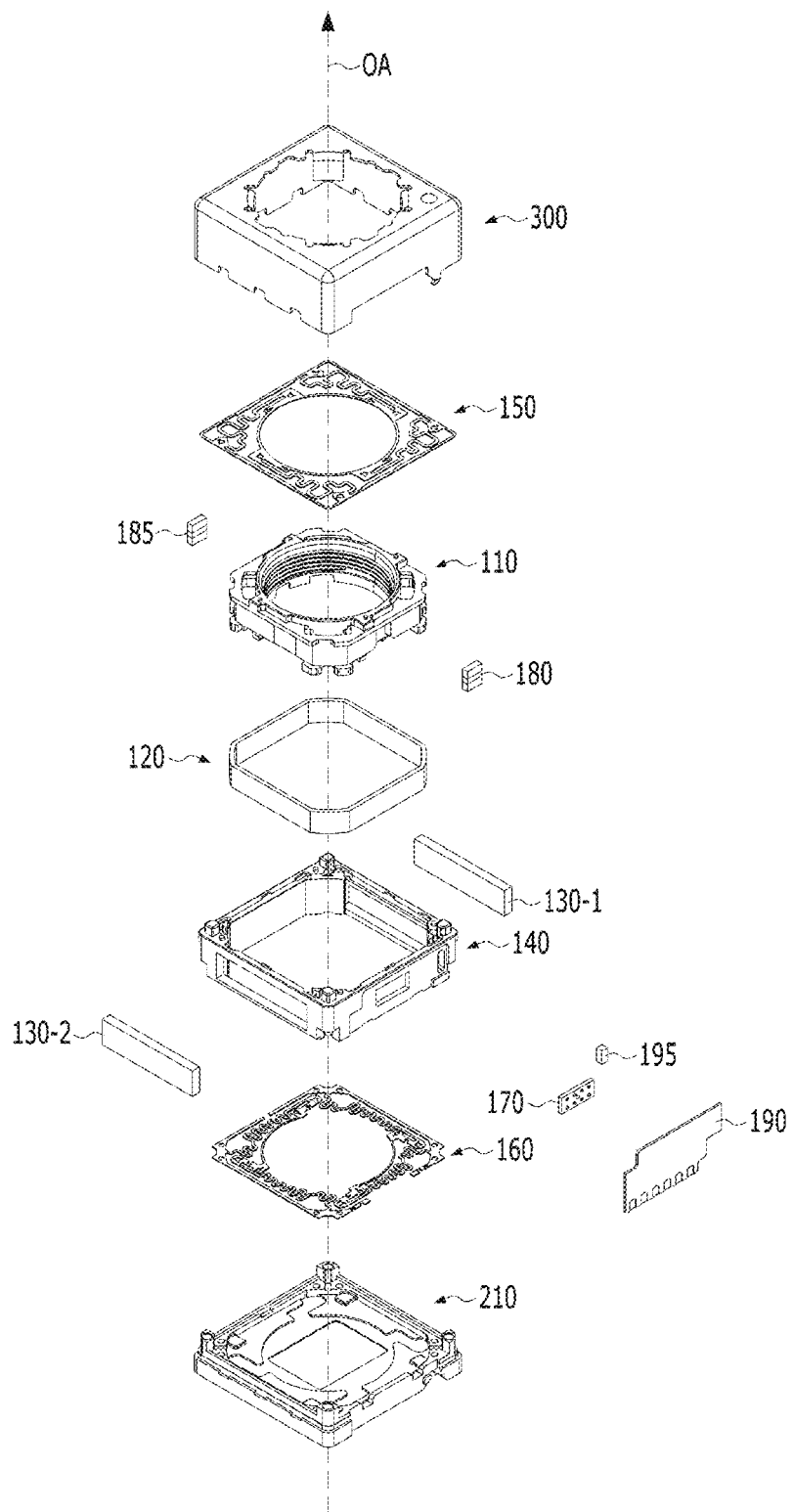
FIG. 2 is an exploded view of the lens moving apparatus shown in FIG. 1.
Figure 3:
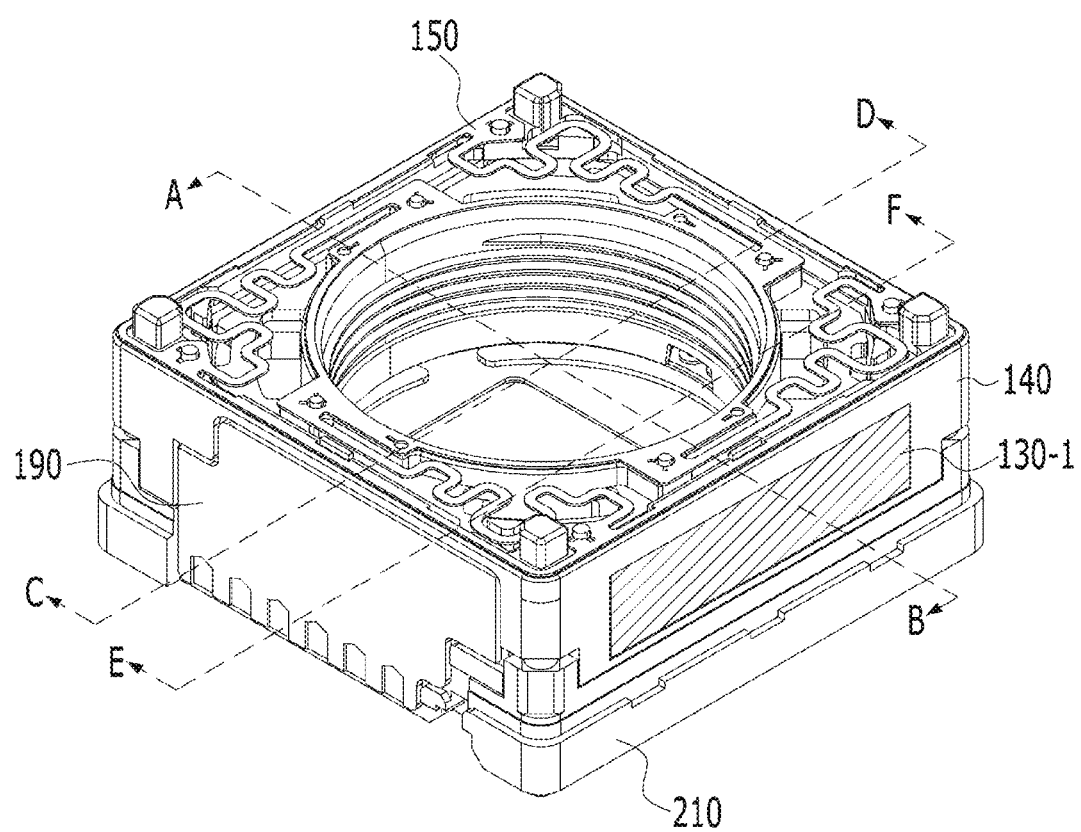
FIG. 3 illustrates the lens moving apparatus shown in FIG. 1, from which a cover member is removed.

FIG. 1 is a perspective view of a lens moving apparatus 100 according to an embodiment. FIG. 2 is an exploded view of the lens moving apparatus 100 shown in FIG. 1. FIG. 3 illustrates the lens moving apparatus 100 shown in FIG. 1, from which a cover member 300 is removed.

The lens moving apparatus 100 includes a bobbin 110, a coil 120, a sensing magnet 180, a first magnet 130-1, a second magnet 130-2, a housing 140, a position sensor 170 and a capacitor 195.

The lens moving apparatus 100 may further include an upper elastic member 150 and a lower elastic member 160.

Furthermore, the lens moving apparatus 100 may further include a circuit board 190 conductively connected to the position sensor 170.

Furthermore, the lens moving apparatus 100 may further include a balancing magnet 185.

The lens moving apparatus 100 may further include a cover member 300 and a base 210.

First, the bobbin 110 will be described.

The bobbin 110, which is configured to allow a lens or a lens barrel to be mounted thereon, may be disposed in the housing 140 so as to be movable in the optical-axis direction OA or in the first direction (for example, the Z-axis direction) by the electromagnetic interaction between the coil 120 and the first and second magnets 130-1 and 130-2.

Figure 4A:
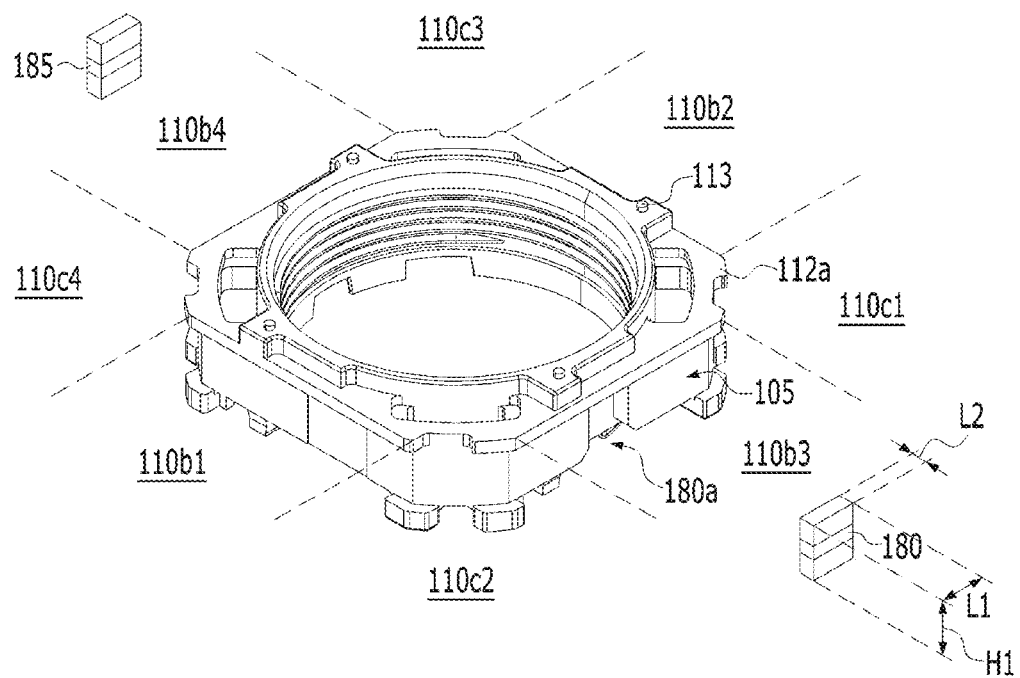
FIG. 4A is a perspective view illustrating a bobbin, a sensing magnet and a balancing magnet shown in FIG. 2.
Figure 4B:
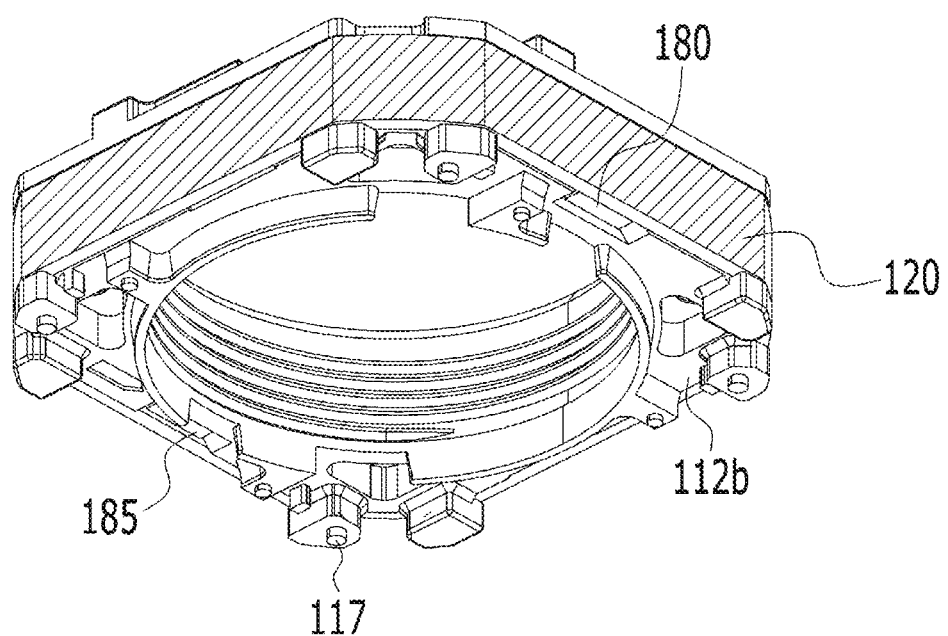
FIG. 4B illustrates the bobbin, the coil and the sensing magnet shown in FIG. 2.

FIG. 4A is a perspective view illustrating the bobbin 110, the sensing magnet 180, and the balancing magnet 185 shown in FIG. 2. FIG. 4B illustrates the bobbin 110, the coil 120 and the sensing magnet 180 shown in FIG. 2.

Referring to FIGS. 4A and 4B, the bobbin 110 may be disposed in the housing 140. The bobbin 110 may have a bore in which a lens or a lens barrel is mounted. For example, the bore in the bobbin 110 may be a through hole, and may have a circular shape, an elliptical shape or a polygonal shape, without being limited thereto.

The bobbin 110 may include a first coupler 113, which is disposed on the upper portion, the upper surface or the upper end thereof and is coupled or secured to the first inner frame 151 of the upper elastic member 150, and a second coupler 117, which is disposed on the lower portion, the lower surface or the lower end thereof and is coupled or secured to the second inner frame 161 of the lower elastic member 160.

Although each of the first and second couplers 113 and 117 is illustrated in FIGS. 4A and 4B as being configured to have the form of a protrusion, the disclosure is not limited thereto. In another embodiment, each of the first and second couplers 113 and 117 may have the form of a groove or a flat surface.

The bobbin 110 may have a first escape groove 112a formed in a region of the upper surface thereof that corresponds to or is aligned with the first frame connector 153 of the upper elastic member 150 in the optical-axis direction. The first escape groove 112a may be configured to be depressed from the upper surface of the bobbin 110.

Furthermore, the bobbin 110 may have a second escape groove 112b formed in a region of the lower surface thereof that corresponds to or is aligned with the second frame connector 163 of the lower elastic member 160 in the optical-axis direction. The second escape groove 112b may be configured to be depressed from the lower surface of the bobbin 110.

By virtue of the first escape groove 112a and the second escape groove 112b in the bobbin 110, when the bobbin 110 is moved in the first direction, spatial interference between the first frame connector 153 and the second frame connector 163 and the bobbin 110 is eliminated, thereby allowing the frame connector 153 to be elastically deformed with ease.

The bobbin 110 may include a plurality of side surfaces or outer surfaces.

For example, the bobbin 110 may include side portions 110b1 to 110b4 and corner portions 110c1 to 110c4.

For example, each of the first to fourth corner portions 110c1 to 110c4 of the bobbin 110 may be disposed between two adjacent side portions of the bobbin 110. The side surfaces or outer surfaces of the first to fourth side portions 110b1 to 110b4 of the bobbin 110 may be referred to as "first to fourth side surfaces" or "first to fourth outer surfaces".

The bobbin 110 may have at least one groove 105 formed in the side surface or the outer surface thereof in which the coil 120 is disposed or seated.

For example, the coil 120 may be disposed or seated in the groove 105 in the bobbin 110, or may be directly wound in the groove 105 in the bobbin 110 in a clockwise direction or in a counterclockwise direction about the optical axis OA so as to have a closed loop shape, without being limited thereto.

The number and shape of grooves 105 in the bobbin 110 may correspond to the number and shape of coils disposed on the outer surface of the bobbin 110. In another embodiment, the bobbin 110 may not have the groove in which the coil is seated, and the coil may be directly wound around the outer surface of the bobbin 110, and may be secured thereto.

For seating the sensing magnet 180, the bobbin 110 may have a groove 180a formed in the outer surface of one of the side portions (for example, 110b3). For easily seating the sensing magnet 180, the groove 180a may have an opening formed in the lower surface of the bobbin 110. Although the groove 180a may also be formed in the bottom of the groove 105 for accommodating the coil, the disclosure is not limited thereto.

For seating the balancing magnet 185, the bobbin 110 may have a groove (not shown) formed in the outer surface of the side portion 110b4 that faces the side portion (for example, 110b3) having therein the groove 180a.

The bobbin 110 may include a first stopper (not shown), which projects upwards from the upper surface thereof, and a second stopper (not shown), which projects downwards from the lower surface thereof.

The first and second stoppers of the bobbin 110 may serve to inhibit the upper surface or the lower surface of the bobbin 110 from directly colliding with the inner wall of the cover member 300 or the upper surface of the base 210 even when the bobbin 110 is moved beyond a specified range due to an external impact or the like while the bobbin 110 is being moved in the first direction to perform an auto-focusing function.

Next, the coil 120 will be described.

The coil 120 may be disposed on the outer surface of the bobbin 110, and may be a drive coil configured to electromagnetically interact with the first and second magnets 130 disposed on the housing 140.

For example, the coil 120 may be disposed or wound in the groove 105 in the bobbin 110.

In order to create electromagnetic force from the interaction between the first and second magnets 130-1 and 130-2, a drive signal (for example, drive current or voltage) may be applied to the coil 120.

The drive signal applied to the coil 120 may be a DC signal, without being limited thereto. The drive signal may be an AC signal or a signal containing both DC and AC components.

An AF operation unit may be moved in the first direction, for example, in an upward direction (in the +z-axis direction) or in a downward direction (in the −z-axis direction) by virtue of the electromagnetic force resulting from the interaction between the coil 120 and the first and second magnets 130-1 and 130-2.

By controlling the intensity and/or polarity of a drive signal applied to the first coil 120 (for example, the direction in which current flows) and thus controlling the intensity and/or direction of the electromagnetic force resulting from the interaction between the coil 120 and the first and second magnets 130, it is possible to control the movement of the AF operation unit in the first direction, thereby performing an autofocus function.

The AF operation unit may be driven unidirectionally or bidirectionally by the electromagnetic force resulting from the interaction between the coil 120 and the first and second magnets 130-1 and 130-2. Here, unidirectional driving means that the AF operation unit is moved in one direction, for example, in an upward direction (that is, in a +z-axis direction) from the initial position of the AF operation unit, and bidirectional driving means that the AF operation unit is moved in two directions (for example, in upward and downward directions) based on the initial position of the AF operation unit.

For example, the initial position of the AF operation unit (for example, the bobbin 110) may be the original position of the AF operation unit (for example, the bobbin) in the state in which no electric power or drive signal is applied to the coil 120 or the position at which the AF operation unit is located as the result of the upper and lower elastic members 150 and 160 being elastically deformed due only to the weight of the AF operation unit.

In addition, the initial position of the AF operation unit (for example, the bobbin 110) may be the position at which the AF operation unit is located when gravity acts in the direction from the bobbin 110 to the base 210 or when gravity acts in the direction from the base 210 to the bobbin 110.

The AF operation unit may include the bobbin 110, which is elastically supported by the upper elastic member 150 and the lower elastic member 160, and components which are mounted on the bobbin 110 and are moved therewith. For example, the AF operation unit may include at least one of the bobbin 110, the coil 120, the sensing magnet 180 and the balancing magnet 185, and may further include a lens or a lens barrel when the lens or the lens barrel is mounted on the AF operation unit.

The coil 120 may be disposed on the bobbin 110 so as to have a closed curve shape, for example, a ring shape.

For example, the coil 120 may be wound in a clockwise direction or in a counterclockwise direction about the optical axis so as to have a closed loop shape, and may be wound or disposed on the outer surface of the bobbin 110.

In another embodiment, the coil 120 may be embodied as a coil ring, which is wound or disposed in a clockwise direction or in a counterclockwise direction about an axis perpendicular to the optical axis. Although the number of coil rings may be the same as the number of magnets 130, the disclosure is not limited thereto. In another embodiment, the coil 120 may include a first coil unit that faces the first magnet 130-1 and a second coil unit that faces the second magnet 130-2. In this case, the first coil unit may be disposed on the side portion of the bobbin 110 that faces the first magnet 130-1, and the second coil unit may be disposed on the side portion of the bobbin 110 that faces the second magnet 130-2.

The coil 120 may be conductively connected to at least one of the upper elastic member 150 and the lower elastic member 160, and may be conductively connected to the circuit board 190 via the upper elastic member 150 or the lower elastic member 160.

For example, by means of solder or conductive adhesive, the coil 120 may be coupled to the lower elastic units of the lower elastic member 160 or may be coupled only to two of the lower elastic units of the lower elastic member, without being limited thereto.

For example, at the initial position of the AF operation unit (for example, the bobbin 110), the coil 120 disposed on the bobbin 110 may overlap the first and second magnets 130-1 and 130-2 in a direction that intersects the optical axis and is perpendicular to the optical axis.

Furthermore, at the initial position of the AF operation unit (for example, the bobbin 110), the coil 120 disposed on the bobbin 110 may overlap the position sensor 170 in a direction that intersects the optical axis and is perpendicular to the optical axis, without being limited thereto. In another embodiment, the coil 120 may not overlap the position sensor 170.

Next, the housing 140 will be described.

The housing 140 accommodates therein the bobbin 110 at which the coil 120 and the sensing magnet 180 are disposed.

Figure 5A:
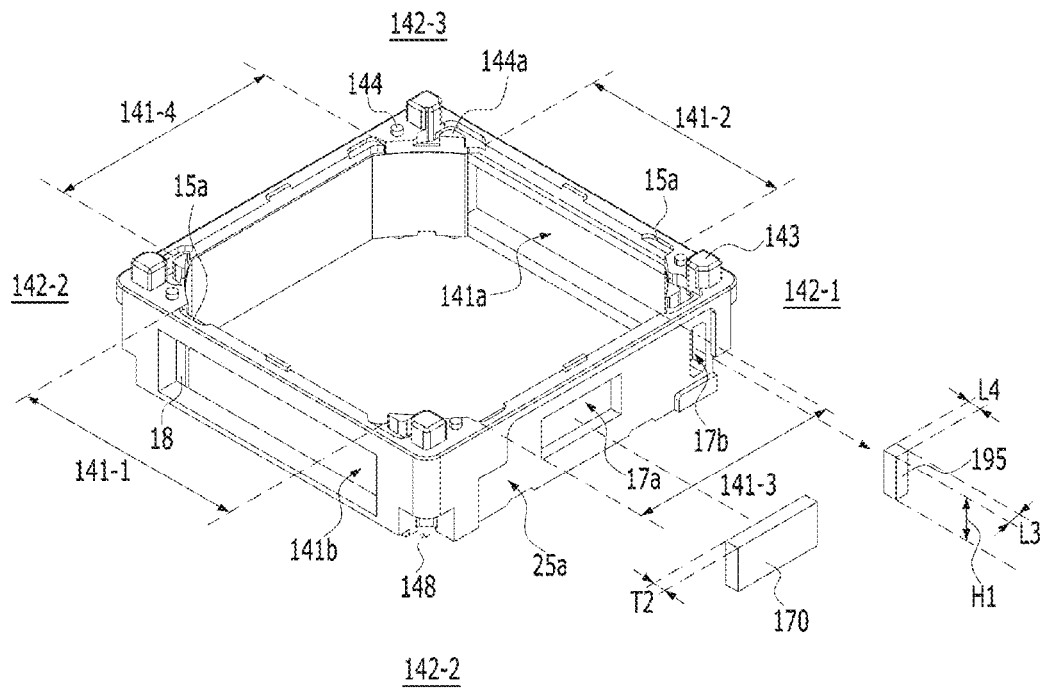
FIG. 5A is a perspective view of the housing, the position sensor and the capacitor shown in FIG. 2.
Figure 5B:
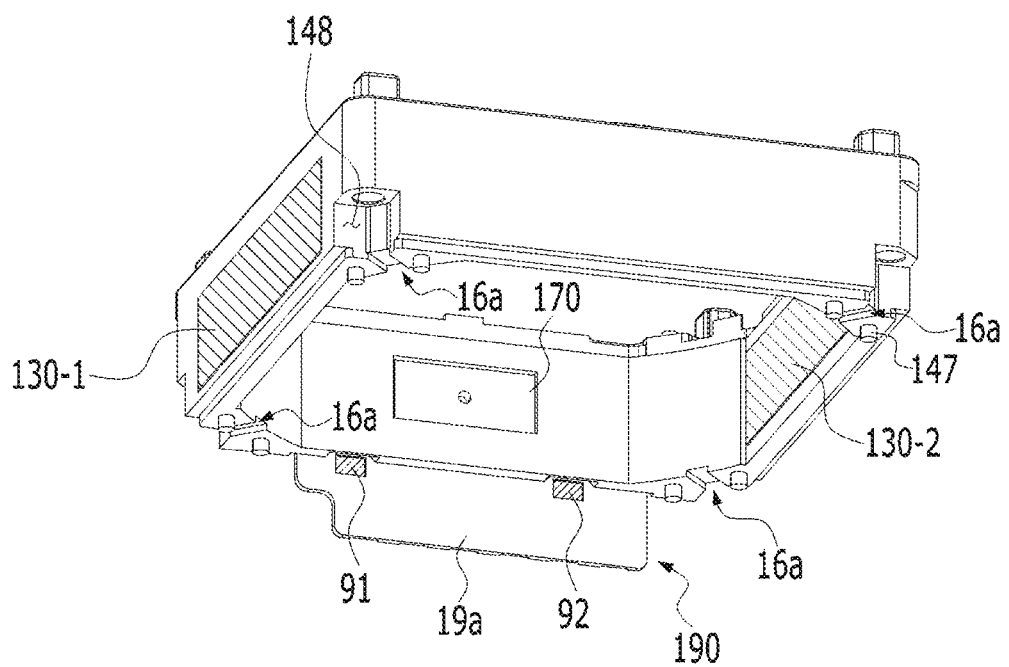
FIG. 5B is a perspective view of the housing, to which the first and second magnets, the circuit board, and the position sensor are coupled.
Figure 6:
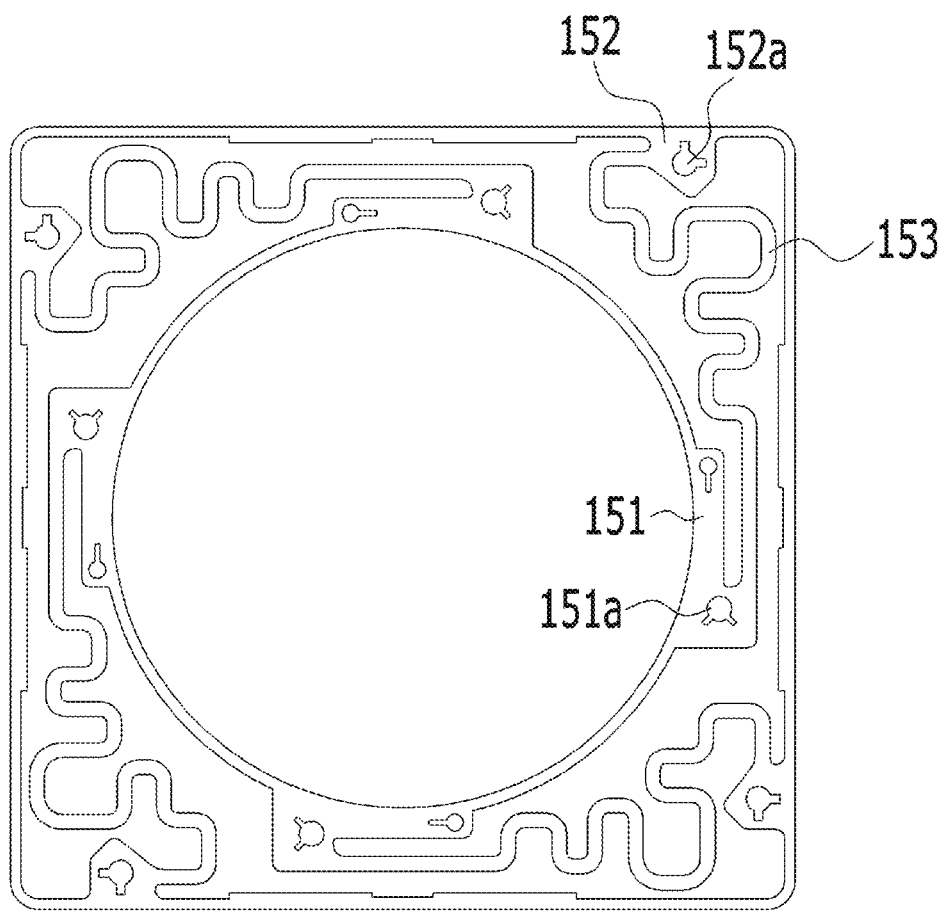
FIG. 6 is a perspective view of the upper elastic member.
Figure 7:
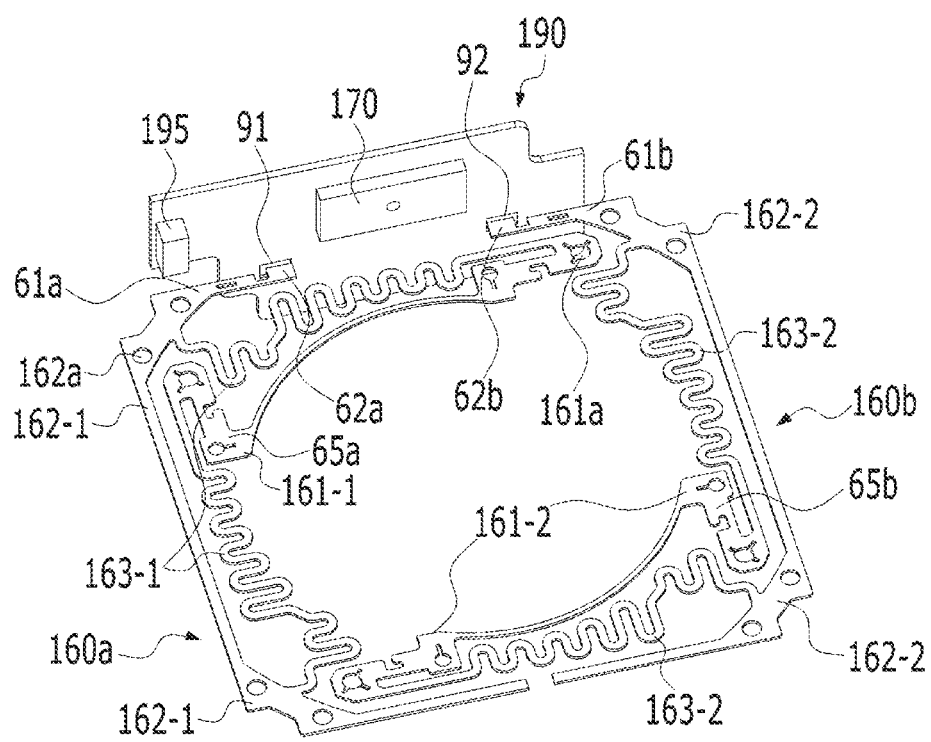
FIG. 7 is a view illustrating the state in which the lower elastic member, the circuit board, the position sensor, and the capacitor are assembled.

FIG. 5A is a perspective view of the housing 140, the position sensor 170 and the capacitor 195 shown in FIG. 2. FIG. 5B is a perspective view of the housing 140, to which the first and second magnets 130-1 and 130-2, the circuit board 190, and the position sensor 170 are coupled. FIG. 6 is a perspective view of the upper elastic member 150. FIG. 7 is a view illustrating the state in which the lower elastic member 160, the circuit board 190, the position sensor 170, and the capacitor 195 are assembled.

Referring to FIGS. 5A and 5B, the housing 140 supports the first and second magnets 130-1 and 130-2, and accommodates therein the bobbin 110 such that the bobbin 110 is movable in the optical-axis direction.

The housing 140 may have the shape of a column having a bore for receiving therein the bobbin 110. The housing 140 may include a plurality of side portions (for example, 141-1 to 141-4) and a plurality of corner portions (for example, 142-1 to 142-4), which collectively define the bore. Here, the corner portions (for example, 142-1 to 142-4) of the housing 140 may be alternatively referred to as "column portions".

For example, the housing 140 may include the side portions (for example, 141-1 to 141-4) and the corner portions (for example, 142-1 to 142-4), which collectively define a bore having a polygonal shape (for example, a square shape or an octagonal shape) or a circular (or elliptical) shape.

The housing 140 may include the first and second side portions 141-1 and 141-2, which face each other, and the third and fourth side portions 141-3 and 141-4, which face each other. Furthermore, the housing 140 may include the first and fourth corner portions 142-1 and 142-4, which face each other, and the second and third corner portions 142-2 and 142-3, which face each other.

For example, the housing 140 may include the first to fourth side portions 141-1 to 141-4, which are spaced apart from one another, the first corner portion 142-1 positioned between the second side portion 141-2 and the third side portion 141-3, the second corner portion 142-2 positioned between the first side portion 141-1 and the third side portion 141-3, the third corner portion 142-3 positioned between the second side portion 141-2 and the fourth side portion 141-4, and the fourth corner portion 142-4 positioned between the first side portion 141-1 and the fourth side portion 141-4.

The third side portion 141-3 and the fourth side portion 141-4 of the housing 140 may be disposed between the first side portion 141-1 and the second side portion 141-2 of the housing 140.

The housing 140 may include a first side surface (or a first outer surface) corresponding to the first side surface (or the first outer surface) of the bobbin 110, a second side surface (or a second outer surface) corresponding to the second side surface (or the second outer surface) of the bobbin 110, a third side surface (or a third outer surface) corresponding to the third side surface (or the third outer surface) of the bobbin 110, and a fourth side surface (or a fourth outer surface) corresponding to the fourth side surface (or the fourth outer surface) of the bobbin 110. The third and fourth side surfaces (or the third and fourth outer surfaces) of the housing 140 may be disposed between the first and second side surfaces (or the first and second outer surfaces) of the housing 140.

For example, each of the first to fourth side surfaces (or the first to fourth outer surfaces) of the housing 140 may be one side surface or outer surface of a corresponding one among the first to fourth side portions 141-1 to 141-4 of the housing 140.

Each of the first to fourth side portions 141-1 to 141-4 of the housing 140 may be disposed parallel to a corresponding one among the side plates of the cover member 300.

Each of the first to fourth side portions 141-1 to 141-4 of the housing 140 may correspond to one of the side portions 110b1 to 110b4 of the bobbin 110, and each of the first to fourth corner portions 142-1 to 142-4 of the housing 140 may correspond to one of the first to fourth corner portions 110c1 to 110c4 of the bobbin 110.

The inner surface of each of the corner portions 142-1 to 142-4 of the housing 140 may be a flat surface, a chamfer, or a curved surface.

The housing 140 may include a seating portion 141 formed in the first side portion 141-1 of the housing 140 in order to mount the first magnet 130-1, and may include a seating portion 141b formed in the second side portion 141-2 of the housing 140 in order to mount the second magnet 130-2.

Although each of the seating portions 141a and 141b is illustrated in FIG. 5A as having a bore or a through hole, which is formed through the first or second side portion 141-1 or 141-2 of the housing 140, the disclosure is not limited thereto. In another embodiment, each of the seating portions may have a groove or recess shape.

The housing 140 may include supports 18, which are disposed adjacent to the seating portions 141a and 141b so as to support first surfaces of the peripheral surfaces of the first and second magnets 130-1 and 130-2. The supports 18 may be positioned adjacent to the inner surface of the housing 140, and may project in a horizontal direction from side surfaces of the seating portions 141a and 141b. For example, each of the supports 18 may include a tapered portion or a sloped surface. In another embodiment, the housing 140 may not include the supports 18.

In order to inhibit the housing 140 from colliding with the inner surface of the upper plate of the cover member 300, the housing 140 may be provided on the upper portion, the upper surface or the upper end thereof with a stopper 143. Here, the stopper 142 may be alternatively referred to as a "boss" or a "protrusion".

For example, at the initial position of the OIS operation unit, the stopper 143 of the housing 140 may be in contact with the inner surface of the upper plate of the cover member 300, without being limited thereto. In another embodiment, the stopper 143 may not be in contact with the inner surface of the upper plate.

For coupling to a hole 152a in the first outer frame 152 of the upper elastic member 150, the housing 140 may include at least one first coupler 144 provided on the upper portion, the upper surface or the upper end thereof. Although the first coupler 144 of the housing 140 may have a protruding shape in FIG. 5A, the disclosure is not limited thereto. In another embodiment, the first coupler 144 may have a groove shape or a flat surface shape.

Furthermore, for coupling to a hole 162a in the second outer frame 162 of the lower elastic member 160, the housing 140 may include at least one second coupler 147 provided on the lower portion, the lower surface or the lower end of the housing 140. Although the second coupler 147 is illustrated in FIG. 5B as having a protruding shape, the disclosure is not limited thereto. In another embodiment, the second coupler 147 may have a groove shape or a flat surface shape.

Although the first and second couplers 144 and 147 are disposed on at least one of the corner portions 142-1 to 142-4 of the housing 140 in FIGS. 5A and 5B, the disclosure is not limited thereto. In another embodiment, the first and second couplers 144 and 147 may be disposed on at least one of the side portions 141-1 to 141-4 and the corner portions 142-1 to 142-4.

In order to inhibit the lower surface or the bottom of the housing 140 from colliding with the base 210, which will be described later, the housing 140 may include at least one stopper (not shown) projecting from the lower portion, the lower surface or the lower end thereof.

The lower portion, the lower surface or the lower end of at least one of the first to fourth corner portions 142-1 to 142-4 of the housing 140 may be provided therein with a guide groove 148 corresponding to a projection 216 of the base 210.

For example, the guide groove 148 in the housing 140 may be coupled to the projection 216 of the base 210 using an adhesive member, and the housing 140 may be coupled to the base 210 using an adhesive member.

In order to avoid spatial interference with a portion at which the first frame connector 153 of the upper elastic member 150 is connected to the first outer frame 151, the upper portion, the upper surface or the upper end of at least one of the first to fourth side portions 141-1 to 141-4 of the housing 140 may be provided therein with at least one escape groove 15a.

Furthermore, in order to avoid spatial interference with a portion at which the second frame connector 163 of the lower elastic member 160 is connected to the second outer frame 161, the lower portion, the lower surface or the lower end of at least one of the first to fourth corner portions 142-1 to 142-4 of the housing 140 may be provided therein with at least one escape groove 16a.

In another embodiment, one or more of each of the escape groove 15a and/or the escape groove 16a in the housing 140 may be disposed on at least one of the side portions 141-1 to 141-4 or the corner portions 142-1 to 142-4 of the housing 140.

For example, the corner portions 142-1 to 142-4 of the housing 140 may be provided with guide protrusions 144a for guiding the first frame connectors of the upper elastic member 150.

The third side portion 141-3 of the housing 140 may be provided with a structure (for example, a protrusion or a groove) configured to be coupled to the circuit board 190.

The outer surface of the third side portion 141-3 of the housing 140 may be provided with a groove 25a, in which the circuit board 190 is disposed. The groove 25a may have a shape that coincides with or corresponds to the shape of the circuit board 190.

For example, the circuit board 190 may be attached to the third side portion 141-3 (or the groove 25a) of the housing 140 using an adhesive or the like.

For seating the position sensor 170, the housing 140 may include a first seating portion 17a formed in the third side portion 141-3.

Furthermore, for seating the capacitor 195, the housing 140 may include a second seating portion 17b formed in the first corner portion 142-1 (or the first column portion).

The first seating portion 17a and the second seating portion 17b in the housing 140 may be formed in a side surface of the groove 25a in the housing 140 so as to be spaced apart from each other.

For example, the first seating portion 17a formed in the third side portion 141-3 of the housing 140 may be positioned between the first corner portion 142-1 and the second corner portion 142-2, and the second seating portion 17b may be formed in the first corner portion 142-1 of the housing 140.

In FIG. 5A, the first seating portion 17a may have the form of an opening or a through hole, which is formed through the third side portion 141-3 of the housing 140 such that the housing 140 is not interposed between the sensing magnet 180 and the position sensor 170, thereby increasing the output of the position sensor 170 and thus enhancing the sensitivity of the position sensor 170.

In another embodiment, the first seating portion may have a groove shape. For example, the first seating portion 17a may be disposed closer to the second corner portion 142-2 than to the first corner portion 142-1 of the housing 140. However, the disclosure is not limited thereto, and the first seating portion 17a may be configured such that the distance from the first corner portion 142-1 is equal to the distance from the second corner portion 142-2.

In another embodiment, the first seating portion 17a may be formed from the second corner portion 142-2 of the housing 140 to the third side portion 141-3 of the housing 140.

The second seating portion 17b may not have the through-hole shape but may have a groove depressed from the outer surface of the first corner portion 142-1 of the housing 140.

In the case in which the first seating portion accommodates both the position sensor 170 and the capacitor 195 without additionally forming the second seating portion, the size of the opening in the first seating portion increases, thereby allowing contaminants to enter the housing 140 through the opening. However, since the second seating portion 17b is formed to have a groove shape separately from the first seating portion 17a in this embodiment, it is possible to reduce the possibility that contaminants enter the housing 140 through the first seating portion 17a.

In another embodiment, the second seating portion 17b may be configured to have an opening or through-hole shape.

For example, although the first seating portion 17a of the housing 140 may have a shape that corresponds to or coincides with the shape of the position sensor 170, the disclosure is not limited thereto.

Although the second seating portion 17b of the housing 140 may have a shape that corresponds to or coincides with the shape of the capacitor 195, the disclosure is not limited thereto.

A corner portion (for example, 142-1) of the housing 140 may include a first region having a greater thickness than the thickness of the side portions 141-1 to 141-4 of the housing 140.

The capacitor 195 may be disposed in the first region of the first corner portion 142-1 of the housing 140. Accordingly, since the embodiment is able to allow the capacitor 195 to be easily disposed on the housing without increasing the size of the housing 140 or decreasing the size of the bore in the bobbin 110, it is possible to eliminate a restriction on mounting of the capacitor 195 due to the size of the capacitor 195.

Next, the first and second magnets 130-1 and 130-2, the sensing magnet 180 and the balancing magnet 185 will be described.

The first and second magnets 130-1 and 130-2 may be magnets that are capable of generating electromagnetic force resulting from the interaction between the coil 120 and thus of moving the bobbin 110 using the electromagnetic force.

The first magnet 130-1 and the second magnet 130-2 may be disposed on the side surface or the outer surface of the two facing side portions 141-1 and 141-2 of the housing 140.

For example, the first magnet 130-1 may be disposed on the first side portion 141-1, the first side surface or the first outer surface of the housing 140, and the second magnet 130-2 may be disposed on the second side portion 141-2, the second side surface or the second outer surface of the housing 140.

For example, the first and second magnets 130-1 and 130-2 may be disposed on the seating portions 141a and 141b in the housing 140.

In another embodiment, the first and second side portions 141-1 and 141-2 of the housing 140 may not be provided with the opening, and the first and second magnets 130-1 and 130-2 may be disposed on the outer surfaces or the inner surfaces of the side portions 141-1 and 141-2 of the housing 140.

Although each of the first and second magnets 130-1 and 130-2 may have a shape corresponding to the outer surfaces of the side portions 141-1 and 141-2 of the housing 140, for example, a polyhedral shape (for example, a rectangular parallelepiped shape), the disclosure is not limited thereto.

Each of the first and second magnets 130-1 and 130-2 may be a monopolar magnetized magnet, which includes two different poles and an interface plane naturally formed between the two different poles. For example, each of the first and second magnets 130-1 and 130-2 may be a monopolar magnetized magnet in which a first surface thereof that faces the coil 120 is the N pole and a second surface thereof opposite the first surface is the S pole. However, the disclosure is not limited thereto, and the reverse disposition of the N pole and the S pole is also possible.

In another embodiment, in order to increase the electromagnetic force, each of the first and second magnets 130-1 and 130-2 may be a bipolar magnetized magnet divided into two parts in a direction perpendicular to the optical axis. Here, the first and second magnets 130-1 and 130-2 may be embodied by a ferrite magnet, an alnico magnet, a rare-earth magnet or the like.

When each of the first and second magnets 130-1 and 130-2 is a bipolar magnetized magnet, each of the first to fourth magnets 130-1 to 130-3 may include a first magnet part, a second magnet part, and a partition wall disposed between the first magnet part and the second magnet part.

The first magnet part may include an N pole, an S pole, and a first interface plane between the N pole and the S pole. Here, the first interface plane may be a portion that has substantially no magnetism and has a zone having almost no polarity, and may be a portion that is naturally formed in order to form a magnet composed of one N pole and one S pole.

The second magnet part may include an N pole, an S pole, and a second interface plane between the N pole and the S pole. Here, the second interface plane may be a portion that has substantially no magnetism and has a zone having almost no polarity, and may be a portion that is naturally formed in order to form a magnet composed of one N pole and one S pole.

The partition wall may separate or isolate the first magnet part and the second magnet part from each other, and may be a portion having substantially no magnetism or polarity. For example, the partition wall may be a nonmagnetic material, air or the like. That is, the partition wall may be considered a "neutral zone".

The partition wall may be a portion that is artificially formed when the first magnet part and the second magnet part are magnetized, and the width of the partition wall may be greater than the width of each of the first interface and the second interface. Here, the width of the partition wall may be the length of the partition wall in a direction toward the second magnet part from the first magnet part.

For example, the width of the partition wall may be 0.2 mm-0.5 mm. Specifically, the width of the partition wall 11c may be 0.3 mm-0.4 mm.

For example, although the first magnet part and the second magnet part may be disposed such that opposite poles thereof face each other in the optical-axis direction, the disclosure is not limited thereto.

For example, the first magnet part and the second magnet part may be disposed such that the N pole of the first magnet part and the S pole of the second magnet part face the coil 120. However, the disclosure is not limited thereto, and the reverse disposition is also possible.

Although the first surface of each of the first and second magnets 130-1 and 130-2 may be configured as a flat surface, the disclosure is not limited thereto. The first surface of each of the first and second magnets 130-1 and 130-2 may be configured to have a curved surface, a sloped surface or a tapered surface.

For example, the first surface of each of the first and second magnets 130-1 and 130-2 may be a surface that faces the outer surface of the bobbin 110 and/or the coil 120.

Next, the sensing magnet 180 and the balancing magnet 185 will be described.

The sensing magnet 180 may be disposed on the outer surface of the bobbin 110 that faces the position sensor 170, and the balancing magnet 185 may be disposed on another outer surface of the bobbin 110, opposite the outer surface of the bobbin 110 on which the sensing magnet 180 is disposed.

The sensing magnet 180 may be disposed on one of the third and fourth side portions 110b3 and 110b4 or the third and fourth outer surfaces of the bobbin 110, and the balancing magnet 185 may be disposed on the other of the third and fourth side portions 110b3 and 110b4 or the third and fourth outer surfaces of the bobbin 110.

For example, the sensing magnet 180 may be disposed on the third side portion 110b3, the third side surface or the third outer surface of the bobbin 110, and the balancing magnet 185 may be disposed on the fourth side portion 110b4, the fourth side surface or the fourth outer surface of the bobbin 110. For example, the sensing magnet 180 may be disposed in the groove 180a in the bobbin 110, and the balancing magnet 185 may be disposed in a groove (not shown) formed in the fourth side portion 110b4 of the bobbin 110.

The sensing magnet 180 may have a polyhedral shape, for example, a hexahedral shape.

For example, the sensing magnet 180 may include an upper surface, a lower surface, a first surface that faces the bobbin 110, a second surface opposite the first surface, a first side surface connecting the first surface and the second surface to each other, and a second side surface opposite the first side surface.

For example, although the length L2 of the sensing magnet 180 in a direction toward the second surface from the first surface may be less than the length L1 of the sensing magnet 180 in a direction toward the second side surface from the first side surface (L2<L1), the disclosure is not limited thereto. In another embodiment, the length L2 may be equal to or greater than the length L1 (L2≥L1).

Furthermore, although the length H1 of the sensing magnet 180 in the optical-axis direction may be greater than the length L1 of the sensing magnet 180 in a direction toward the second side surface from the first side surface (H1>L1), the disclosure is not limited thereto. In another embodiment, the length H1 may be equal to or less than the length L1 (H1<L1). In a further embodiment, at least two of the length H1, L1 and L2 may be equal to each other.

Although the sensing magnet 180 (or the balancing magnet 185) may overlap the coil 120 in a direction that intersects the optical axis and is parallel to a line perpendicular to the optical axis, the disclosure is not limited thereto. In another embodiment, the sensing magnet 180 (or the balancing magnet 185) may not overlap the coil 120.

The sensing magnet 180 (or the balancing magnet 185) may be positioned inside the coil 120. Here, the inside of the coil 120 may be a direction toward the center of the bobbin 110 with respect to the coil 120. In other words, since the coil 120 is positioned outside the sensing magnet 180 and the balancing magnet 185, it is possible to increase the electromagnetic force between the coil 120 and the first and second magnets 130-1 and 130-2.

Although a portion of one surface of the sensing magnet 180 mounted in the groove 180*a* in the bobbin 110 may project from the outer surface of the bobbin 110, the disclosure is not limited thereto. In another embodiment, the portion may not project from the outer surface of the bobbin 110.

For example, the sensing magnet 180 may be fitted into the groove 180*a* through the opening in the groove 180*a*, which is formed in the lower surface of the bobbin 110. For example, the sensing magnet 180 may be fixed or attached to the groove 180*a* in the bobbin 110 using an adhesive such as epoxy.

Each of the sensing magnet 180 and the balancing magnet 185 may be a monopolar magnetized magnet, which is disposed such that the upper surface thereof has an N pole and the lower surface thereof has an S pole. However, the disclosure is not limited thereto, and the polarities may be arranged in the opposite manner.

For example, each of the sensing magnet 180 and the balancing magnet 185 may be disposed such that the interface between the N pole and the S pole is parallel to a direction perpendicular to the optical axis. However, the disclosure is not limited thereto, and the interface between the N pole and the S pole may be parallel to the optical axis in another embodiment.

In another embodiment, each of the sensing magnet 180 and the balancing magnet 185 may be a bipolar magnetized magnet. The bipolar magnetized magnet may include a first magnet part including an N pole and an S pole, a second magnet part including an N pole and an S pole, and a nonmagnetic partition wall disposed between the first magnet part and the second magnet part.

By virtue of the electromagnetic force resulting from the interaction between the coil 120 and the first and second magnets 130-1 and 130-2, the sensing magnet 180 may be moved together with the bobbin 110 in the optical-axis direction OA. At this time, the position sensor 170 may detect the intensity of the magnetic field of the sensing magnet 180, which is moved in the optical-axis direction, and may output an output signal corresponding to the detected intensity.

For example, a controller 830 of a camera module 200 or a controller 780 of a terminal 200A may detect displacement of the bobbin 110 in the optical-axis direction based on the output signal output from the position sensor 170.

The balancing magnet 185 may be disposed on the bobbin 110 so as to counteract the influence of the magnetic field of the sensing magnet 180 on the coil 120 and to attain weight equilibrium with respect to the AF operation unit.

At the initial position of the operation unit (for example, the bobbin 110), the position sensor 170 and the sensing magnet 180 may overlap each other at at least a portion thereof in a direction that intersects the optical axis and is parallel to a line perpendicular to the optical axis.

Furthermore, the first magnet 130-1 and the second magnet 130-2 may overlap each other in a direction that intersects the optical axis and is parallel to a line perpendicular to the optical axis and in a direction toward the second side portion 141-2 from the first side portion 141-1.

Figure 8A:
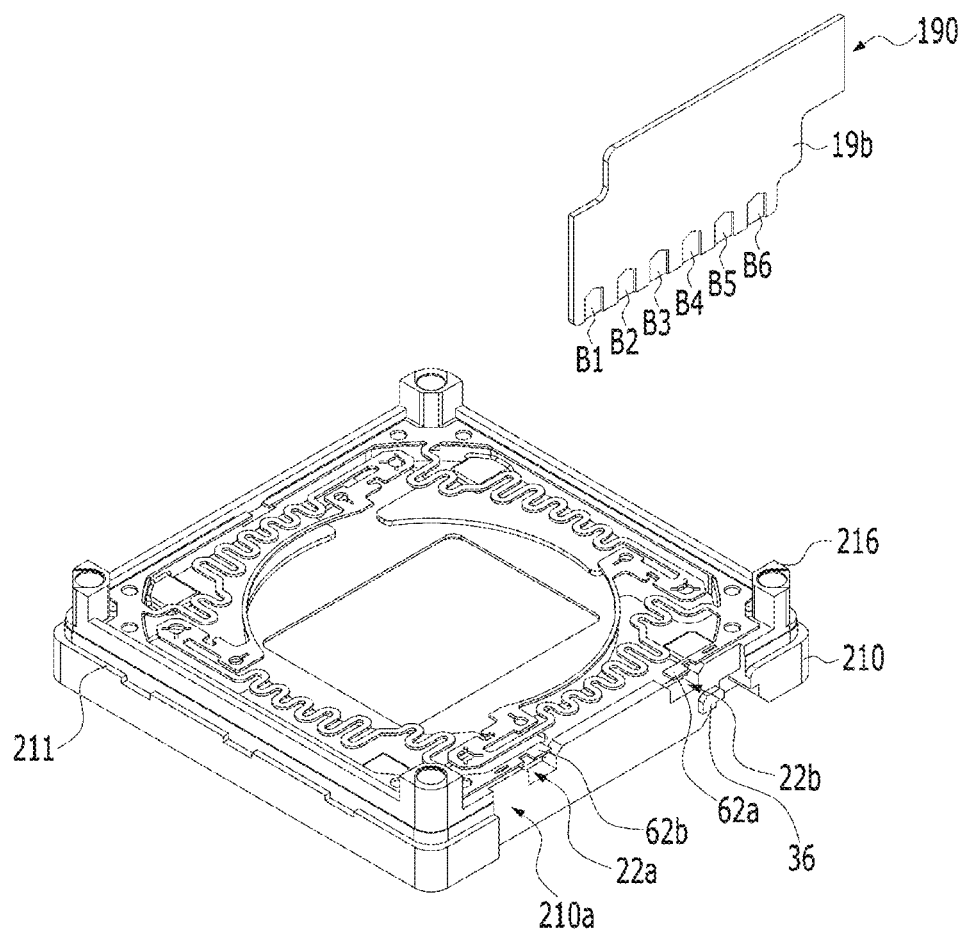
FIG. 8A is a perspective view illustrating the base, the lower elastic member and the circuit board.
Figure 8B:
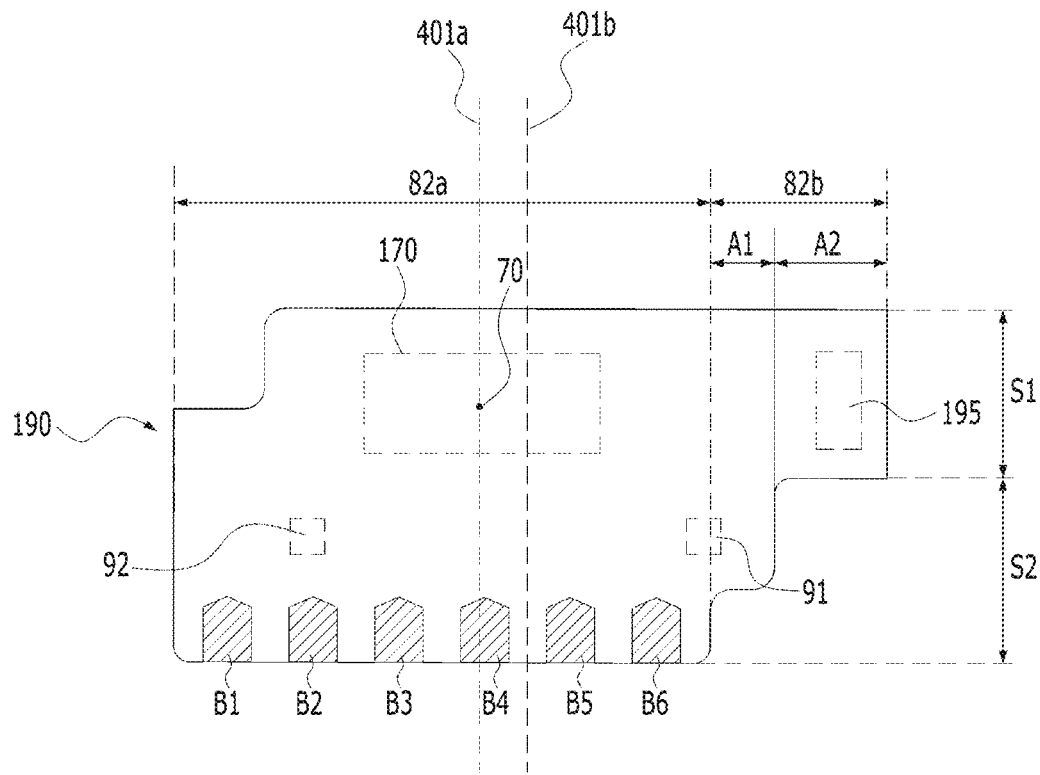
FIG. 8B is a view illustrating the positions of the circuit board, the position sensor and the capacitor.
Figure 9A:
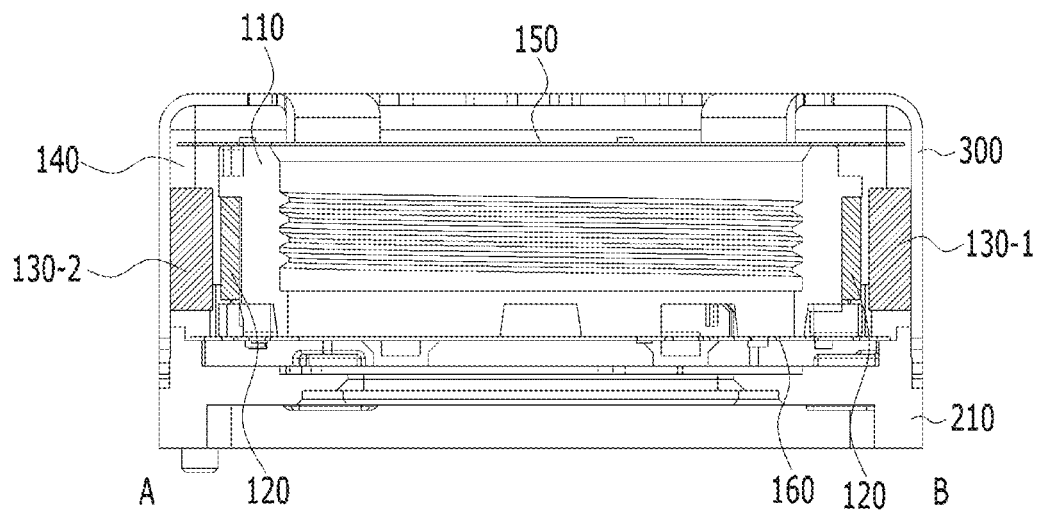
FIG. 9A is a cross-sectional view of the lens moving apparatus taken along line A-B in FIG. 3.
Figure 9B:
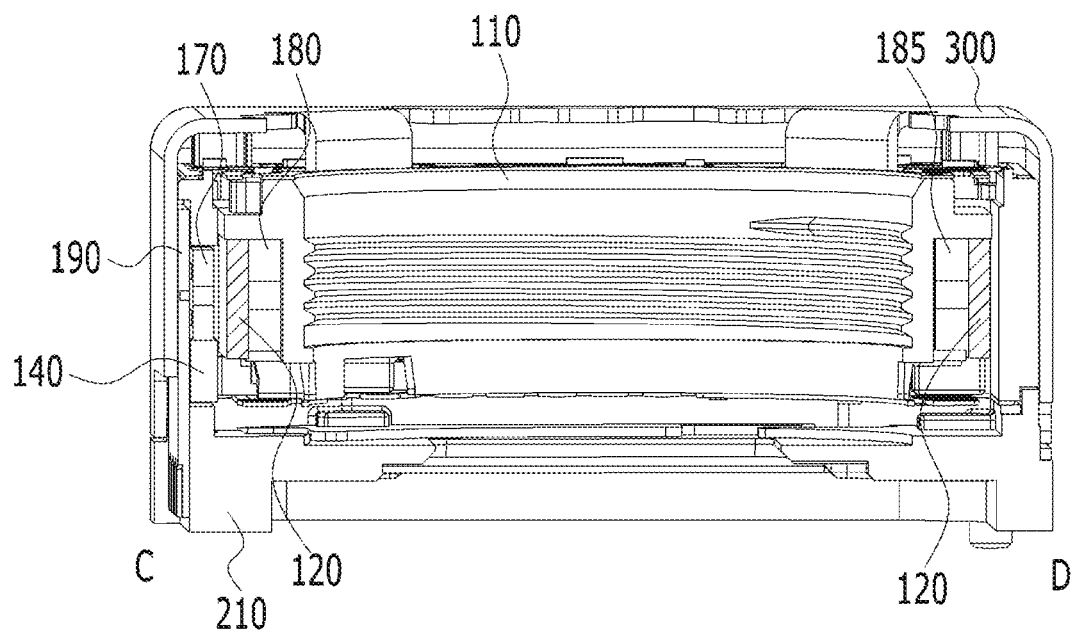
FIG. 9B is a cross-sectional view of the lens moving apparatus taken along line C-D in FIG. 3.
Figure 9C:
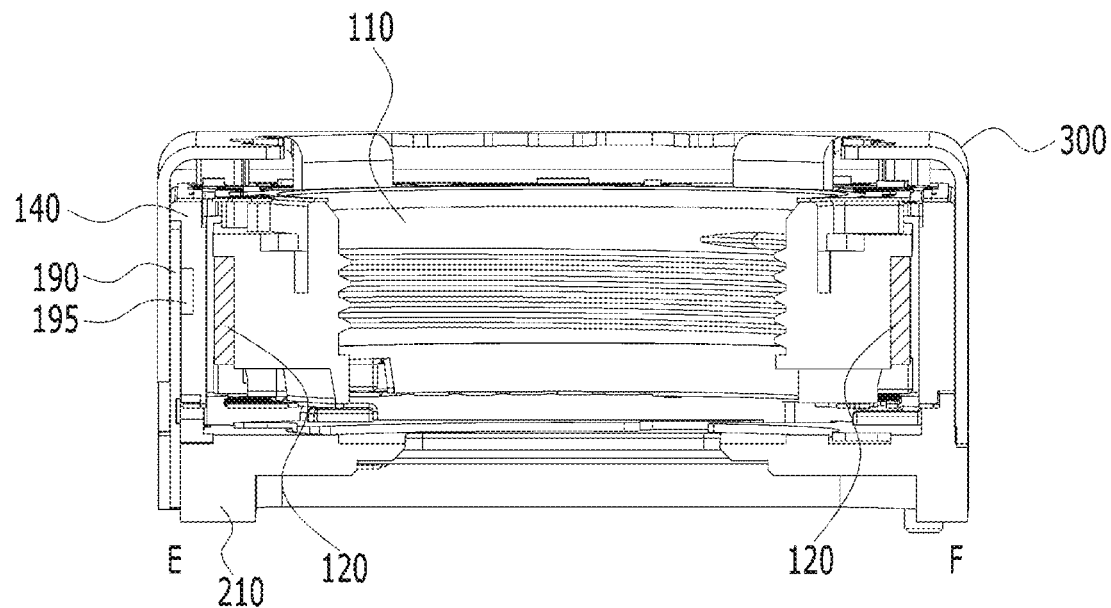
FIG. 9C is a cross-sectional view of the lens moving apparatus taken along line E-F in FIG. 3.

FIG. 6 is a plan view of the upper elastic member 150. FIG. 7 is a view illustrating the coupled state of the lower elastic member 160, the circuit board 190, the position sensor 170 and the capacitor 195. FIG. 8A is a perspective view illustrating the base 210, the lower elastic member 160 and the circuit board 190. FIG. 8B is a view illustrating the positions of the circuit board 190, the position sensor 170 and the capacitor 195. FIG. 9A is a cross-sectional view of the lens moving apparatus 100 taken along line A-B in FIG. 3. FIG. 9B is a cross-sectional view of the lens moving apparatus 100 taken along line C-D in FIG. 3. FIG. 9C is a cross-sectional view of the lens moving apparatus 100 taken along line E-F in FIG. 3.

The position sensor 170, the circuit board 190 and the capacitor 195 will now be described with reference to FIGS. 6 to 8B.

The circuit board 190 and the position sensor 170 may be disposed on the third portion 141-3, the third surface or the third outer surface of the housing 140, at which the first magnet 130-1 is disposed.

For example, the circuit board 190 may be disposed outside the position sensor 170 disposed on the third side portion 141-3 of the housing 140. Here, the outside of the position sensor 170 may mean the side opposite the center of the housing 140 with respect to the position sensor 170.

For example, the circuit board 190 may be disposed in the groove 25*a* formed in the third side portion 141-3 of the housing 140. At least a portion of the first surface 19*a* of the circuit board 190 may be in contact with the surface of the groove 25*a* in the housing 140.

The circuit board 190 may include a plurality of outer terminals (or "terminals") B1 to B6 to be conductively connected to the outside and first and second terminals 91 and 92, which are conductively connected to the lower elastic member 160 and receive drive signals for driving the coil 120 from the position sensor 170.

For example, the circuit board 190 may be a PCB or an FPCB.

The first and second terminals 91 and 92 may be formed on the first surface 19*a* of the circuit board 190, and the plurality of outer terminals B1 to B6 may be formed on the second surface 19*b* of the circuit board 190.

For example, although the plurality of outer terminals B1 to B2 may be arranged in a line at the lower end of the second surface 19*b* of the circuit board 190, the disclosure is not limited thereto. Here, the second surface 19*b* of the circuit board 190 may be a surface opposite the first surface 19*a* of the circuit board 190.

Although the circuit board 190 shown in FIG. 8A includes six terminals B1 to B6, the disclosure is not limited thereto.

The circuit board 190 may include a circuit pattern or a wire for conductively connecting the position sensor 190 to the terminals 91, 92 and B1 to B6.

The position sensor 170 may be mounted or disposed on a first surface 19*a* of the circuit board 190.

The position sensor 170 may be disposed on the first seating portion 17*a* formed in the third side portion 141-3 of the housing 140.

At the initial position of the bobbin 110, the position sensor 170 disposed on the third side portion 141-3 of the housing 140 may overlap the sensing magnet 180, disposed on the bobbin 110, in a direction toward the fourth side portion 141-4 of the housing 140 from the third side portion 141-3 of the housing 140. However, the disclosure is not limited thereto, and the position sensor 170 may not overlap the sensing magnet 180 in another embodiment.

At the initial position of the bobbin 110, the position sensor 170 disposed on the housing 140 may overlap the coil 120 in the direction of the fourth side portion 141-4 of the housing 140 from the third side portion 141-3 of the housing 140. However, the disclosure is not limited thereto, and the position sensor 170 may not overlap the coil 120.

For example, at the initial position of the bobbin 110, the capacitor 195 disposed on the housing 140 may overlap the coil 120 in a direction toward the fourth side portion 141-4 of the housing 140 from the third side portion 141-3 of the housing 140. Here, the capacitor 195 may overlap a portion of the coil 120 disposed on the corner portion 110c1 of the bobbin 110 that corresponds to or faces the first corner portion 142-1 of the housing 140.

The sensor 170 disposed on the housing 140 may not overlap the first and second magnets 130-1 and 130-2 in a direction toward the fourth side portion 141-4 of the housing 140 from the third side portion 141-3 of the housing 140.

The position sensor 170 may detect the intensity of the magnetic field of the third magnet 180 mounted on the bobbin 110 during movement of the bobbin 110, and may output a signal (for example, an output signal) corresponding to the result of the detection.

The position sensor 170 may be embodied as a Hall sensor or a driver including the Hall sensor.

Figure 10:
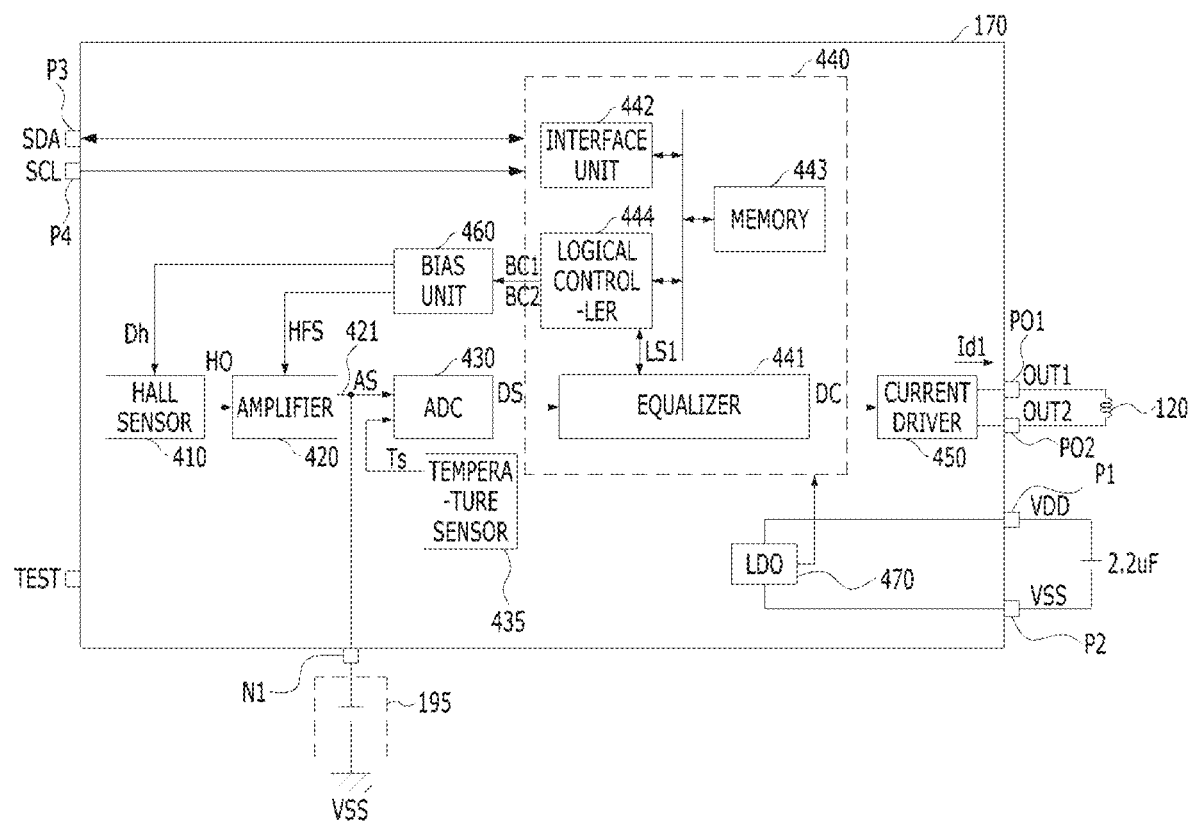
FIG. 10 illustrates the construction of an embodiment of the position sensor shown in FIG. 2.

FIG. 10 illustrates the construction of an embodiment of the position sensor 170 shown in FIG. 2.

Referring to FIG. 10, the position sensor 170 may include a Hall sensor 410, an analog-digital converter (ADC) 430, a controller 440, a voltage regulator 470 and terminals P1 to P4, PO1, PO2 and N1.

For example, the first and second terminals P1 and P2 of the position sensor 170 may be conductively connected to the first and second outer terminals B1 and B2 of the circuit board 190, and the third and fourth terminals P3 and P4 of the position sensor 170 may be conductively connected to the third and fourth outer terminals B3 and B4 of the circuit board 190. Furthermore, the drive terminals PO1 and PO2 of the position sensor 170 may be conductively connected to the first and second terminals 91 and 92 of the circuit board 190.

At least one terminal TES for testing the position sensor 170 may be conductively connected to the terminal B5 or B6 of the circuit board 190.

The position sensor 170 may further include a current driver 450 and a bias unit 460.

Furthermore, the position sensor 435 may further include a temperature sensor 435.

Furthermore, the position sensor 435 may further include at least one terminal TEST for testing or the like.

The Hall sensor 420 may receive a drive signal Dh, and may generate the output HO resulting from the detection of the intensity of the magnetic force of the sensing magnet 180 based on the drive signal. For example, the Hall sensor 410 may include two input terminals (not shown) and two output terminals (not shown), and drive signals may be supplied to the two input terminals of the Hall sensor 410.

For example, the output HO from the Hall sensor 410 may be of a voltage type, and may be output through the two output terminals of the Hall sensor 410. In another embodiment, the output from the Hall sensor 410 may be of a current type. The output HO may be an analog signal.

For example, the Hall sensor 410 may be made of silicone or GaAs, without being limited thereto. The output of the Hall sensor 410 may be affected by ambient temperature. Here, the ambient temperature may be the temperature of the lens moving apparatus, for example, the temperature of the circuit board 190, the temperature of the Hall sensor 410, or the temperature of the position sensor 170.

For example, the output VH of the silicone-based Hall sensor 61 may decrease as the ambient temperature increases, and the output of the GaAs Hall sensor may have a slope of about −0.06%/° C. at or near an ambient temperature.

The amplifier 420 receives the output HO from the Hall sensor 410, amplifies the received output from the Hall sensor 410 based on a control signal HFS, and outputs the amplified signal AS resulting from the amplification through the output terminal 421.

For example, the amplifier 420 may be a variable gain amplifier (VGA). For example, the gain of the amplifier 420 may be controlled based on the control signal HFS, with the result that the level of the amplified signal AS output from the amplifier 420 may be controlled.

The analog-digital converter 430 outputs the output of the amplifier 420, for example, the digital signal DS resulting from the analog-digital conversion of the amplified signal AS. Here, the digital signal DS contains information about displacement of the current operation unit (for example, the bobbin 110).

The controller 440 may perform data communication, for example, I2C communication, through an external host and a protocol, and may transmit and receive a clock signal SCL and a data signal SDA through the terminals P3 and P4.

For example, the controller 440 may include a serial interface unit 442 for performing data communication, for example, I2C communication, through a protocol.

The controller 440 may further include a memory 443, for example, an EEPROM in which an initial register setting value of the position sensor 170 pertaining to the displacement of the operation unit (for example, the bobbin 110) and a calculated value are stored.

The memory 443 may store therein firmware version information, a PID tuning value of an equalizer 441, a hall calibration level, a correction value for temperature compensation, a correction value for linearity and the like.

The controller 440 may further include a logical controller 444.

The logical controller 444 may create bias control signals BC1 and BC2 for controlling the bias unit 460. Furthermore, the logical controller 444 may create a control signal LS1 for controlling the equalizer 441.

Furthermore, the logical controller 444 may create bias control signals Bc1 and Bc2 for controlling the bias unit 460.

The controller 440 may further include the equalizer 441, configured to perform phase compensation and/or gain compensation on the digital signal DS.

For example, the equalizer 441 may include a proportional-integral-derivative (PID) controller.

The equalizer 441 receives the information LS1 supplied from the logical controller 444 and the digital signal DS supplied from the analog-digital converter 430, and outputs the digital value DC for controlling a current driver 450 based on the information LS1 and the digital signal DS. For example, the information LS1 may be an initial register setting value of the position sensor 170 and a calculated value.

For example, the equalizer 441 may control the current driver 450 to cause the digital signal DS that is the output of the Hall sensor HO to be equal to the initial register setting value of the position sensor 170, thereby controlling the drive signal Ids supplied to the coil 120.

The bias unit 460 may create the drive signal Dh for driving the Hall sensor 410 based on the first bias control signal BC1 supplied from the logical controller 444.

Furthermore, the bias unit 460 may create the control signal HFS for controlling the level of the amplified signal As of the amplifier 420 based on the second bias control signal BC1 supplied from the logical controller 444.

Furthermore, the bias unit 460 may adjust the hall offset of the Hall sensor 410. The output from the Hall sensor 410 may be output as positive voltage or negative voltage depending on whether the magnetic field detected by the Hall sensor 410 is generated from the N pole or the S pole of the magnet. Here, the hall offset is a value relating to the difference between output voltages of the Hall sensor 410 due to the displacement of the operation unit in two direction with respect to the initial position of the operation unit.

The current driver 450 creates the drive signal Id1 for driving the coil 120 based on the digital value SC output from the equalizer 441, and outputs the drive signal Id1 to the drive terminals PO1 and PO2.

For example, the drive terminals PO1 and PO2 of the position sensor 170 may be conductively connected to the first and second terminals 91 and 92 of the circuit board 190, respectively, and may be conductively connected to the coil 120 via the lower elastic units 160a and 160b.

The temperature sensor 435 supplies the temperature signal Ts as the result of detection or measurement of ambient temperature to the analog-digital converter 450.

The analog-digital converter 430 may correct the digital signal DS based on the temperature signal Ts, and may output the corrected digital signal.

The voltage regulator 470 may receive power signals or power voltages VDD and VSS suppled through the first and second terminals P1 and P2 of the position sensor 170, and may supply a stable operating voltage for operating the elements using the supplied power signal (or the power voltage). For example, although the voltage regulator 470 may be a low-drop-output (LDO) regulator, the disclosure is not limited thereto.

The capacitor 195 may be disposed on the first corner portion 142-1 of the housing 140. For example, the capacitor 195 may be disposed in the seating portion 17b in the housing 140.

The capacitor 195 may be disposed or mounted on the first surface 19a of the circuit board 190, and may be conductively connected to the circuit board 190.

The capacitor 195 may be of a chip type, and may include a first terminal conductively connected to one end thereof and a second terminal conductively connected to the other end thereof. The capacitor 195 may be alternatively referred to as a capacitive device or a condenser.

In another embodiment, the capacitor 195 may be embodied as being included in the circuit board 190. For example, the circuit board 190 may include a capacitor including a first conductive layer, a second conductive layer, and an insulation layer (for example, a dielectric layer) interposed between the first conductive layer and the second conductive layer.

The capacitor 195 may be conductively connected in parallel to the first and second terminals P1 and P2 of the position sensor 170, through which the power voltages VDD and VSS are supplied.

For example, the capacitor 195 may be conductively connected in parallel to the first and second outer terminals (for example, B1 and B2) of the circuit board 190, through which the power voltages VDD and VSS are supplied to the position sensor 170. For example, the power voltage VSS may be a ground voltage GND.

Figure 11A:
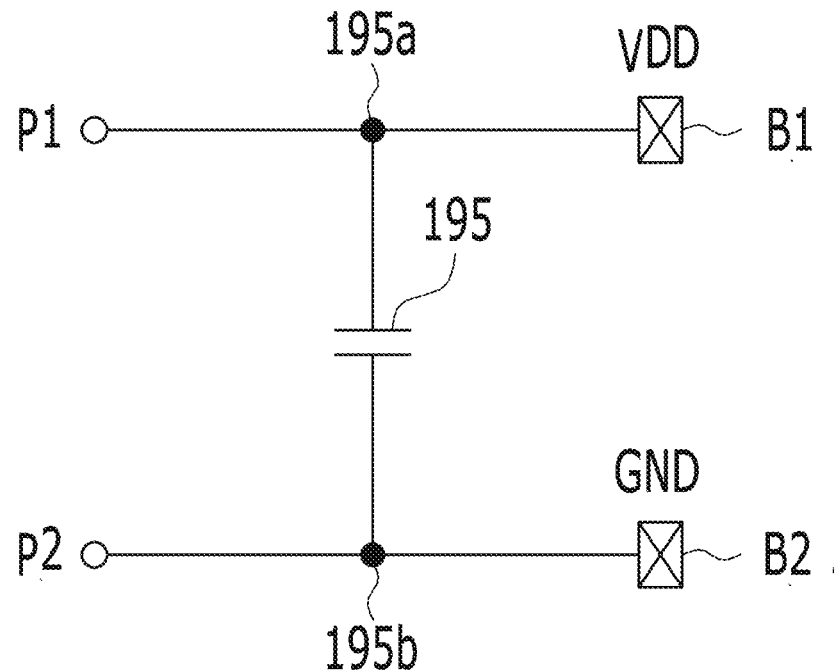
FIG. 11A illustrates a conductive connection relationship between the position sensor, the circuit board and the capacitor according to an embodiment.

FIG. 11A illustrates a conductive connection relationship between the position sensor 170, the circuit board 190, and the capacitor 195 according to an embodiment.

Referring to FIG. 11A, the capacitor 195 may be conductively connected in parallel both to the first terminal P1 of the position sensor 170, through which the first power voltage VDD is input, and to the second terminal P2 of the position sensor 170, through which the second power voltage VSS is input.

For example, one end (or a first terminal 195a) of the capacitor 195 may be conductively connected to the first outer terminal B1 of the circuit board 190, and the other end (or a second terminal 195b) of the capacitor 195 may be conductively connected to the second outer terminal B2 of the circuit board 190.

The capacitor 195 shown in FIG. 11A may be conductively connected in parallel to the first and second outer terminals B1 and B2 of the circuit board 190 so as to serve as a smoothing circuit for eliminating a ripple component contained in the power voltages (for example, VDD and VSS), which are supplied to the position sensor 170 from the outside, thereby providing the position sensor 170 with stable and constant power signals.

For example, the capacitor 195 shown in FIG. 11A is capable of inhibiting high-frequency noise component introduced from the outside or overcurrent caused by ESD or the like to be applied to the position sensor 170 and of inhibiting a phenomenon in which a calibration value relating to the displacement of the bobbin obtained based on the output signal of the position sensor 170 is reset due to the overcurrent.

For example, the capacitance of the capacitor may range from 0.1 μF to 2.5 μF. For example, the capacitance of the capacitor 195 may be 2.2 μF.

In another embodiment, the capacitance of the capacitor 195 may range from 0.5 μF to 2 μF. In another embodiment, the capacitance of the capacitor 195 may be, for example, 1 μF or higher.

If the capacitance of the capacitor 195 is lower than 0.1 μF, an effect of eliminating ripples may be deteriorated, thereby making it difficult to supply stable power voltage to the position sensor 170. If the capacitance of the capacitor 195 is higher than 2.5 μF, the size of the capacitor 195 may increase, and a large amount of heat may be generated.

In another embodiment, the capacitance of the capacitor 195 may be 1 μF or higher.

In another embodiment, the capacitor 195 may be conductively connected to an output terminal N1 of the position sensor 170. For example, the output terminal N1 of the position sensor 170 may be a terminal connected to the output terminal 421 of the amplifier 420 of the position sensor 170, through which the amplified signal AS is output. In another embodiment, the terminal N1 of the position sensor 170 may be an input terminal 419 of the amplifier 420, through which the output HO from the Hall sensor 410 is input.

Figure 11B:
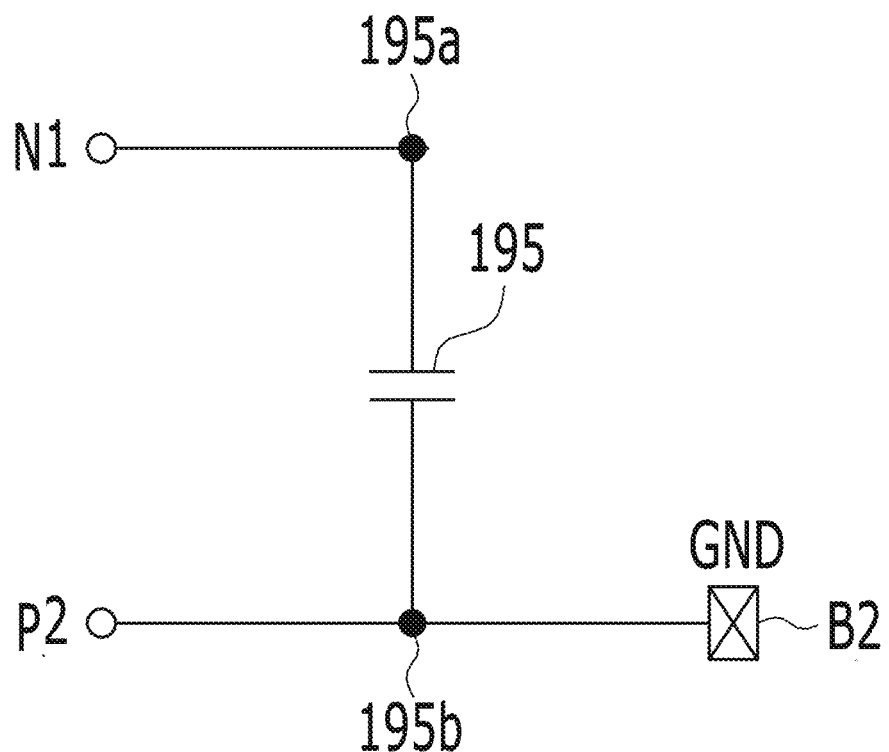
FIG. 11B illustrates a conductive connection relationship between the position sensor, the circuit board and the capacitor according to another embodiment.

FIG. 11B illustrates a conductive connection relationship between the position sensor 170, the circuit board 190 and the capacitor 195 according to another embodiment.

Referring to FIG. 11B, the capacitor 195 shown in FIG. 11B may be conductively connected in parallel both to the output terminal N1 of the position sensor 170 and the ground GND (for example, the second terminal P2 of the position sensor 170).

For example, the capacitor 195 shown in FIG. 11B may be connected both to the output terminal N1 of the position sensor 170 and to the second outer terminal B2 of the circuit board 190.

For example, one end (or the first terminal 195a) of the capacitor 195 shown in FIG. 11B may be conductively connected to the output terminal N1 of the position sensor 170, and the other end (or the second terminal 195b) of the capacitor 195 may be conductively connected to the second outer terminal B2 of the circuit board 190.

The capacitor 195 shown in FIG. 11B may be conductively connected to the output terminal N1 of the position sensor 170 so as to eliminate high-frequency noise component, introduced from the outside, from the output from the position sensor 170. For example, the capacitor 195 shown in FIG. 11B may serve to bypass high-frequency noise component introduced from the outside.

Referring to FIG. 5A, the length (or thickness) L4 of the capacitor 195 may be greater than the length (or thickness) T2 of the position sensor 170 (L4>T2).

The length L4 of the capacitor 195 may be the shortest distance from the first surface to the second surface of the capacitor 195. The first surface of the capacitor 195 may be the surface that faces the bobbin 110, and the second surface of the capacitor 195 may be the surface opposite the first surface of the capacitor 195.

The length (or thickness) T2 of the position sensor 170 may be the shortest distance from the first surface to the second surface of the position sensor 170. The first surface of the position sensor 170 may be the surface that faces the bobbin 110, and the second surface of the position sensor 170 may be the surface opposite the first surface of the position sensor 170.

Although the length L4 of the capacitor 195 may be equal to the length L3 of the capacitor 195, the disclosure is not limited thereto. In another embodiment, the length L4 may be greater than the length L3 (L4>L3). In a further embodiment, the length L4 may be less than the length L3 (L4<L3).

The height H1 of the capacitor 195 may be greater than the lengths L3 and L4 (H1>L3, L4). Here, the height of the capacitor 195 may be the length of the capacitor 195 in the optical-axis direction. Because the height H1 is greater than the length L3 (H1>L3), it is possible to dispose the capacitor 195 at the corner portion of the housing 140, and it is possible to increase the capacitance of the capacitor 195 by increasing the length of the capacitor 195 in the optical-axis direction.

For example, although the length of the capacitor 195 in the optical-axis direction may be less than the length of the position sensor 170 in the optical-axis direction, the disclosure is not limited thereto. In another embodiment, the length of the capacitor 195 may be equal to or greater than the length of the position sensor 170 in the optical-axis direction.

Next, the upper elastic member 150 and the lower elastic member 160 will be described.

The upper elastic member 150 and the lower elastic member 160 may be coupled to the bobbin 110. For example, the upper elastic member 150 and the lower elastic member 160 may be coupled both to the bobbin 110 and to the housing 140 so as to support the bobbin 110.

For example, the upper elastic member 150 may be coupled both to the upper portion, the upper surface or the upper end of the bobbin 110 and to the upper portion, the upper surface or the upper end of the housing 140, and the lower elastic member 160 may be coupled both to the lower portion, the lower surface or the lower end of the bobbin 110 and to the lower portion, the lower surface or the lower end of the housing 140.

At least one of the upper and lower elastic members 150 and 160 may be divided or separated into two or more. For example, the lower elastic member 160 may include a first lower elastic unit 160a and a second lower elastic unit 106b, which are spaced apart from each other.

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire, or the like.

Although the upper elastic member 150 is illustrated in FIG. 6 as having a single upper elastic unit, which is not divided, the disclosure is not limited thereto. In another embodiment, the upper elastic member may include a plurality of upper elastic units, and the plurality of upper elastic units may be conductively connected to the coil 120.

The upper elastic member 150 may include a first inner frame 151 coupled to the upper portion, the upper surface or the upper end of the bobbin 110, a first outer frame 152 coupled to the upper portion, the upper surface or the upper end of the housing 140, and a first frame connector 153 connecting the first inner frame 151 to the first outer frame 152. Here, the term "inner frame" may be interchangeably used with "inner portion", and the term "outer frame" may be interchangeably used with "outer portion".

For example, although the upper elastic member 150 may include four first inner frames coupled to the side portions 110b1 to 110b4 of the bobbin 110, four first outer frames coupled to the corner portions 142-1 to 142-4 of the housing 140, and four first frame connectors 153, the disclosure is not limited thereto. Each of the number of first inner frames, the number of first outer frames and the number of first frame connectors may be one or more.

The first inner frame 151 of the upper elastic member 150 may have formed therein a groove or hole 151a, which is coupled to the first coupling portion 113 of the bobbin 110, and the first outer frame 152 may have formed therein a groove or hole 152a, which is coupled to the first coupler 144 of the housing 140. Although each of the grooves 151a and 152a may have a slit formed therein, the slit may not be formed in another embodiment.

The first and second lower elastic units 160a and 160b may be coupled to the bobbin 110. Alternatively, the first and second lower elastic units 160a and 160b may be coupled both to the bobbin 110 and to the housing 140.

The first and second lower elastic units 160a and 160b may be disposed between the bobbin 110 and the base 210.

At least one of the first and second lower elastic units 160a and 160b may include the second inner frame 161-1, 161-2 coupled to the lower portion, the lower surface or the lower end of the bobbin 110, the second outer frame 162-1, 162-2 coupled to the lower portion, the lower surface or the lower end of the housing 140, and the second frame connector 163-1, 163-2, connecting the second inner frame 161-1, 161-2 to the second outer frame 162-1, 162-2.

The second inner frame 161, 161-2 of at least one of the first and second lower elastic units 160a and 160b may have formed therein a hole 161a for coupling the second coupling portion 117 of the bobbin 110 using solder or a conductive adhesive member.

The second outer frame 162-1, 162-2 of at least one of the first and second lower elastic units 160a and 160b may have formed therein a hole 162a for coupling the second coupler 147 of the housing 140.

For example, by means of solder or a conductive member, one end of the coil 120 may be connected to one end of the second inner frame 161-1 of the first lower elastic unit 160a, and the other end of the coil may be connected to one end of the second inner frame 161-2 of the second lower elastic unit 160b.

For example, the second inner frame 161-1 of the first lower elastic unit 160a may be provided with a bonding portion 65a, to which one end of the coil 120 is coupled, and the second inner frame 161-2 of the second lower elastic unit 160b may be provided with a bonding portion 65b, to which the other end of the coil 120 is coupled.

For example, each of the bonding portions 65a and 65b of the first and second lower elastic units 160a and 160b may have a fitting groove for guiding the coil 120.

The second outer frame 162-1 of the first lower elastic unit 160a may be provided with a first bonding portion 62a, to which a first terminal 91 of the circuit board 190 is coupled.

For example, the second outer frame 162-1 of the first lower elastic unit 160a may be disposed on the third side portion 141-3, the first corner portion 142-1, the second corner portion 142-1, the third corner portion 142-3 and the fourth side portion 141-4 of the housing 140, and the first bonding portion 62a may be positioned at one end of the second outer frame 162-1 of the first lower elastic unit 160a disposed on the third side portion 141-3 of the housing 140.

For example, the second outer frame 162-1 of the first lower elastic unit 160a may include a first extended portion 61a, which extends toward the third side portion 141-3 from the first corner portion 142-1 of the housing 140, and the first bonding portion 62a may be provided at one end of the first extended portion 61a.

For example, the first bonding portion 62a may be positioned at the lower surface of the third side portion 141-3 of the housing 140 or below the lower portion of the third side portion 141-3 of the housing 140. For example, the first bonding portion 62a may project toward the circuit board 190 from the outer surface of the second outer frame 162-1 of the first lower elastic unit 160a, positioned at the third side portion 141-3, so as to be easily coupled to the first terminal 91 of the circuit board 190.

The second outer frame 162-2 of the second lower elastic unit 160b may be provided with a second bonding portion 62b, to which the second terminal 92 of the circuit board 190 is coupled.

For example, the second outer frame 162-2 of the second lower elastic unit 160b may be disposed on the third side portion 141-3, the second corner portion 142-2, the first corner portion 142-1, the fourth corner portion 142-4 and the fourth side portion 141-4 of the housing 140, and the second bonding portion 62b may be disposed on one end of the second outer frame 162-2 of the second lower elastic unit 160b, disposed on the third side portion 141-3 of the housing 140.

For example, the second outer frame 162-2 of the second lower elastic unit 160b may include the second extended portion 61b, which extends toward the third side portion 141-3 from the second corner portion 142-2 of the housing 140, and the second bonding portion 62b may be provided at one end of the second extended portion 61b.

For example, the second bonding portion 62b of the second lower elastic unit 160b may be spaced apart from the first bonding portion 62a of the first lower elastic unit 160a, and may be disposed on one end of the second outer frame 162-2 of the second lower elastic unit 160a adjacent to the third side portion 141-3 of the housing 140.

For example, the second bonding portion 62b may be positioned at the lower surface of the third side portion 141-3 of the housing 140 or below the lower portion of the third side portion 141-3 of the housing 140. For example, the second bonding portion 62b may project toward the circuit board 190 from the outer surface of the second outer frame 162-2 of the second lower elastic unit 160b positioned at the third side portion 141-3 so as to be easily coupled to the second connection terminal 92 of the circuit board 190.

The coil 120 may be conductively connected to the first and second terminals 91 and 92 of the circuit board 190 via the first lower elastic unit 160a and the second lower elastic unit 160b.

The drive signal Id1 may be supplied to the coil 120 from the position sensor 170 via the first and second terminals 91 and 92 of the circuit board 190 and the first and second lower elastic units 160a and 160b.

Each of the first frame connector 153 and the second frame connector 163 of the upper elastic member 150 and the lower elastic member 160 may be bent or curved (or may be formed into a curved line) at least once so as to define a predetermined pattern. The upward and/or downward movement of the bobbin 110 in the first direction may be flexibly (or elastically) supported through changes in position and fine deformation of the first and second frame connectors 153 and 163.

In order to absorb and dampen vibrations of the bobbin 110, the lens moving apparatus 100 may further include a damper (not shown) disposed between the upper elastic member 150 and the housing 140.

For example, the damper (not shown) may be disposed in the space between the first frame connector 153 of the upper elastic member 150 and the bobbin 110 (and/or the housing 140.

For example, the lens moving apparatus 100 may further include a damper (not shown) disposed between the second frame connectors 163 of each of the first and second lower elastic units 160a and 160b and the bobbin 110 (and/or the housing 140).

For example, a damper (not shown) may also be disposed between the inner surface of the housing 140 and the outer surface of the bobbin 110.

Next, the base 210 will be described.

Referring to FIG. 8A, the base 210 may have a bore corresponding to the bore in the bobbin 110 and/or the bore in the housing 140, and may have a shape corresponding to or coinciding with that of the cover member 300, for example, a square shape.

The base 210 may include a step 211 at the lower end of the side surface thereof, to which an adhesive is applied when the cover member 300 is secured to the base 210 via adhesion. Here, the step 211 may guide the cover member 300, which is coupled to the upper side of the base, and may face the lower end of the side plate of the cover member 300. An adhesive member and/or a sealing member may be disposed or applied between the lower end of the side plate of the base 210 and the step 211 of the base 210.

The base 210 may be disposed below the bobbin 110 and the housing 140.

For example, the base 210 may be disposed below the lower elastic member 160.

The projection 216, which corresponds to the guide groove 148 in the housing 140, may be provided at a corner of the upper surface of the base 210. Although the projection 216 may have the form of a polygonal column, which projects perpendicularly from the upper surface of the base 210, the disclosure is not limited thereto.

The projection 216 may be fitted into the guide groove 148 in the housing 140, and may be fastened or coupled to the guide groove 148 using an adhesive member (not shown) such as epoxy or silicone.

In order to inhibit the lower surface or the lower end of the bobbin 110 from directly colliding with the upper surface of the base 210 in the event of occurrence of an external impact, the base 210 may include a stopper (not shown) projecting from the upper surface thereof, and the stopper of the base may be disposed so as to correspond to the projection of the base, without being limited thereto.

In order to avoid spatial interference between the bobbin 110 and the lower elastic member 160, the stoppers of the base 210 may be positioned higher than the second frame connectors 163 of the lower elastic units 160a and 160b coupled to the base 210.

The base 210 may include a seating groove 210a formed in the side surface corresponding to the side portion (for example, 141-3) of the housing 140, at which the circuit board 190 is disposed, so as to allow the lower end of the circuit board 190 to be seated in the seating groove 210a. The seating groove 210a in the base 210 may be configured to be depressed from the outer surface of the base 210 corresponding to the side portion (for example, 141-3) of the housing 140.

For example, the terminals B1 to B6 of the circuit board 190 may be disposed on the lower end of the second surface 19b of the circuit board 190, and may be positioned in the seating groove 210a in the base 210.

The base 210 may have therein grooves 22a and 22b configured to inhibit spatial interference with the bonding portions 62a and 62b of the first and second lower elastic units 160a and 160b disposed on the base 210 and to make it easy to perform soldering. The grooves 22a and 22b in the base 210 may have a form depressed from the upper surface of the base 210, and may be connected to the seating groove 210a. However, the disclosure is not limited thereto, and the grooves 22a and 22b may not be connected to the seating groove 210a.

For example, the seating groove 210a in the base 210 may be provided with a protrusion 36 for supporting the circuit board 190. In another embodiment, the protrusion may be omitted.

The protrusion 36 of the base 210 may be configured to project from the bottom of the seating groove 210a so as to support a first extension A1 of the circuit board 190, without being limited thereto.

Referring to FIG. 8B, the circuit board 190 may include a body part S1 and an extension part S2 positioned under the body part S1. The body part S1 may be alternatively referred to as an "upper part", and the extension part S2 may be alternatively referred to as a "lower part". The extension part S2 may extend downwards from the body part S1.

For example, the body part S1 may be disposed on the third side portion 141-3 of the housing 140, and the extension part S2 may be disposed both at the third side portion 141-3 of the housing 140 and at one side surface of the base 210.

For example, although the outer terminals B1 to B6 of the circuit board 190 and the first and second terminals 91 and 92 of the circuit board 190 may be disposed on the extension part S2, the disclosure is not limited thereto.

For example, the height of the upper ends or the upper surfaces of the first and second terminals 91 and 92 from the lower end or the lower surface of the circuit board 190 may be less than the height of the lower end or the lower surface of the position sensor 170 from the lower end or the lower surface of the circuit board 190.

For example, the height of the upper surfaces of the outer terminals B1 to B6 from the lower end or the lower surface of the circuit board 190 may be less than the height of the lower ends or the lower surfaces of the first and second terminals 91 and 92 from the lower end or the lower surface of the circuit board 190.

Furthermore, although the height of the upper end or the upper surface of the position sensor 170 from the lower end or the lower surface of the circuit board 190 may be less than the height of the upper end or the upper surface of the capacitor 915 from the lower end or the lower surface of the circuit board 190, the disclosure is not limited thereto.

In another embodiment, the height of the upper end or the upper surface of the position sensor 170 from the lower end or the lower surface of the circuit board 190 may be equal to or less than the height of the upper end or the upper surface of the capacitor 915 from the lower end or the lower surface of the circuit board 190.

The body part S1 may be configured to project from a side surface of the extension part S2.

The body part S1 may include an extension region A2, extending toward the first corner portion 142-1 of the housing 140. For example, at least a portion of the extension region A2 may be disposed on the first corner portion 142-1 of the housing 140.

The plurality of terminals B1 to B4 may be arranged toward the second corner portion 142-2 of the housing 140 with respect to the central line 401a of the third side portion 141-3 of the housing 140. In other words, because the right side of the lower end of the circuit board 190 is supported by the protrusion 36 of the base 210, the plurality of terminals B1 to B4 may be arranged to the left of the central line 401a. Here, the central line 401a may be a line that intersects the center of the third side portion 141-3 of the housing 140 and is parallel to the optical axis.

In another embodiment, the plurality of terminals of the circuit board 190 may be symmetrically arranged with respect to the central line 401 of the third side portion 141-3 of the housing 140. In a further embodiment, the plurality of terminals of the circuit board 190 may be arranged toward the first corner portion 142-1 of the housing 140 with respect to the central line 401a.

A sensing region (or a sensing element) 70 of the position sensor 170 mounted on the circuit board 190 may be positioned at the center of the position sensor 170, and the sensing region 70 may be positioned on the central line 401a. In another embodiment, the sensing region 70 may be positioned to the right or the left of the central line 401a.

The sensing region of the position sensor 170 may be positioned on the side toward the second corner portion 142-2 of the housing 140 with respect to the central line 401b of the circuit board 190. Here, the central line 401b of the circuit board 190 may be a line that intersects the center of the circuit board 190 and is parallel to the optical axis. For example, the center of the circuit board 190 may be a point that is positioned at the same distance from the two side ends of the circuit board 190. In another embodiment, the sensing region 70 of the position sensor 170 may be positioned on the central line 401b of the circuit board 190, or may be positioned on the side toward the first corner portion 142-1 of the housing 140 with respect to the central line 401b.

For example, the capacitor 195 may be disposed in the extension region A2 of the circuit board 190a.

The circuit board 190 may also be divided into a body part 82a and an extension part 82b.

The plurality of terminals B1 to B6 may be disposed on the lower end of the body part 82b.

The body part 82a may be disposed both at a portion of the third side portion 141-3 of the housing 140 and at a portion of one side surface of the base 210 corresponding to the third side portion 141-3.

The extension part 82b may extend toward the first corner portion 142-1 of the housing 140 from the body part 82a. The extension part 82b may be disposed on another portion of the third side portion 141-3 of the housing 140, at another portion of the one side surface of the base 210, and at the first corner portion 142-1 of the housing 140.

The capacitor 195 may be disposed in one region of the extension part 82b.

The extension part 82b may include the first extension A1, which extends toward the first corner portion 142-1 from a portion of one side of the body part 82a, and the second extension A2, which extends toward the first corner portion 142-1 from a portion of one side of the first extension A1.

For example, the first extension may be disposed on another portion of the third side portion 141-3 and another portion of the one side surface of the base 210. The second extension A2 may be disposed on the first corner portion 142-1 of the housing 140. For example, the capacitor 195 may be disposed on the second extension A2.

The lower end of the body part 82a, the lower end of the first extension A1, and the lower end of the second extension A2, may define a staircase or stepped structure.

The protrusion 36 of the base 210 may support the lower end of the first extension A1.

Next, the cover member 300 will be described.

The cover member 300 accommodates other components 110, 120, 130-1, 130-2, 140, 150, 160a, 160b, 170, 180, 190 and 195 in the space defined between the cover member 300 and the base 210.

The cover member 300 may be configured to have a box shape, which is open at the lower face thereof and includes the upper plate and the side plates. The lower ends of the side plates of the cover member 1300 may be coupled to the upper portion of the base 1210. The upper plate of the cover member 1300 may have a polygonal shape, for example, a square shape, an octagonal shape, or the like, and may have a bore through which a lens (not shown) is exposed to external light.

The cover member 1300 may be made of a nonmagnetic material such as stainless steel or plastic in order to inhibit the cover member 1300 from being attracted to the magnets 130, and may be made of a magnetic material so as to serve as a yoke.

Figure 12:
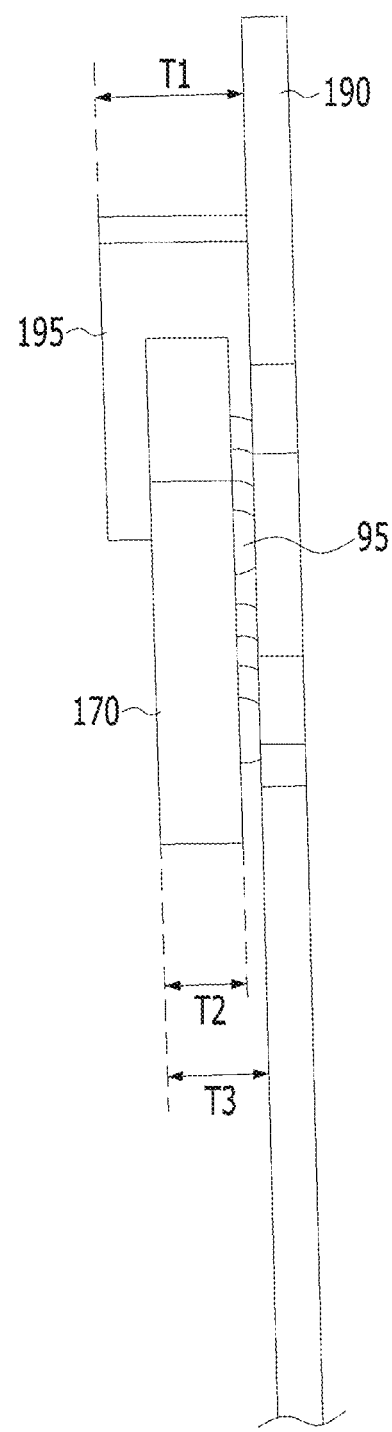
FIG. 12 illustrates the thicknesses of the position sensor and the capacitor mounted on the circuit board.

FIG. 12 illustrates the thicknesses of the position sensor 170 and the capacitor 195 mounted on the circuit board 190.

The capacitor 195 may be required to have a capacitance sufficiently high to serve as a smoothing circuit for eliminating ripple components contained in power voltages (for example, VDD and VSS), as described in FIG. 11A, or to bypass high-frequency noise component introduced from the outside, as described in FIG. 11B. Hence, the thickness T1 of the capacitor 195 may be greater than the thickness of the position sensor 170.

The thickness T1 of the capacitor 195 disposed on the circuit board 190 may be the length of the capacitor 195 in a direction perpendicular to the first surface 19a of the circuit board 190 or the length of the capacitor 195 in a direction toward the fourth side portion 141-4 from the third side portion 141-3 of the housing 140.

The thickness T2 of the position sensor 170 disposed on the circuit board 190 may be the length of the position sensor 170 in a direction perpendicular to the first surface 19a of the circuit board 190 or the length of the position sensor 170 in a direction toward the fourth side portion 141-4 from the third side portion 141-3 of the housing 140.

Furthermore, the distance to the first surface (or the front surface) of the capacitor 195 from the first surface 19a of the circuit board 190 may be greater than the distance T3 to the first surface (or the front surface) of the position sensor 170 from the first surface 19a of the circuit board 190.

Here, the first surface of the capacitor 195 may be the surface opposite the second surface (or the rear surface) of the capacitor 195 that faces the first surface of the circuit board 190, and the first surface of the position sensor 170 may be the surface opposite the second surface (or the rear surface) of the position sensor 190 that faces the first surface 19a of the circuit board 190. For example, T3 may be the value of the thickness of the position sensor 170 plus the thickness of solder 95 disposed between the position sensor 170 and the circuit board 190.

Because the thickness T1 of the capacitor 195 is greater than the thickness of the position sensor 170 (T1>T2), the bore in the bobbin 110 must be decreased in order to dispose the capacitor 195 at the side portion (for example, 141-3) of the housing 140, thereby decreasing the diameter of a lens mounted in the bobbin 110. It is difficult to apply this structure to a product having an f-number that is decreased by increasing the diameter of a lens.

When the capacitor 195 is disposed on the side portion (for example, 141-3) of the housing 140, it is necessary to provide a predetermined distance (for example, 0.05 mm-0.2 mm) between the coil and the position sensor and between the coil and the capacitor in order to avoid spatial interference between the capacitor 195 and the side portion of the housing 140. When a predetermined distance is maintained between the capacitor and the coil in order to avoid the above-mentioned spatial interference, the distance between the sensing magnet and the position sensor may increase, thereby lowering the sensitivity of the position sensor, and increasing the overall size of the lens moving apparatus.

Although the size (for example, the thickness) of the side portion (for example, 141-3) of the housing 140 must be increased in order to dispose the capacitor 195 at the side portion of the housing 140, this may cause an increase in the overall size of the lens moving apparatus.

The capacitor 195 according to an embodiment may be disposed in a first region Q1 of the corner portion (for example, 142-1) of the housing 140, rather than the side portion (for example, 141-3) of the housing 140. Because the size of the first region Q1 of the corner portion (for example, 142-1) of the housing 140 is greater than the thickness of the side portion (for example, 141-3) of the housing 140, it is possible to secure sufficient space to accommodate the capacitor 195 even without decreasing the diameter of the bore in the bobbin 110.

Accordingly, the embodiment is able to mount a lens having a large diameter, increase the sensitivity of the position sensor 170, and mount a capacitor having a large capacitance without increasing the size of the lens moving apparatus. As a result, it is possible to realize stable power supply to the position sensor 170 and to reliably eliminate noise from the output of the position sensor 170.

Figure 13A:
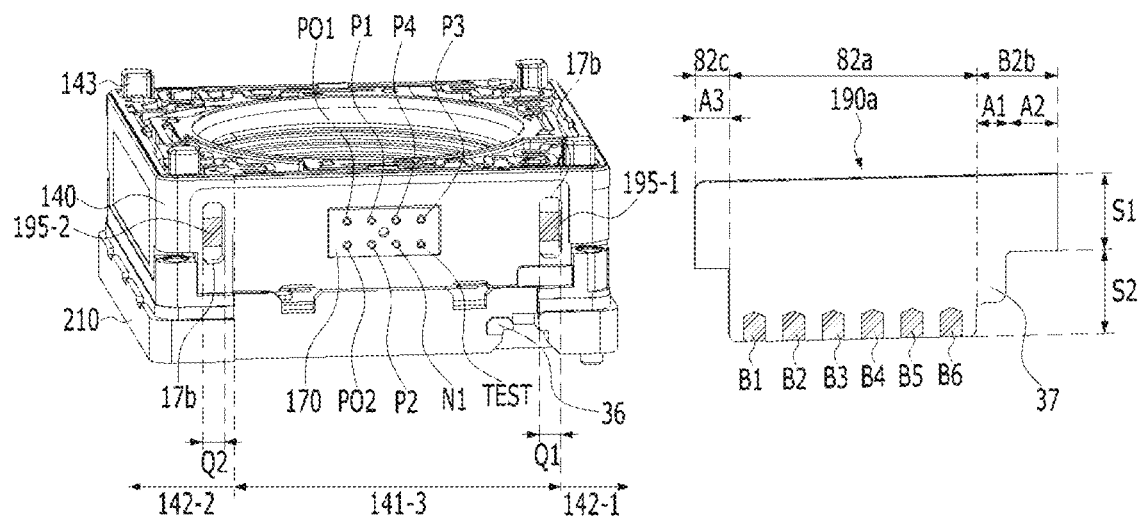
FIG. 13A is a perspective view of a lens moving apparatus according to another embodiment of the present invention.
Figure 13B:
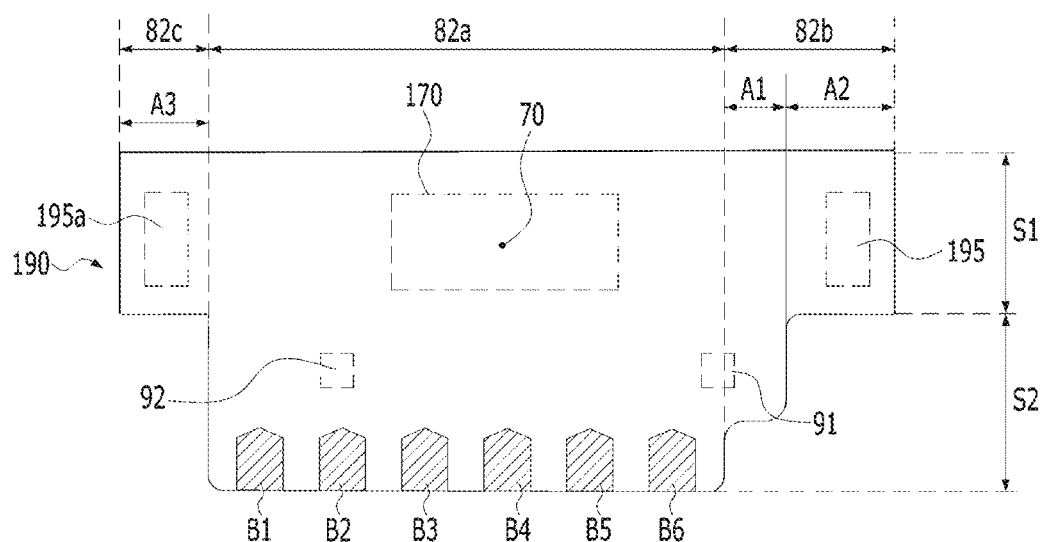
FIG. 13B illustrates the circuit board, the position sensor and the first capacitor shown in FIG. 13A.

FIG. 13A is a perspective view of a lens moving apparatus according to another embodiment of the present invention. FIG. 13B illustrates the circuit board 190a, the position sensor 170, and the first capacitor 195 shown in FIG. 13A.

The same reference numerals as those used in FIGS. 1 to 12 denote the same components, and description of the same components will be given briefly or omitted.

Although the lens moving apparatus shown in FIGS. 1 to 12 includes a single capacitor 195, the lens moving apparatus shown in FIGS. 13A and 13B may include a first capacitor 195 and a second capacitor 195a, which are disposed or mounted on the circuit board 190a. The capacitor 195 shown in FIG. 8B is represented as the "first capacitor" in FIGS. 13A and 13B, and the description of the capacitor 195 shown in FIG. 8B may be applied to the first capacitor shown in FIG. 13A.

The first capacitor 195 may be disposed on the first corner portion 142-1 of the housing 140. For example, the first capacitor 195 may be disposed in the first region Q1 of the first corner portion 142-1.

The second capacitor 195*a* may be disposed on the second corner portion 142-2 of the housing 140.

For example, the second capacitor 195*a* may be disposed in the first region Q2 of the second corner portion 142-2 of the housing 140.

Each of the thickness of the first region Q1 of the first corner portion 142-1 of the housing 140 and the thickness of the first region Q2 of the second corner portion 142-2 of the housing 140 may be greater than the thickness of the first side portion 141-1 of the housing 140.

For example, although the thickness of the first region Q1 of the first corner portion 142-1 of the housing 140 may be equal to the thickness of the first region Q2 of the second corner portion 142-2 of the housing 140, the disclosure is not limited thereto. In another embodiment, the two thicknesses may be different from each other.

Each of the first and second corner portions 142-1 and 142-2 (for example, the first regions Q1 and Q2) of the housing 140 may be provided with a second seating groove 17*b*.

The first capacitor 195 may be one of the capacitors 195 shown in FIGS. 11A and 11B, and the second capacitor 195*a* may be the other of the capacitors 195 shown in FIGS. 11A and 11B.

The circuit board 190*a* may be disposed on the first side portion 141-1, the first corner portion 142-1, and the second corner portion 142-2 of the housing 140.

The body part S1 may include a first extension A2 extending toward the first corner portion 142-1 of the housing 140 and a second extension A3 extending toward the second corner portion 142-2 of the housing 140.

For example, at least a portion of the first extension A2 may be disposed on the first corner portion 142-1 of the housing 140, and at least a portion of the second extension A3 may be disposed on the second corner portion 142-2 of the housing 140.

Although the horizontal length of the first extension A2 is greater than the horizontal length of the second extension A3 in FIG. 13B, the disclosure is not limited thereto. In another embodiment, the horizontal length of the first extension A2 may be equal to or less than the horizontal length of the second extension A3.

For example, the first capacitor 195 may be disposed on the first extension A2 of the circuit board 190*a*, and the second capacitor 195*a* may be disposed on the second extension A3 of the circuit board 190*a*.

Since the first and second capacitors 195 and 195*a* are disposed on the corner portions 142-1 and 142-2 of the housing 140, it is possible to mount a lens having a large diameter and a capacitor 195 having a large capacitance, as described above. Accordingly, it is possible to realize stable power supply to the position sensor 170 and to reliably eliminate noise from the output of the position sensor 170.

The circuit board 190*a* may also be divided into a body part 81*a*, a first extension part 82*b*, and a second extension part 82*c*. The extension part 82*b* described in FIG. 8B is represented as the first extension part in FIG. 13B, and the description of the extension part 82*b* shown in FIG. 8B may be applied to the first extension part shown in FIG. 13B.

The first extension part 82*b* may extend toward the first corner portion 142-1 of the housing 140 from one side of the body part 82*a*, and the second extension part 82*c* may extend toward the second corner portion 142-2 of the housing 140 from the other side of the body part 82*a*.

The first capacitor 195 may be disposed in a region of the extension part 82*b*.

The first extension part 82*b* may include the first extension A1 and the second extension A2.

The second extension part 82*c* may be disposed on the second corner portion 142-2 of the housing 140. For example, at least a portion of the second extension part 82*c* may be disposed on one side surface of the base 210. Furthermore, at least a portion of the second extension part 82*c* may be disposed on a portion of the third side portion 141-3 of the housing 140.

One of the first and second capacitors 195 and 195*a* may be connected in parallel to the first and second outer terminals B1 and B2 of the circuit board 190. Accordingly, it is possible to eliminate ripple components contained in power voltages (for example, VDD and VSS) supplied to the position sensor 170 from the outside and to supply a stable and constant power signal to the position sensor 170.

Furthermore, the other of the first and second capacitors 195 and 195*a* may be connected both to the output terminal N1 of the position sensor 170 and to the second outer terminal B2 of the circuit board 190. Accordingly, it is possible to eliminate high-frequency noise components, introduced from the outside, from the output of the position sensor 170.

Figure 14:
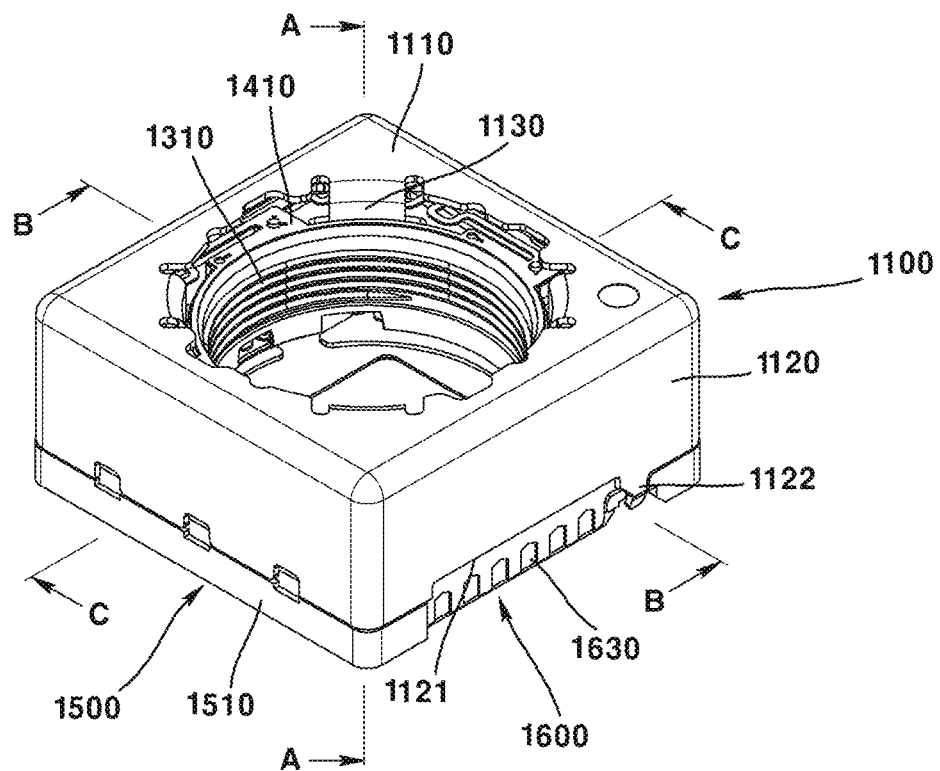
FIG. 14 is a perspective view of a lens moving apparatus according to another embodiment of the present invention.
Figure 15:
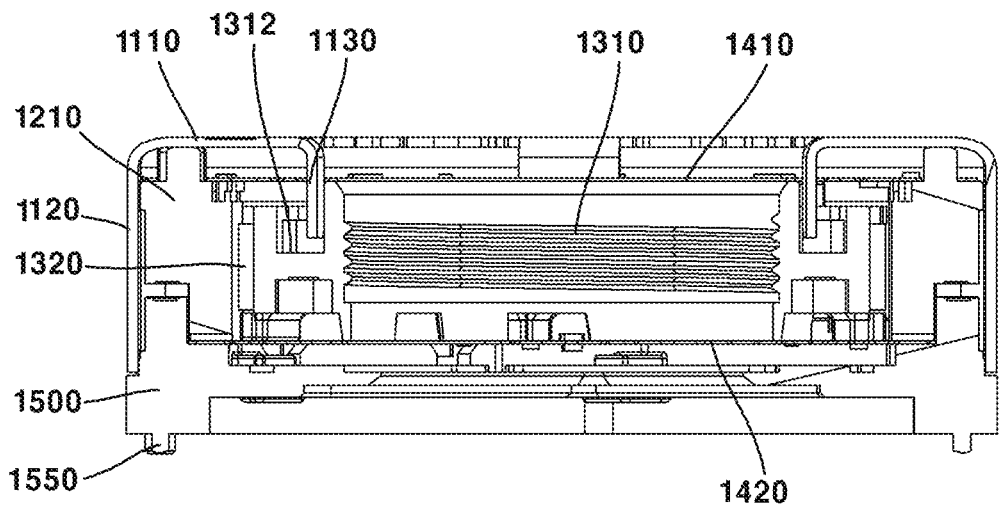
FIG. 15 is a cross-sectional view taken along line A-A in FIG. 14.
Figure 16:
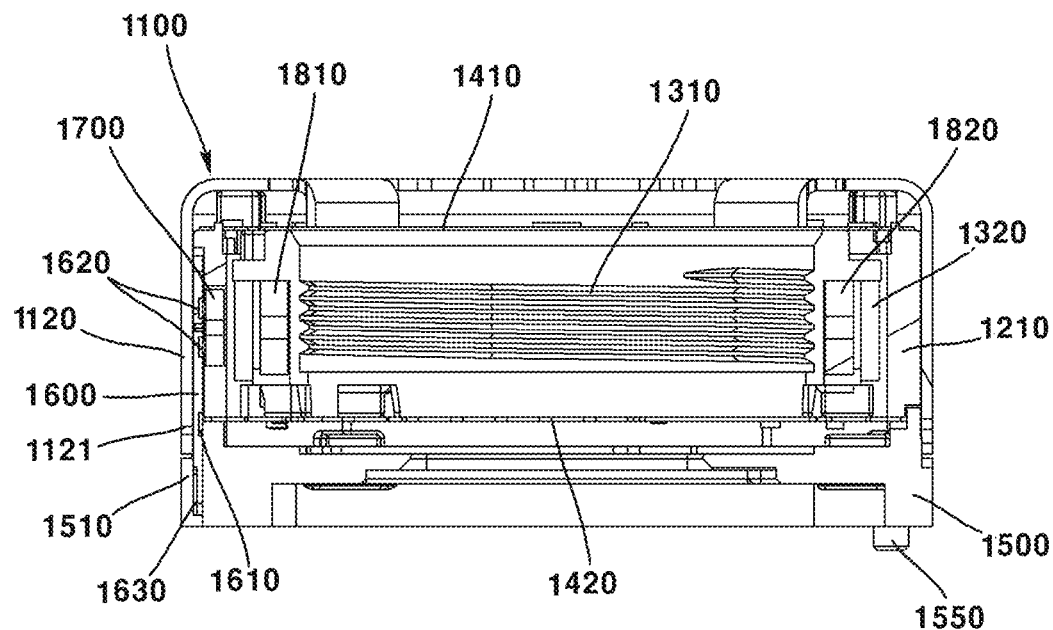
FIG. 16 is a cross-sectional view taken along line B-B in FIG. 14.
Figure 17:
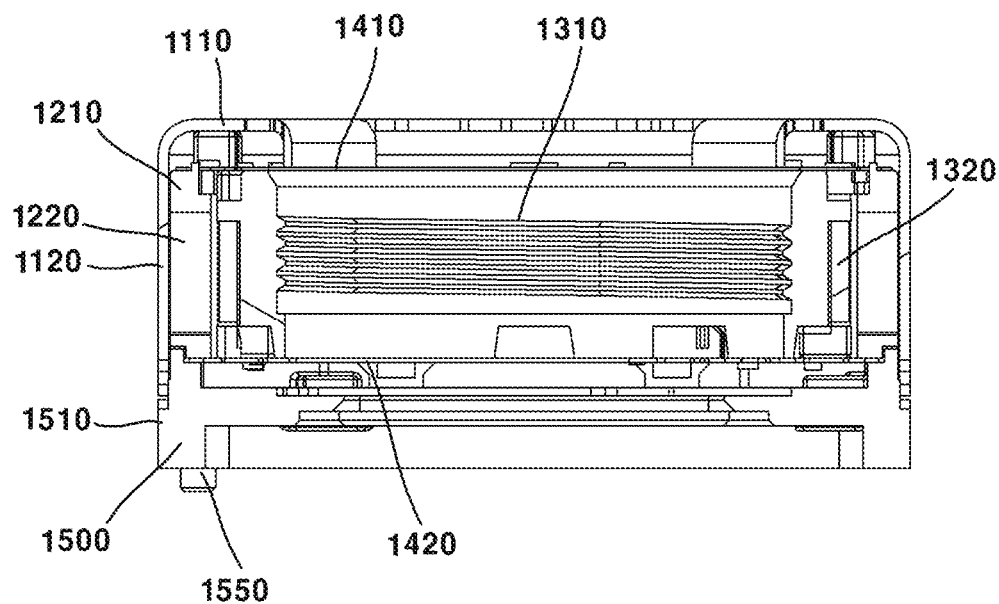
FIG. 17 is a cross-sectional view taken along line C-C in FIG. 14.
Figure 18:
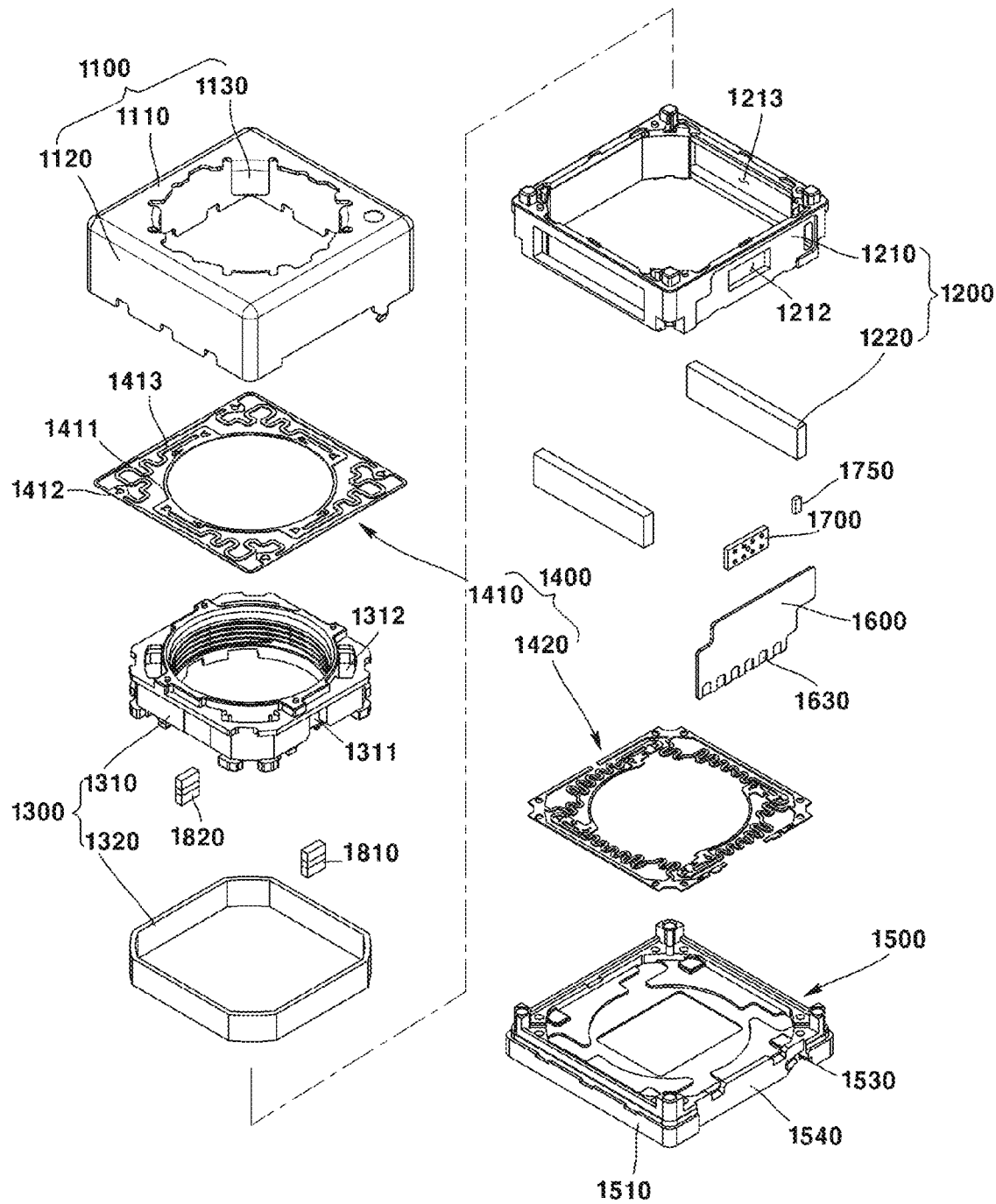
FIG. 18 is an exploded perspective view of the lens moving apparatus shown in FIG. 14.
Figure 19:
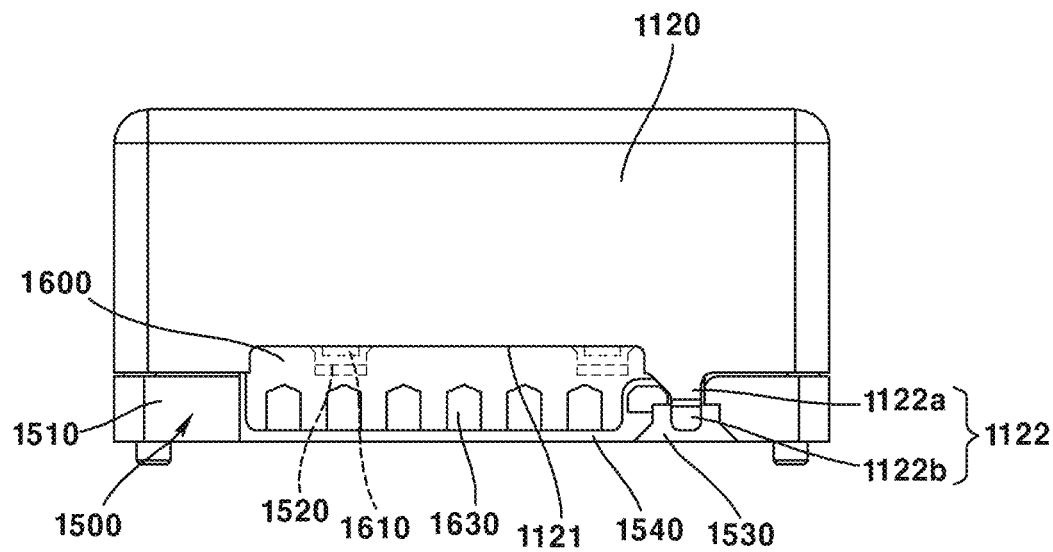
FIG. 19 is a side view of the lens moving apparatus shown in FIG. 14.
Figure 20:
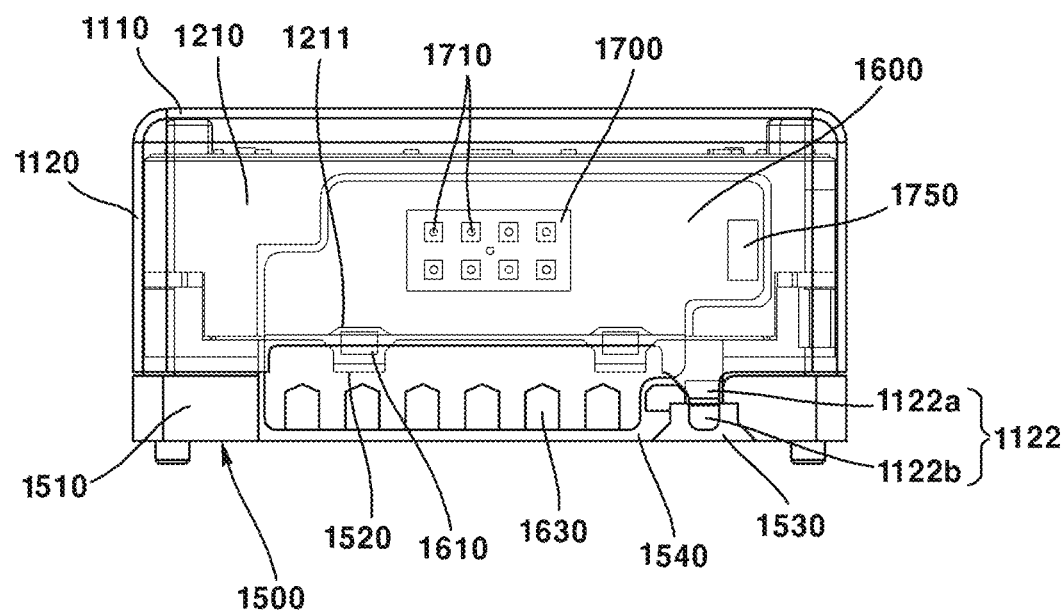
FIG. 20 is a transparent view of FIG. 19.
Figure 21:
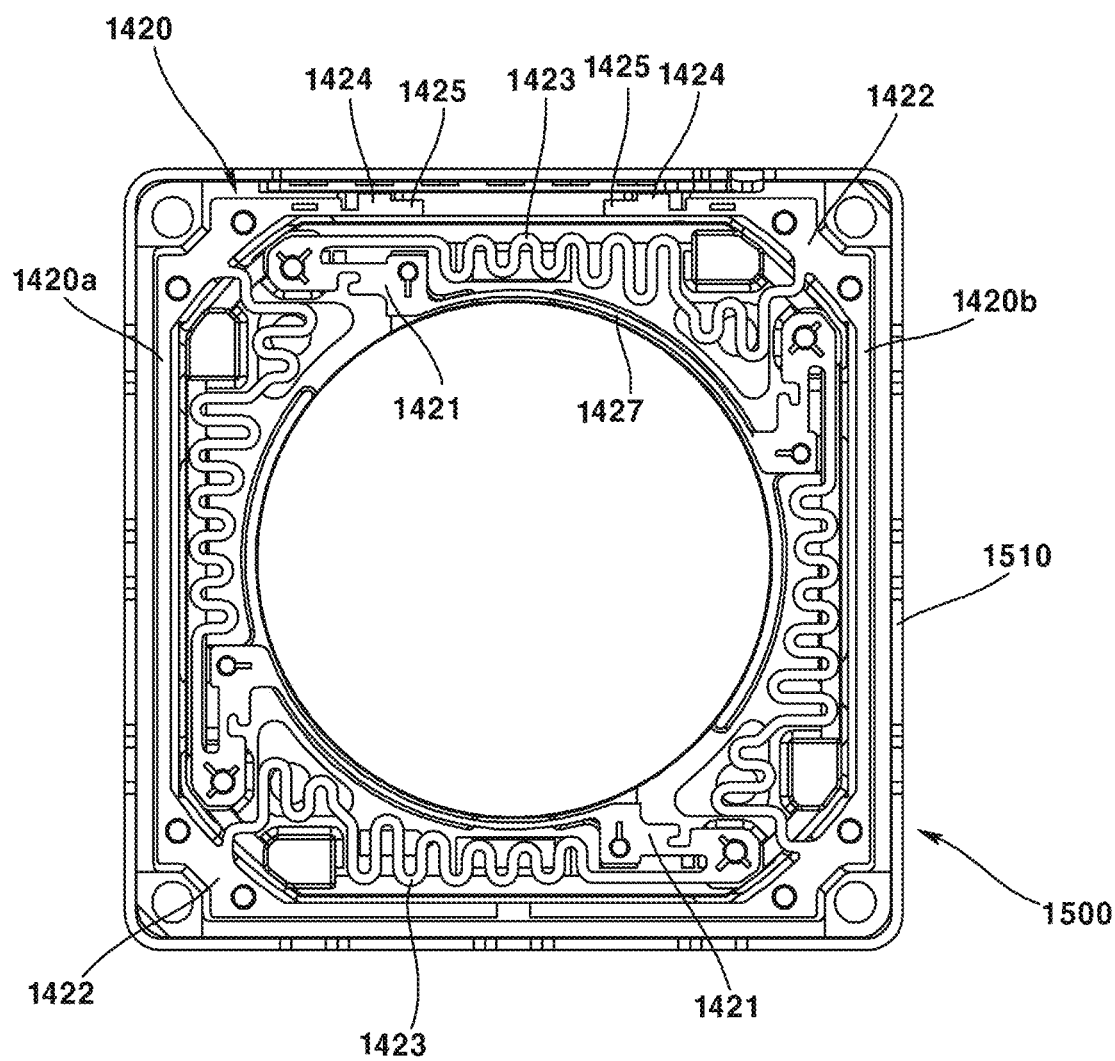
FIG. 21 is a plan view illustrating some components of the lens moving apparatus shown in FIG. 14.
Figure 22:
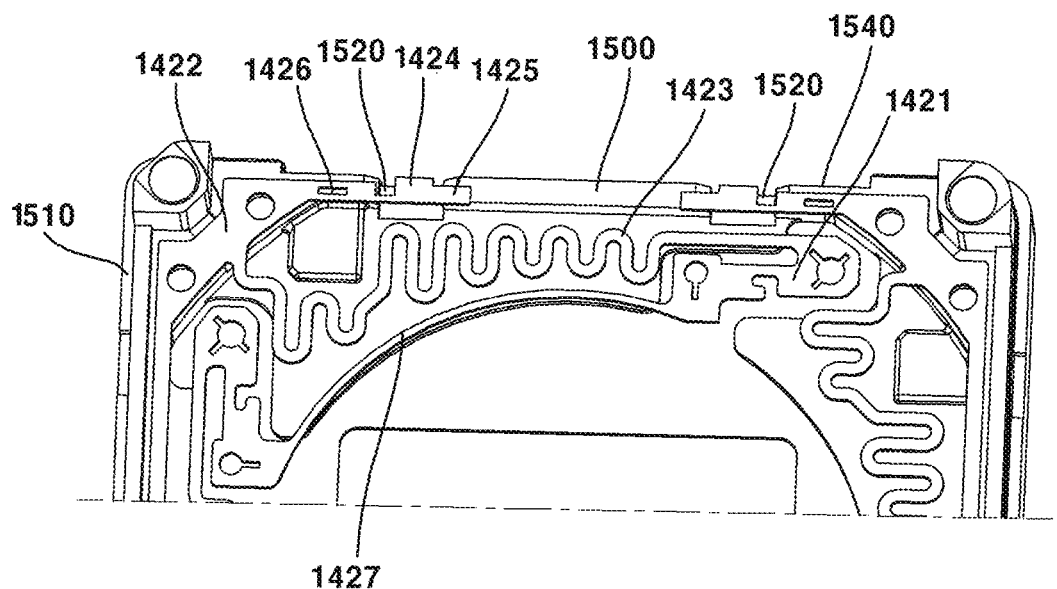
FIG. 22 is a perspective view illustrating some components of the lens moving apparatus shown in FIG. 14.
Figure 23:
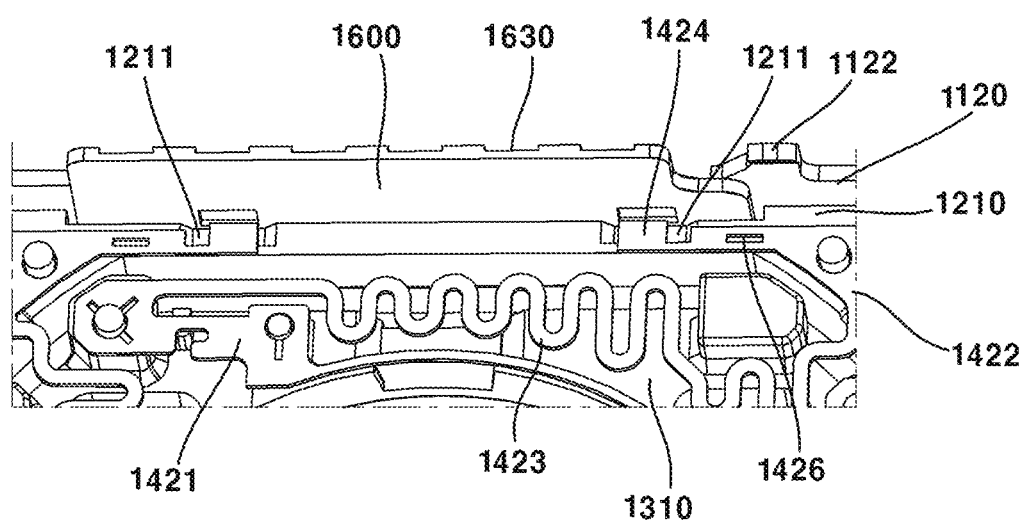
FIG. 23 is a bottom perspective view illustrating some components of a lens moving apparatus according to a modification of the present invention.
Figure 24:
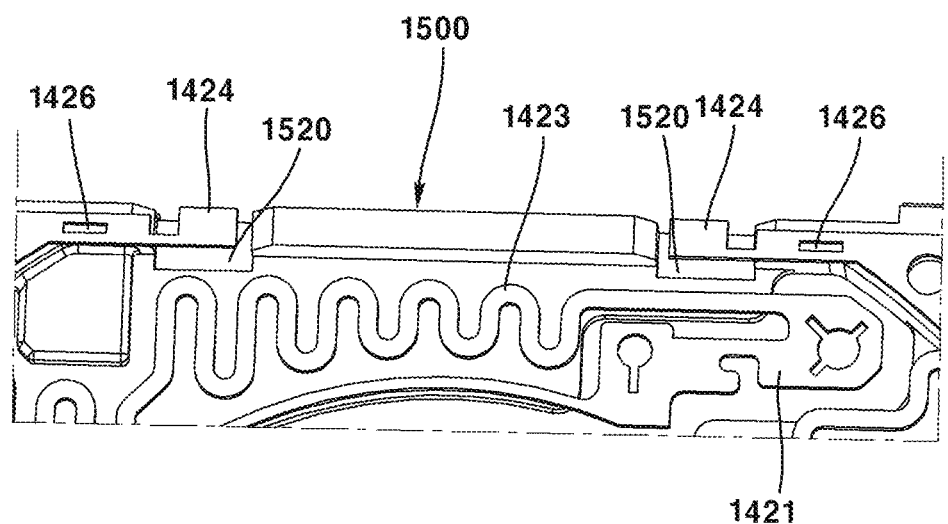
FIG. 24 is a perspective illustrating some components of the lens moving apparatus according to the embodiment of the present invention.
Figure 25:
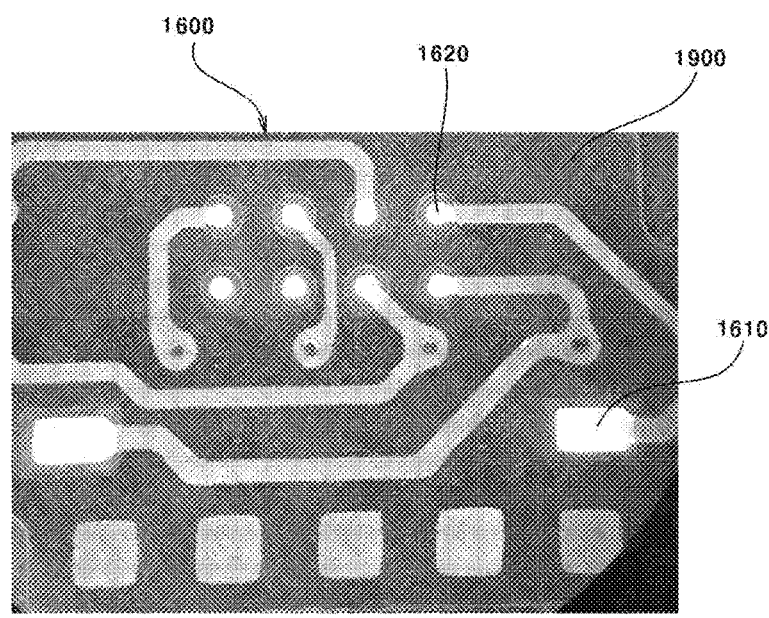
FIG. 25 is a photograph showing a portion of the inner surface of the circuit board of the lens moving apparatus according to the embodiment of the present invention.
Figure 26:
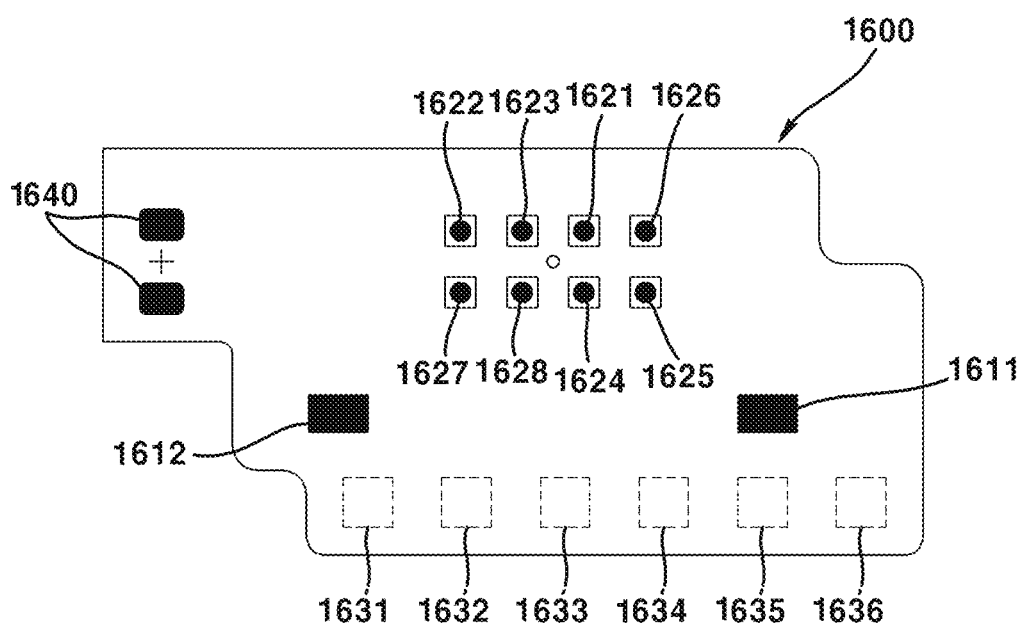
FIG. 26 is a view illustrating the circuit board of the lens moving apparatus according to the embodiment of the present invention.

FIG. 14 is a perspective view of a lens moving apparatus according to another embodiment of the present invention. FIG. 15 is a cross-sectional view taken along line A-A in FIG. 14. FIG. 16 is a cross-sectional view taken along line B-B in FIG. 14. FIG. 17 is a cross-sectional view taken along line C-C in FIG. 14. FIG. 18 is an exploded perspective view of the lens moving apparatus shown in FIG. 14. FIG. 19 is a side view of the lens moving apparatus shown in FIG. 14. FIG. 20 is a transparent view of FIG. 19. FIG. 21 is a plan view illustrating some components of the lens moving apparatus shown in FIG. 14. FIG. 22 is a perspective view illustrating some components of the lens moving apparatus shown in FIG. 14. FIG. 23 is a bottom perspective view illustrating some components of a lens moving apparatus according to a modification of the present invention. FIG. 24 is a perspective illustrating some components of the lens moving apparatus according to the embodiment of the present invention. FIG. 25 is a photograph showing a portion of the inner surface of the circuit board of the lens moving apparatus according to the embodiment of the present invention. FIG. 26 is a view illustrating the circuit board of the lens moving apparatus according to the embodiment of the present invention.

The lens moving apparatus may be a voice coil motor (VCM). The lens moving apparatus may be a lens moving motor. The lens moving apparatus may be a lens moving actuator. The lens moving apparatus may include an AF module. In a modification, the lens moving apparatus may include an OIS module.

The lens moving apparatus according to the embodiment of the present invention may include a structure capable of overcoming the problem in which heat loss must be minimized in an automated soldering or halogen operation using hot air and there is difficulty in the soldering, because a cover 1100 is in contact with the circuit board 1600. The embodiment may provide an escape groove in the cover 1100 at which the lower elastic member 1420 is soldered to the circuit board 1600 in order to inhibit heat loss.

The lens moving apparatus may include the cover 1100. The cover 1100 may include a 'cover can'. The cover 1100 may include a 'yoke'. The cover 1100 may be disposed so as to surround a portion of the housing 1210. The cover 1100 may be coupled to the base 1500. The cover 1100 may accommodate therein the housing 1210. The cover 1100 may define the appearance of the lens moving apparatus. The cover 1100 may be configured to have a hexahedral shape, which is open at the lower surface thereof. The cover 1100 may be a nonmagnetic body. The cover 1100 may be made of a metal material. The cover 1100 may be embodied as a metal plate. The cover 1100 may block electromagnetic interference (EMI). Here, the cover 1100 may be referred to as an 'EMI shield can'.

The cover 1100 may include an upper plate 1110 and a side plate 1120. The cover 1100 may include the upper plate 1110, having therein a bore, and the side plate 1120 extending downwards from the outer periphery or the edge of the upper plate 1110. The upper plate 1110 of the cover 1100 may be disposed above the bobbin 1310. The lower end of the side plate 1120 of the cover 1100 may be disposed on a stepped portion 1510 of the base 1500. The inner surface of the side plate 1120 of the cover 1100 may be fixed to the base 1500 using an adhesive. The description of the upper plate 1110 and the side plate 1120 of the cover 1100 may also be applied to the cover member 300 shown in FIGS. 1 and 2, with or without modification.

The cover 1100 may have therein a groove 1121. The groove 1121 may be formed in the lower end of the side plate 1120 of the cover 1100. The groove 1121 may be formed at a position corresponding to a terminal 1610 of the circuit board 1600 such that at least a portion of the terminal 1610 of the circuit board 1600 does not overlap the side plate 1120 of the cover 1100. The groove 1121 may be formed in the lower end of the side plate 1120 of the cover 1100 such that at least a portion of the terminal 1610 of the circuit board 1600 is disposed under the side plate 1120 of the cover 1100. The groove 1121 may be formed such that at least a portion of the terminal 1610 of the circuit board 1600 does not overlap the side plate 1120 of the cover in a direction perpendicular to the optical axis. Here, the direction perpendicular to the optical axis may be the x-axis direction in an X-Y-Z coordinate system. In other words, the groove 1121 may be an escape groove through which an overlapping portion between the circuit board 1600 and the terminal 1610 is avoided. The embodiment is able to minimize a phenomenon in which heat loss occurs through the cover 1100 in a soldering procedure between the terminal 1610 of the circuit board 1600 and a terminal portion of the lower elastic member 1420. The reason why the escape groove is formed from the soldering surface to the opposite surface is to improve soldering by allowing solder formation under the escape groove. Furthermore, there is an advantage in that sealing for inhibiting the entry of contaminants is more easily realized in the escape groove of the cover 1100 than in a straight portion of the cover 1100.

The description of the groove 1121 in the cover 1100 may be applied to the cover member 300 shown in FIGS. 1 and 2, with or without modification.

The cover 1100 may include a projection 1122. The projection 1122 may extend from the lower end of the side plate 1120 of the cover 1100 to a height corresponding to the lower end of the circuit board 1600. Here, the projection 1122 may be directly coupled to a printed circuit board disposed under the base 1500. The projection 1122 may be coupled to the printed circuit board through soldering. Consequently, the cover 1100 may be grounded. The projection 1122 of the side plate 1120 of the cover 1100 may include a first portion 1122a having, a width that decreases downwards, and a second portion 1122b, which is disposed under the first portion 1122a, is inclined inwards moving downwards, and is disposed in a third groove 1530 in the base 1500. The second portion 1122b of the projection 1122 may include a sloped surface. The projection 1122 may be configured such that a portion thereof is bent so as to have a slope different from the slope of the remaining portion.

The description of the projection 1122 of the cover 1100 may be applied to the cover member 300 shown in FIGS. 1 and 2, with or without modification.

The cover 1100 may include an inner yoke 1130. The inner yoke 1130 may extend downwards from the inner periphery of the upper plate 1110 of the cover 1100. At least a portion of the inner yoke 1130 may be disposed in a second groove 1312 in the bobbin 1310. Accordingly, the inner yoke 1130 is capable of inhibiting rotation of the bobbin 1310.

The description of the inner yoke 1130 of the cover 1100 may be applied to the cover member 300 shown in FIGS. 1 and 2, with or without modification, and the description of the second groove 1312 in the bobbin 1310 may be applied to the bobbin 110 shown in FIG. 4A, with or without modification.

The lens moving apparatus may include a housing 1210. The housing 1210 may be disposed so as to surround at least a portion of the bobbin 1310. The housing 1210 may accommodate therein at least a portion of the bobbin 1310. The housing 1210 may be disposed between the cover 1100 and the bobbin 1310. The housing 1210 may be made of a material different from that of the cover 1100. The housing 1210 may be made of an insulation material. The housing 1210 may be injection-molded. The outer surface of the housing 1210 may be in contact with the inner surface of the side plate 1120 of the cover 1100. First magnets 1220 may be disposed on the housing 1210. The housing 1210 may be coupled to the first magnets 1220 using an adhesive. An upper elastic member 1410 may be coupled to the upper portion or the upper surface of the housing 1210. The lower elastic member 1420 may be coupled to the lower portion or the lower surface of the housing 1210. The housing 1210 may be coupled to the elastic member 1400 using thermal fusion and/or an adhesive. The adhesive that is used to couple the housing 1210 to the first magnets 1220 and the housing 1210 to the elastic member 1400 may be epoxy, which is hardened by at least one of ultraviolet (UV) radiation, heat, and laser radiation.

The housing 1210 may include a plurality of side walls. The housing 1210 may include four side walls. The housing 1210 may include a first side wall, a second side wall disposed opposite the first side wall, and third and fourth side walls, which are disposed between the first and second side walls and are disposed opposite each other.

The housing 1210 may include a second groove 1211. The second groove 1211 may be formed in a side wall of the housing 1210. The second groove 1211 may be formed in the first side wall of the housing 1210. The second groove 1211 may be formed in the lower surface of the housing 1210 at a position corresponding to a terminal portion 1424. The second groove 1211 may be provided with a solder ball for connecting the terminal portion of the lower elastic member 1420 to the terminal 1610 of the circuit board 1600.

The housing 1210 may include a first hole 1212. The first hole 1212 may be formed in a side wall of the housing 1210. The first hole 1212 may be formed in the first side wall of the housing 1210. The first hole 1212 may be formed through the side wall of the housing 1210 in a direction perpendicular to the optical axis. A driver IC 1700 may be disposed in the first hole 1212.

The housing 1210 may include second holes 1213. The second holes 1213 may be formed in side walls of the housing 1210. The second holes 1213 may be respectively formed in the third and fourth side walls of the housing 1210. The first magnets 1220 may be disposed in the second holes 1213. The housing 1210 may include projections for supporting the inner surfaces of the first magnets 1220 disposed in the second holes 1213. Accordingly, the outer surfaces of the first magnets 1220 disposed in the second holes 1213 in the housing 1210 may be fixed to the side plate 1120 of the cover 1100, and the inner surfaces of the first magnets 1220 may be fixed to the projection of the housing 1210. The upper surfaces, the lower surfaces and the side surfaces of the first magnets 1220 may be fixed to surfaces of the second holes 1213 in the housing 1210. In the embodiment, the second holes 1213 may not be formed in the first and second side walls of the housing 1210.

The lens moving apparatus may include the first magnets 1220. The first magnets 1220 may be disposed on the housing 1210. The first magnets 1220 may be fixed to the housing 1210 using an adhesive. The first magnets 1220 may be disposed between the bobbin 1310 and the housing 1210. The first magnets 1220 may face a coil 1320. The first magnets 1220 may electromagnetically interact with the coil 1320. The first magnets 1220 may be disposed on the side walls of the housing 1210. The first magnets 1220 may not be disposed on the first and second side walls of the housing 1210. In other words, the first magnets 1220 may be disposed only at the third and fourth side walls of the housing 1210. Accordingly, the magnetic field interference between the first magnets 1220 and the second and third magnets 1810 and 1820 may be minimized. Each of the first magnets 1220 may be a flat magnet having a flat plate shape. In a modification, the first magnets 1220 may be disposed on the corner portions of the housing 1210. In this case, each of the first magnets 1220 may be a corner magnet having a hexahedral shape in which the inner side surface thereof is larger than the outer side surface thereof.

The lens moving apparatus may include the bobbin 1310. The bobbin 1310 may be disposed inside the housing 1210. The bobbin 1310 may be disposed in the bore in the housing 1210. The bobbin 1310 may be movably coupled to the housing 1210. The bobbin 1310 may be moved relative to the housing 1210 in the optical-axis direction. A lens may be coupled to the bobbin 1310. The bobbin 1310 may have a bore formed therethrough in the optical-axis direction. A lens may be disposed in the bore in the bobbin 1310. The lens may be coupled to the bobbin 1310 by means of threaded coupling and/or an adhesive. The coil 1320 may be coupled to the bobbin 1310. The upper elastic member 1410 may be coupled to the upper portion or the upper surface of the bobbin 1310. The lower elastic member 1420 may be coupled to the lower portion or the lower surface of the bobbin 1310. The bobbin 1310 may be coupled to the elastic member 1400 by means of thermal fusion and/or an adhesive. The adhesive that serves to couple the lens to the bobbin 1310 and the elastic member 1400 to the bobbin 1310 may be epoxy, which is hardened by at least one of ultraviolet (UV) radiation, heat, and laser radiation.

The bobbin 1310 may include a first groove 1311. The first groove 1311 may be formed in the side surface of the bobbin 1310. A second magnet 1810 may be disposed in the first groove 1311. The first groove 1311 may be formed to have a shape corresponding to the shape of the second magnet 1810. The bobbin 1310 may include a groove that is formed in the side opposite the first groove 1311 and in which a third magnet 1820 is disposed.

The bobbin 1310 may include a second groove 1312. The second groove 1312 may be formed in the upper surface of the bobbin 1310. At least a portion of the inner yoke 1130 may be disposed in the second groove 1312. Accordingly, when the bobbin 1310 tries to rotate, the inner yoke 1130 disposed in the second groove 1312 is engaged with the bobbin 1310, thereby inhibiting the rotation of the bobbin 1310.

The lens moving apparatus may include the coil 1320. The coil 1320 may be an 'AF moving coil', which is used to perform an AF operation. The coil 1320 may be disposed on the bobbin 1310. The coil 1320 may be disposed between the bobbin 1310 and the housing 1210. The coil 1320 may be disposed on the outer surface of the outer peripheral surface of the bobbin 1310. The coil 1320 may be wound around the bobbin 1310. Alternatively, the coil 1320 may be wound therearound, and may then be coupled to the bobbin 1310. The coil 1320 may face the first magnets 1220. The coil 1320 may be disposed so as to face the first magnets 1220. The coil 1320 may electromagnetically interact with the first magnets 1220. Here, when current flows in the coil 1320 and thus an electromagnetic field is generated around the coil 1320, the coil 1320 may be moved relative to the first magnets 1220 by virtue of the electromagnetic interaction between the coil 1320 and the first magnets 1220. The coil 1320 may be composed of a single coil. Alternatively, the coil 1320 may be composed of a plurality of coils, which are spaced apart from each other. The coil 1320 may be conductively connected to an inner portion 1421 of the lower elastic member 1420, and may be conductively connected via a connector 1423 to the circuit board 1600, on which a driver IC 1700 is mounted.

The coil 1320 may be conductively connected to the circuit board 1600 via the lower elastic member 1420. The coil 1320 may include a pair of lead wires for the supply of power. Here, the first end (lead wire) of the coil 1320 may be connected to a first lower elastic unit 1420a. The second end (lead wire) of the coil 1320 may be connected to a second lower elastic unit 1420b. The first and second lower elastic units 1420a and 1420b may be connected to the circuit board 1600, on which the driver IC 1700 is mounted. Accordingly, the driver IC 1700 may be conductively connected to the coil 1320. The coil 1320 may receive current under the control of the driver IC 1700.

The lens moving apparatus may include the elastic member 1400. The elastic member 1400 may be coupled both to the bobbin 1310 and to the housing 1210. The elastic member 1400 may elastically support the bobbin 1310. At least a portion of the elastic member 1400 may have elasticity. The elastic member 1400 may movably support the bobbin 1310. The elastic member 1400 may support movement of the bobbin 1310 during an AF operation. Here, the elastic member may be referred to as a 'support member'.

The lens moving apparatus may include the upper elastic member 1410. The upper elastic member 1410 may be coupled both to the upper portion or the upper surface of the bobbin 1310 and to the upper portion or the upper surface of the housing 1210. The upper elastic member 1410 may be embodied as a leaf spring. The upper elastic member 1410 may be integrally formed.

The upper elastic member 1410 may include an inner portion 1411 coupled to the upper portion or the upper surface of the bobbin 1310, an outer portion 1412 coupled to the upper portion or the upper surface of the housing 1210, and a connector 1413 connecting the inner portion 1411 to the outer portion 1412.

The lens moving apparatus may include the lower elastic member 1420. The lower elastic member 1420 may be coupled both to the lower portion or the lower surface of the bobbin 1310 and to the lower portion or the lower surface of the housing 1210. The lower elastic member 1420 may be embodied as a leaf spring. The lower elastic member 1420 may include a spring.

The lower elastic member 1420 may include a plurality of lower elastic units. The lower elastic member 1420 may include two lower elastic units. The lower elastic member 1420 may include first and second lower elastic units 1420a and 1420b, which are spaced apart from each other. The first lower elastic unit 1420a may be connected both to the first end of the coil 1320 and to a first terminal 1511 of the circuit board 1600, and the second lower elastic unit 1420b may be connected both to the second end of the coil 1320 and to a second terminal 1612 of the circuit board 1600.

The lower elastic member 1420 may include an inner portion 1421 coupled to the lower portion or the lower surface of the bobbin 1310, an outer portion 1422 coupled to the lower portion or the lower surface of the housing 1210, a connector 1423 connecting the inner portion 1421 to the outer portion 1422, a terminal portion 1424 extending from the outer portion 1422, and an extending portion 1425 extending from the terminal portion 1424 in a direction opposite the outer portion 1422. Here, the portion connecting the outer portion 1422 to the terminal portion 1424 may have a width less than the width of the outer portion 1422. This portion may be referred to as an extending portion. The width of the terminal portion 1424 may be greater than the width of the outer portion 1422. The width of the extending portion 1425 may be equal to the width of the outer portion 1422.

In this embodiment, the lower elastic member 1420 may include four inner portions 1421. The lower elastic member 1420 may include an inner connector 1427 connecting two inner portions 1421 to each other. The inner connector 1427 may connect the inner portions 1421 to each other. In order to connect a total of four inner portions 1421, two inner connectors 1427 may be provided such that each of the inner connectors 1427 connects two inner portions 1421 to each other. In this embodiment, each of the inner connectors 1427 enables the path between the portion of the lower elastic member 1420, to which the coil 1320 is connected, and the terminal portion 1424 to serve as a parallel resistance, thereby reducing current loss compared to the case in which there is no inner connector.

The outer portion 1422 may be coupled to the upper portion or the upper surface of the base 1500. The outer portion 1422 may be held between the housing 1210 and the base 1500. The outer portion 1422 may be disposed both on the upper surface of the base 1500 and on the lower surface of the housing 1210. The outer portion 1422 may be in contact both with the upper surface of the base 1500 and with the lower surface of the housing 1210. The extending portion 1425 may be disposed both on the upper surface of the base 1500 and on the lower surface of the housing 1210. The extending portion 1425 may be in contact both with the upper surface of the base 1500 and with the lower surface of the housing 1210. In this embodiment, since the extending portion 1425 is held between the upper surface of the base 1500 and the lower surface of the housing 1210, it is possible to inhibit a portion such as the terminal portion 1424 from breaking. The connector 1423 may include a leg spring.

The description of the inner portion 1421, the outer portion 1422, the connector 1423, and the terminal portion 1424 of the lower elastic member 1420 may be applied to the second inner frames 161-1 and 161-2, the second outer frames 162-1 and 162-2, the second frame connectors 163-1 and 163-2, and the first and second bonding portions 62a and 62b of the lower elastic member 160 shown in FIG. 7, with or without modification.

The lower elastic member 1420 may include the terminal portion 1424. The terminal portion 1424 may project from the outer portion 1422. The terminal portion 1424 may be connected to the terminal 1610 of the circuit board 1600. The terminal portion 1424 may be connected to the terminal 1610 of the circuit board 1600 through soldering. In this embodiment, since heat loss through the cover 1100 is minimized even when soldering is performed using hot air, it is possible to inhibit a cold solder phenomenon. The terminal portion 1424 may be disposed between the housing 1210 and the base 1500. The terminal portion 1424 may be disposed between the lower surface of the housing 1210 and the upper surface of the base 1500. The terminal portion 1424 may be disposed on the boundary between the housing 1210 and the base 1500.

In this embodiment, the terminal portion 1424 of the lower elastic member 1420 may overlap the side plate 1120 of the cover 1100 in a direction perpendicular to the optical axis. Here, the direction perpendicular to the optical axis may be the x-axis direction in an X-Y-Z coordinate system. At least a portion of the terminal 1610 of the circuit board 1600 that is disposed under the terminal portion 1424 may not overlap the side plate 1120 of the cover 1100 in a direction perpendicular to the optical axis. In the corresponding area (the area overlapping in a direction perpendicular to the optical axis), the lower end of the side plate 1120 of the cover 1100 may be disposed higher than the lower end of the terminal 1610 of the circuit board 1600, and may be disposed lower than the terminal portion 1424 of the lower elastic member 1420. Accordingly, in the corresponding area, the lower end of the side plate 1120 of the cover 110 may be disposed lower than the boundary between the housing 1210 and the base 1500. In a modification, in the corresponding area, the lower end of the side plate 1120 of the cover 1100 may be disposed on a height corresponding to the boundary between the housing 1210 and the base 1500. In the corresponding area, the lower end of the side plate 1120 of the cover 1100 may be disposed on a height corresponding to the terminal portion 1424 of the lower elastic member 1420. In this embodiment, a portion of the soldering portion overlaps the groove 1121 in the cover 1100, thereby minimizing heat loss during a soldering operation.

In this embodiment, in the case in which the groove 1121 in the side plate 1120 of the cover 1100 is formed so deeply that there is no portion overlapping the terminal 1610 of the circuit board 1600, it may be difficult to form a seal between the side plate 1120 of the cover 1100 and the circuit board 1600. In this case, because the surface area of the side plate 1120 of the cover 1100 is reduced, high-frequency noise components may be further worsened. Accordingly, it is preferable that the groove 1121 in the side plate 1120 of the cover 1100 overlap a portion of the terminal 1610 of the circuit board 1600 in a horizontal direction.

The description of the terminal portion 1424 of the lower elastic member 1420, the groove 1121 and the side plate 1120 of the cover 1100, and the terminal 1610 of the circuit board 1600 may be applied to the first and second bonding portions 62a and 62b of the lower elastic member 160, the groove and the side plate of the cover member 300, and the first and second terminals 91 and 92 of the circuit board 190, with or without modification.

The terminal portion 1424 of the lower elastic member 1420 may be disposed on the upper portion of the terminal 1610 of the circuit board 1600. Here, the amount of the solder ball connecting the terminal portion 1424 of the lower elastic member 1420 to the terminal 1610 of the circuit board 1600 may be larger above the terminal portion 1424 of the lower elastic member 1420 than under the terminal portion 1424 of the lower elastic member 1420. A first groove 1520 in the base 1500, which accommodates the solder ball, may have a depth deeper than the depth of the second groove 1211 in the housing 1210. In a modification, the terminal portion 1424 of the lower elastic member 1420 may be disposed on the center of the terminal 1610 of the circuit board 1600, or under the terminal 1610.

The housing 140 shown in FIGS. 5A and 5B may have a groove corresponding to the second groove 1211 in the housing 1210, and the description of the second groove 1211 in the housing 1210 may be applied to the housing 140 shown in FIGS. 5A and 5B, with or without modification.

Furthermore, the description of the disposition of the terminal portion 1424 of the lower elastic member 1420 and the terminals of the circuit board 160, of the disposition of the solder ball, and of the depths of the first groove 1520 and the second groove 1211 in the housing 140 may be applied to the soldering between the first and second bonding portions 62a and 62b and the first and second terminals 91 and 92 of the circuit board 190, the grooves 22a and 22b in the base 210, and the groove in the housing 140 corresponding to the second groove 1211 in the embodiment shown in FIGS. 1 to 13B, with or without modification.

The lower elastic member 1420 may therein have a hole 1426. The hole 1426 may be formed in the outer portion 1422 of the lower elastic member 1420. An adhesive may be disposed in the hole 1426. The adhesive enables the lower elastic member 1420 to be more securely fixed to the base 1500 and the housing 1210 through the hole 1426.

The lower elastic member 160 shown in FIG. 7 may have a hole corresponding to the hole 1426 in the lower elastic member 1420 shown in FIG. 23, and the description of the hole 1426 in the lower elastic member 1420 may be applied to the lower elastic member 160 shown in FIG. 7, with or without modification.

The lens moving apparatus may include the base 1500. The base 1500 may be disposed under the housing 1210. The base 1500 may be disposed under the bobbin 1310. The base 1500 may be coupled to the cover 1100. The base 1500 may be disposed on the printed circuit board.

The base 1500 may include the stepped portion 1510. The stepped portion 1510 may project from the side surface of the base 1500. The stepped portion 1510 may support the lower end of the side plate 1120 of the cover 1100. The stepped portion 1510 may be peripherally formed along the side surface of the base 1500. The stepped portion 1510 may be omitted in a portion of the side surface of the base 1500. The portion of the side surface may have a fourth groove 1540. The circuit board 1600 may be disposed in the fourth groove 1540 in the base 1500. The fourth groove 1540 in the base 1500 may be formed so as to have a depth corresponding to the thickness of the circuit board 1600. The fourth groove 1540 may be formed so as to have a shape corresponding to the shape of the circuit board 1600.

The base 1500 may have therein the first groove 1520. The first groove 1520 may be formed at a position on the upper surface of the base 1500 corresponding to the terminal portion 1424. A solder ball for connecting the terminal portion 1424 of the lower elastic member 1420 to the terminal 1610 of the circuit board 1600 may be disposed in the first groove 1520.

The base 1500 may have therein the third groove 1530. The third groove 1530 may be formed at a position on the side surface of the base 1500 corresponding to the projection 1122 on the side plate 1120 of the cover 1100. The third groove 1530 may receive at least a portion of the projection 1122 on the side plate 1120 of the cover 1100. A solder ball for connecting the projection 1122 on the cover 1100 to the printed circuit board may be disposed in the third groove 1530.

The base 210 shown in FIG. 8A may have a groove corresponding to the third groove 1530 in the base 1500 shown in FIGS. 18 and 19, and the description of the third groove 1530 in the base 1500 may be applied to the base 210 shown in FIG. 8A, with or without modification.

The base 1500 may have therein the fourth groove 1540. The circuit board 1600 may be disposed in the fourth groove 1540. The fourth groove 1540 may be formed to a depth corresponding to the thickness of the circuit board 1600. The fourth groove 1540 may be formed so as to have a shape corresponding to the shape of the circuit board 1600.

The base 1500 may include a protrusion 1550. The protrusion 1550 may be formed on the lower surface of the base 1500. The protrusion 1550 may be fitted into a groove or hole in the printed circuit board. The protrusion 1550 may have a cylindrical shape. The protrusion 1550 may be disposed in the corresponding groove or hole in the printed circuit board so as to fix the base 1500 to the printed circuit board.

The base 210 shown in FIGS. 9B and 9C may include a protrusion corresponding to the protrusion 1550 of the base 1500 shown in FIG. 17, and the description of the protrusion 1550 of the base 1500 shown in FIG. 17 may be applied to the base 210 shown in FIGS. 9B and 9C, with or without modification.

The lens moving apparatus may include the circuit board 1600. The circuit board 1600 may include a printed circuit board (PCB). The circuit board 1600 may include a flexible printed circuit board (FPCB). The circuit board 1600 may be disposed between the side surface of the housing 1210 and the side plate 1120 of the cover 1100. The circuit board 1600 may be disposed on the side plate 1120 of the cover 1100. The circuit board 1600 may be disposed on the housing 1210. The circuit board 1600 may be disposed on the base 1500. The outer surface of the circuit board 1600 may be in contact with the inner surface of the side plate 1120 of the cover 1100. The inner surface of the circuit board 1600 may be in contact with the side surface of the housing 1210 and/or the side surface of the base 1500. The driver IC 1700 may be disposed on the inner surface of the circuit board 1600. A sealing member may be disposed between the circuit board 1600 and the cover 1100 so as to achieve a seal therebetween.

The circuit board 1600 may include the inner surface and the outer surface disposed opposite the inner surface. A portion of the outer surface of the circuit board 1600 may be disposed on the side plate 1120 of the cover 1100. A portion of the outer surface of the circuit board 1600 may be in contact with the side plate 1120 of the cover 1100, and the remaining portion of the outer surface of the circuit board 1600 may be spaced apart from the side plate 1120 of the cover 1100, without contacting the side plate 1120 of the cover 1100.

The outer surface of the circuit board 1600 may include a first region, disposed on the side plate 1120 of the cover 1100, and a second region, corresponding to the groove 112 in the side plate 1120 of the cover 1100. At least a portion of the second region may overlap the terminal 1610 of the circuit board 1600 in a direction perpendicular to the optical axis.

The outer surface of the circuit board 1600 may include a first region disposed on the side plate 1120 of the cover 1100, a second region, which is disposed under the side plate 1120 of the cover 1100 so as to be spaced apart from the side plate 1120 of the cover 1100, and a third region corresponding to a region opposite the terminal 1610. Here, at least a portion of the third region may overlap the second region. In other words, at least a portion of the third region may be disposed under the side plate 1120 of the cover 1100 so as to be spaced apart from the side plate 1120 of the cover 1100. The description of the circuit board 1100 may be applied to the circuit board 190 shown in FIGS. 9B and 9C, with or without modification.

The circuit board 1600 may include the terminal 1610. The terminal 1610 may be formed on the inner surface of the circuit board 1600. The terminal 1610 may be connected to the terminal portion 1424 of the lower elastic member 1420 through soldering. The terminal 1610 may include a first terminal 1611 and a second terminal 1612, which are spaced apart from each other. The terminal 1610 may include two terminals, which are respectively connected to two of eight third terminals 1620 coupled to the terminals of the driver IC 1700. Furthermore, the two terminals of the terminal 1610 may be respectively connected to two of six fourth terminals 1630 coupled to the printed circuit board. In this embodiment, the terminal 1610 may be connected to all of the third terminals 1620 and the fourth terminals 1630.

The circuit board 1600 may include the third terminal 1620. The third terminal 1620 may include a pad portion. The third terminal 1620 may be formed on the inner surface of the circuit board 1600. The third terminal 1620 may be coupled to the terminals of the driver IC 1600. The third terminal 1620 may include a plurality of terminals. The third terminal 1620 may include eight terminals. Among the eight terminals, two terminals VDD and GND may be used for power, two other terminals SDA and SCL may be used for communication, two other terminals may be conductively connected to two ends (+ and −) of the coil 1320, and the remaining two terminals may be used for synchronization of the driver IC 1700 or analog output of the hall sensor. In a modification, the third terminal 1620 of the circuit board 1600 may include six terminals, excluding the two terminals for synchronization of the driver IC 1700 or analog output of the hall sensor. The plurality of terminals of the third terminal 1620 may be a plurality of pads.

The third terminal 1620 may include a first of third terminal to an eighth of third terminal 1621 to 1628. The first of third terminal 1621 may be used for VDD. The second of third terminal 1622 may be used for SDA. The third of third terminal 1623 may be used for SCL. The fourth of third terminal 1624 may be used for GND. The fifth of third terminal 1625 may be used as a (−) output terminal. The sixth of third terminal 1626 may be used as a (+) output terminal. The seventh of third terminal 1627 may be used as a test terminal. The eighth of third terminal 1628 may be used as a port terminal. The fifth of third terminal 1625 and the sixth of third terminal 1626 may be conductively connected to the coil 1320 so as to supply current to the coil 1320. The seventh of third terminal 1627 and the eighth of third terminal 1628 may be used for synchronization or measurement in a dual module. Here, the SDA and the SCL may be a Data and a Clock for I2C communication. The VDD and the GND may be power for driving the driver IC 1700.

The description of the driver IC 1700, the third terminal 1620 and the first of third to the eighth of third terminals 1621 to 1628 may be applied to another embodiment of the circuit board 190 and the position sensor 170 shown in FIG. 13A.

The pad portion may include a plurality of pads. A photo solder resist 1900 disposed on the inner surface of the circuit board 1600 may include a portion disposed between the plurality of pads. Specifically, the pad portion may not be entirely open, but individual ones among the plurality of pads may be separately open through the photo solder resist 1900.

The circuit board 1600 may include the fourth terminal 1630. The fourth terminal 1630 may be disposed on the lower end of the outer surface of the circuit board 1600. The fourth terminal 1630 may include a plurality of terminals. The fourth terminal 1630 may include six terminals. Four terminals among the six terminals may be connected to the third terminal 1620. The remaining two terminals among the six terminals may be connected to the terminal 1610. In other words, the remaining two terminal may be directly connected to the coil 1320 via the terminal 1610 and the lower elastic member 1420. In this embodiment, additional terminals connected to the coil 1320 may be exposed to the outside so as to determine drive characteristics in closed-loop autofocus (CLAF) and open-loop autofocus (OLAF). Among a total of six terminals of the fourth terminal 1630, two terminals VDD and GND may be used for power, two other terminals SDA and SCL may be used for communication, and the remaining two terminals may be conductively connected to two ends (+ and −) of the coil 1320.

The fourth terminal 1630 may include first of fourth to sixth of fourth terminals 1631 to 1636. The first of fourth terminal 1631 may be used for VDD. The second of fourth terminal 1632 may be used for SDA. The third of fourth terminal 1633 may be used for SCL. The fourth of fourth terminal 1634 may be used for GND. The fifth of fourth terminal 1635 may be used as a (−) output terminal. The sixth of fourth terminal 1636 may be used as a (+) output terminal. The first of fourth terminal 1631 may be connected to the first of third terminal 1621, and the second of fourth terminal 1632 may be connected to the second of third terminal 1622. The third of fourth terminal 1633 may be connected to the third of third terminal 1623, and the fourth of fourth terminal 1634 may be connected to the fourth of third terminal 1624. The fifth of fourth terminal 1635 may be connected to the fifth of third terminal 1625, and the sixth of fourth terminal 1636 may be connected to the sixth of third terminal 1626.

The description of the fourth terminal 1630 of the circuit board may be applied to another embodiment of the outer terminals B1 to B6 of the circuit board 190.

The circuit board 1600 may include a fifth terminal 1640. The fifth terminal 1640 may be connected to the terminal of the capacitor 1750. The fifth terminal 1640 may be disposed on the inner surface of the circuit board 1600 so as to be spaced apart from the terminal 1610 and the third terminal 1620.

Another embodiment of the circuit board 190 shown in FIG. 8A may include an additional terminal corresponding to the fifth terminal 1640 of the circuit board 1600, and the additional terminal may be connected to the capacitor 195.

In this embodiment, the coil 1320 may include a first end connected to the first lower elastic unit 1420*a* and a second end connected to the second lower elastic unit 1420*b*. The terminal portion 1424 of the lower elastic member 1420 may include a first terminal formed at the first lower elastic unit 1420*a* and a second terminal formed at the second lower elastic unit 1420*b*. The terminal 1610 of the circuit board 1600 may include the first terminal 1611 connected to the first terminal of the first lower elastic unit 1420*a* and the second terminal 1612 connected to the second terminal of the second lower elastic unit 1420*b*.

The lens moving apparatus may include the driver IC 1700. The driver IC 1700 may be disposed on the inner surface of the circuit board 1600. The driver IC 1700 may be coupled to the inner surface of the circuit board 1600 through soldering. The driver IC 1700 may be coupled to the third terminal 1620 of the circuit board 1600 through surface-mounting technology (SMT). The driver IC 1700 may be a single module in which a Hall sensor and a driver IC are integrally formed. Furthermore, the driver IC 1700 may be described as having a hall element mounted therein. The driver IC 1700 may be provided therein with a hall element, an EEPROM (Electrically Erasable Programmable Read-Only Memory), a temperature sensor and the like. Furthermore, the driver IC 1700 may include the Hall sensor. Alternatively, the Hall sensor may be described as having a driver function.

The driver IC 1700 may include a plurality of terminals. The driver IC 1700 may include a total of eight terminals. Among the eight terminals of the driver IC 1700, two terminals VDD and GND may be used for power, and two other terminals SDA and SCL may be used for communication. Two other terminals may be conductively connected to the two ends (+ and −) of the coil 1320, and the remaining two terminals may be used for synchronization or analog output of the hall.

The driver IC 1700 may include a hall element or a Hall sensor. The hall element or the Hall sensor may serve as a sensor for detecting magnetic force. The Hall sensor may be disposed so as to face the second magnet 1810. The Hall sensor may detect the magnetic force of the second magnet 1810. The Hall sensor may detect the position of the second magnet 1810 and the bobbin 1310 at which the second magnet 1810 is disposed. The driver IC 1700 may perform AF feedback control using the position of the bobbin 1310 detected by the Hall sensor.

The driver IC 1700 may be conductively connected to the coil 1320. The driver IC 1700 may apply current to the coil 1320. The driver IC 1700 may control the direction and the amount of current applied to the coil 1320. The embodiment may be designed such that the (+) coil terminal and the (−) coil terminal of the driver IC 1700 may be connected to the coil 1320, and may also be conductively connected to the external printed circuit board.

The lens moving apparatus may include the capacitor 1750. The capacitor 1750 may be disposed on the inner surface of the circuit board 1600. The capacitor 1750 may be provided for normal operation of the driver IC 1700. The capacitor 1750 may be used to eliminate noise that may be generated by the driver IC 1700. The capacitor 1750 may be disposed on a corner of the housing 1210. Specifically, the capacitor 1750 may be disposed on a corner of the housing 1210 that has a thickness sufficient to accommodate the thickness of the capacitor 1750.

The lens moving apparatus may include the second magnet 1810. The second magnet 1810 may be a 'sensing magnet'. The second magnet 1810 may be disposed on the bobbin 1310. The second magnet 1810 may be disposed so as to face the Hall sensor. The second magnet 1810 may be detected by the Hall sensor. The second magnet 1810 may be disposed on the side surface of the bobbin 1310. The second magnet 1810 may be disposed inside the coil 1320. The second magnet 1810 may overlap the coil 1320 in a direction perpendicular to the optical axis.

The lens moving apparatus may include the third magnet 1820. The third magnet 1820 may be a 'compensation magnet'. The third magnet 1820 may be disposed on the bobbin 1310. The third magnet 1820 may be disposed so as to establish equilibrium of magnetic force with the second magnet 1810. The third magnet 1820 may be disposed symmetrically with the second magnet 1810 with respect to the optical axis. The third magnet 1820 may be disposed on a position corresponding to the second magnet 1810 with respect to the optical axis. The third magnet 1820 may have a size and/or a shape corresponding to the second magnet 1810 with respect to the optical axis. The second magnet 1810 may be disposed on one side of the bobbin 1310, and the third magnet 1820 may be disposed on the opposite side of the bobbin 1310. The third magnet 1820 may be disposed on the side surface of the bobbin 1310. The third magnet 1820 may be disposed inside the coil 1320. The third magnet 1820 may overlap the coil 1320 in a direction perpendicular to the optical axis.

The lens moving apparatus may include the photo solder resist 1900. The photo solder resist 1900 may be disposed in the remaining area of the inner surface of the circuit board 1600, excluding the terminal 1610 and the third terminal 1620. When a coverlay is applied based on the size of a BGA (Ball Grid Array) in a comparative example, due to the coverlay error of +/−0.15 mm and the bias error of coverlay, the pattern of the central portion is likely to be open and thus to be oxidized. In contrast, since this embodiment decreases the error to 70 μm by application of PSR, there is an advantage in that it is possible to form the pattern of the central portion. Because the open area must be enlarged due to the error during the coverlay formation and thus the open area relative to BGA size is increased, there may be a phenomenon in which the coverlay is displaced or pushed toward one side. However, when PSR is applied, the error is decreased, thereby suppressing the above phenomenon.

Because the error is minimized by the photo solder resist 1900 in the embodiment, it is possible for the eight terminals of the third terminal 1620 to be respectively open. This is distinguished from a structure in which the eight terminals of the third terminal 1620 are entirely open.

According to the embodiment, the outer surface of the circuit board 1600 may be subjected to PSR (Photo Solder Resist) and coverlay treatments or coverlay and PSR treatments. Here, the coverlay may be made of polyimide tape. The polyimide tape may have a yellow color, and the photo solder resist may have a green color.

The circuit board 190 may include a photo solder resist corresponding to the photo solder resist 1900 shown in FIG. 15, and the description of the photo solder resist 1900 may be applied to the circuit board 190, with or without modification.

The lens moving apparatus according to the embodiment may be applied to various fields, for example, those of camera modules or optical devices.

For example, the lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 27:
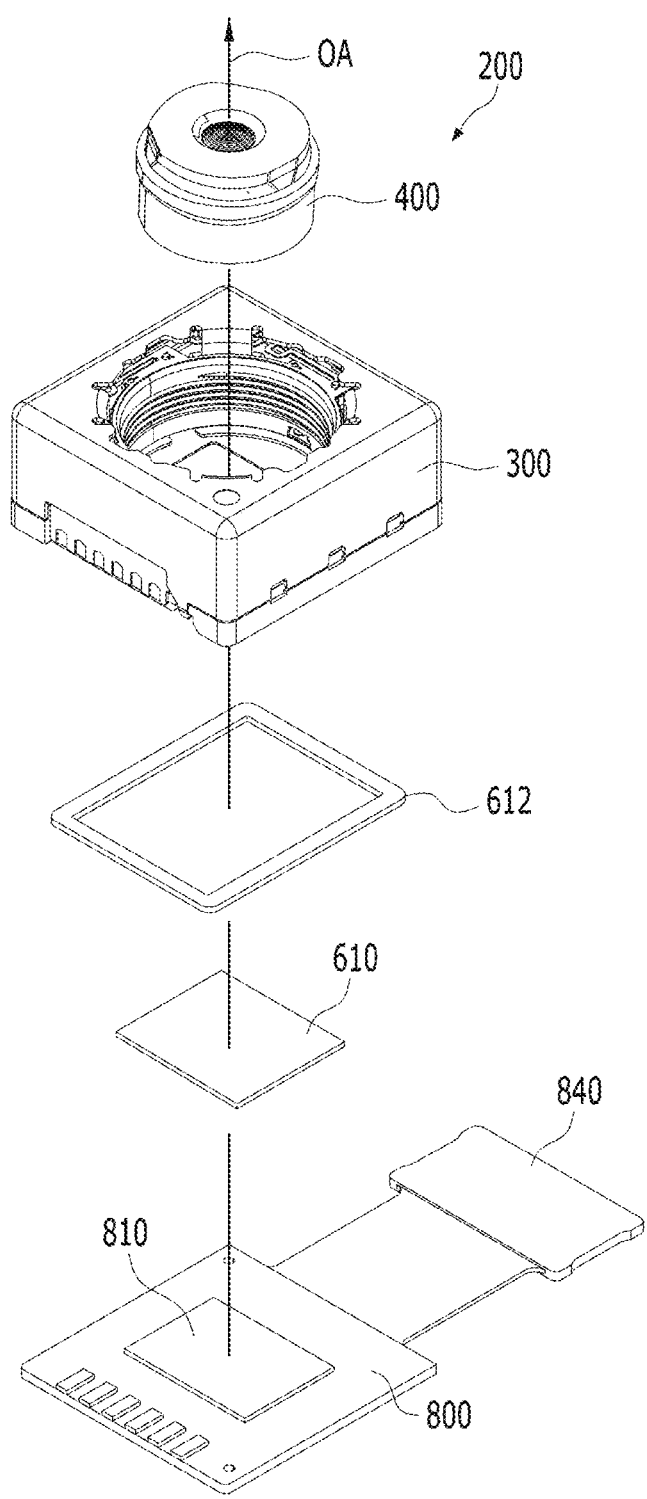
FIG. 27 is an exploded perspective view illustrating a camera module according to an embodiment.

FIG. 27 is an exploded perspective view illustrating a camera module 200 according to an embodiment.

Referring to FIG. 27, the camera module 200 may include a lens or a lens module 400, the lens moving apparatus 100, an adhesive member 612, a filter 610, a circuit board 800, an image sensor 810, and a connector 840.

The lens module 400 may include a lens and/or a lens barrel, and may be mounted in the bobbin 110 of the lens moving apparatus 100.

For example, the lens module 400 may include one or more lenses and a lens barrel configured to accommodate the lenses. However, one component of the lens module is not limited to the lens barrel, and any component may be used, as long as it has a holder structure capable of supporting one or more lenses. The lens module may be coupled to the lens moving apparatus 100 and may be moved therewith.

For example, the lens module 400 may be coupled to the lens moving apparatus 100 through threaded engagement. For example, the lens module 400 may be coupled to the lens moving apparatus 100 by means of an adhesive (not shown). The light that has passed through the lens module 400 may be radiated to the image sensor 810 through the filter 610.

The adhesive member 612 may couple or attach the base 210 of the lens moving apparatus 100 to the circuit board 800. The adhesive member 612 may be, for example, epoxy, thermohardening adhesive, or ultraviolet hardening adhesive.

The filter 610 may serve to inhibit light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

Here, the infrared-light-blocking filter may be made of a film material or a glass material. For example, the infrared-light-blocking filter may be manufactured by applying an infrared-light-blocking coating material to a plate-shaped optical filter such as a cover glass for protecting an imaging area.

The filter 610 may be disposed below the base 210 of the lens moving apparatus 100.

For example, the base 210 may be provided on the lower surface thereof with a mounting portion on which the filter 610 is mounted. In another embodiment, an additional sensor base, on which the filter 610 is mounted, may be provided.

The circuit board 800 may be disposed below the lens moving apparatus 100, and the image sensor 810 may be mounted on the circuit board 800. The image sensor 810 may receive an image included in the light introduced through the lens moving apparatus 100, 1000, and may convert the received image into an electrical signal.

The image sensor 810 may be positioned such that the optical axis thereof is aligned with the optical axis of the lens module 400. Accordingly, the image sensor may obtain the light that has passed through the lens module 400. The image sensor 810 may output the radiated light as an image. The image sensor 810 may be, for example, a CCD (charge coupled device), MOS (metal oxide semi-conductor), CPD or CID. However, the kind of the image sensor is not limited thereto.

The filter 610 and the image sensor 810 may be disposed so as to be spaced apart from each other in the state of facing each other in the first direction.

The connector 840 may be conductively connected to the circuit board 800, and may have a port that is intended to be conductively connected to an external device.

Figure 28:
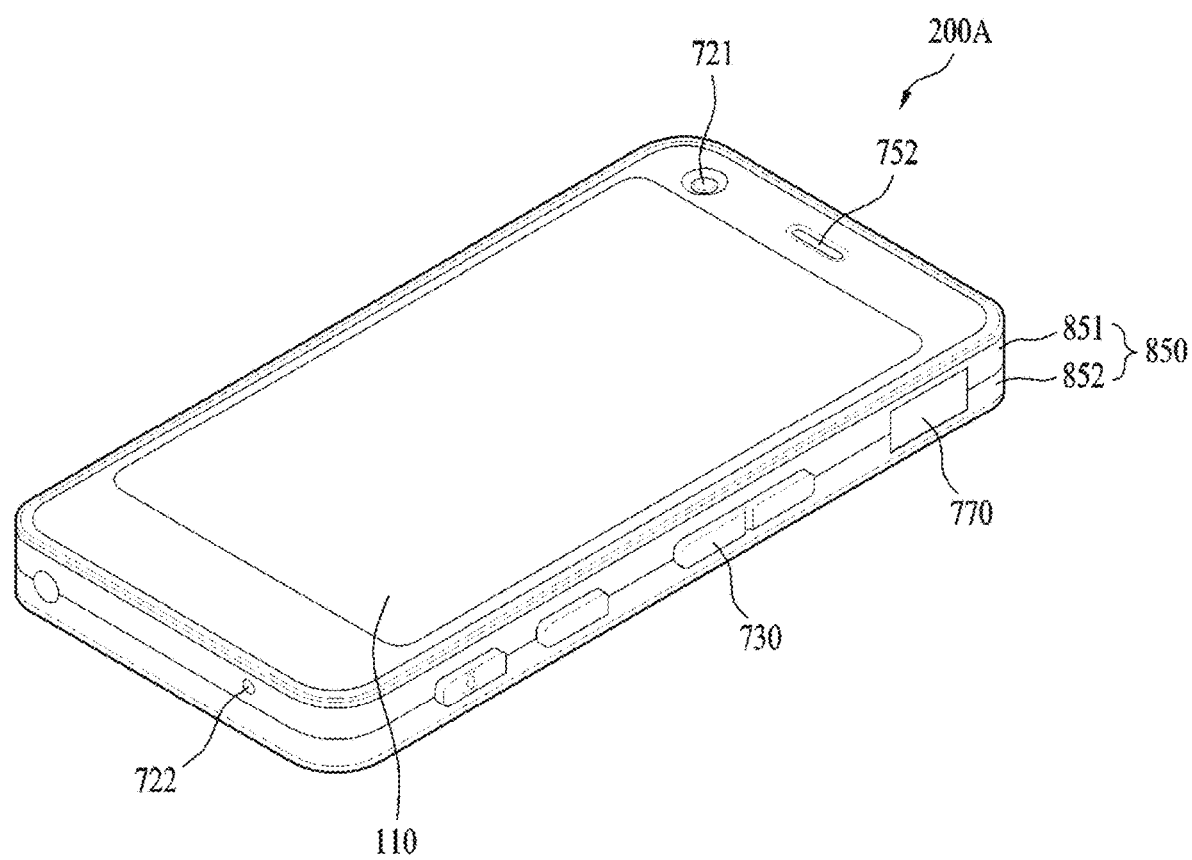
FIG. 28 is a perspective view of a portable terminal according to an embodiment.
Figure 29:
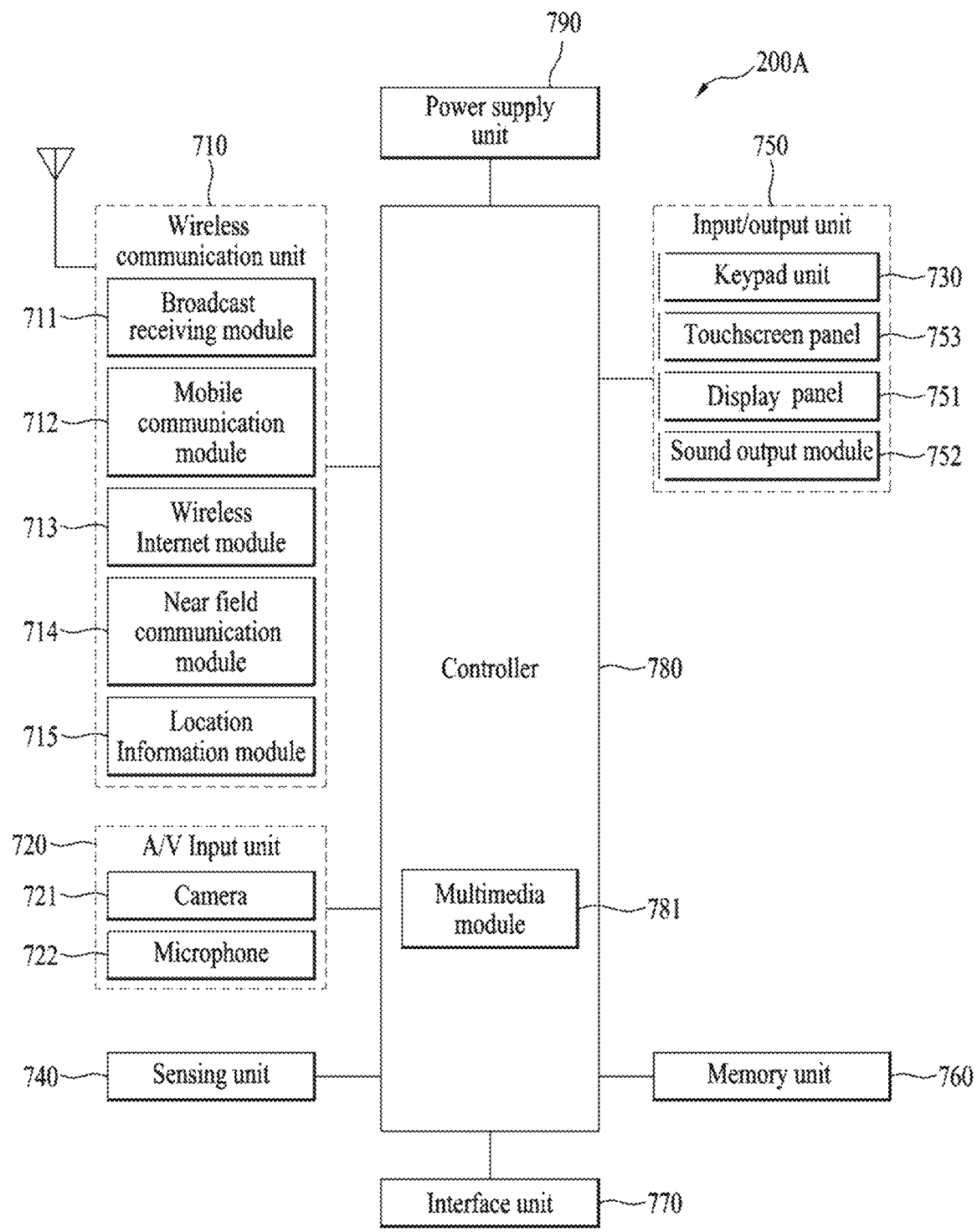
FIG. 29 is a view illustrating the configuration of the portable terminal illustrated in FIG. 28.

FIG. 28 is a perspective view illustrating a portable terminal 200A according to an embodiment. FIG. 29 is a view illustrating the configuration of the portable terminal 200A illustrated in FIG. 27.

Referring to FIGS. 28 and 29, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 28 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (e.g. a casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 200 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780, or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus and a camera module and to an optical device each including the same, which are capable of allowing a large-diameter lens to be mounted therein without increasing the size thereof, of realizing stable power supply to a position sensor, and of reliably eliminating noise from the output of the position sensor.

The invention claimed is:

1. A lens moving apparatus comprising:
   a cover member;
   a housing disposed in the cover member;
   a bobbin disposed in the housing;
   a coil disposed in the cover member;
   a first magnet disposed in the cover member and configured to move the bobbin in an optical axis direction by an interaction with the coil;
   a circuit board disposed on a side portion of the housing;
   a position sensor disposed on the circuit board and conductively connected to the circuit board; and
   a first capacitor disposed on the circuit board and conductively connected to the circuit board,
   wherein the position sensor comprises first and second terminals through which a power signal is supplied, and
   wherein the first capacitor is conductively connected in parallel to the first and second terminals of the position sensor.

2. The lens moving apparatus according to claim 1, wherein the housing comprises a first seating portion, which is formed in the side portion of the housing and in which the position sensor is disposed.

3. The lens moving apparatus according to claim 1,
   wherein the circuit board comprises first and second terminals, through which a power signal is supplied to the position sensor; a third terminal, through which a data signal is supplied to the position sensor; and a fourth terminal, through which a clock signal is supplied to the position sensor, and
   wherein the first terminal of the position sensor is conductively connected to the first terminal of the circuit board, and the second terminal of the position sensor is conductively connected to the second terminal of the circuit board.

4. The lens moving apparatus according to claim 3, wherein the first capacitor is connected in parallel to the first and second terminals of the circuit board.

5. The lens moving apparatus according to claim 3, wherein the position sensor comprises:
   a Hall sensor for detecting a displacement of the bobbin in the optical axis direction;
   an amplifier configured to amplify an output signal output by the Hall sensor; and
   an output terminal conductively connected to an output terminal of the amplifier.

6. The lens moving apparatus according to claim 3, wherein the circuit board comprises fifth and sixth terminals to which a drive signal for driving the coil is supplied from the position sensor.

7. The lens moving apparatus according to claim 1, wherein the position sensor is disposed on a first surface of the circuit board facing the side portion of the housing.

8. The lens moving apparatus according to claim 7, wherein the first capacitor is disposed on the first surface of the circuit board.

9. The lens moving apparatus according to claim 8, wherein the circuit board comprises a plurality of terminals disposed on a second surface thereof that is opposite to the first surface thereof.

10. The lens moving apparatus according to claim 1, comprising:
    a second magnet disposed on the bobbin so as to face the position sensor; and a balancing magnet disposed on the bobbin so as to be opposite to the second magnet.

11. A lens moving apparatus comprising:
a cover member comprising an upper plate and a side plate;
a bobbin disposed in the cover member;
a first magnet disposed between the bobbin and the side plate of the cover member;
a coil disposed to be opposite to the first magnet and configured to move the bobbin in an optical axis direction by an interaction with the first magnet;
a circuit board disposed between the bobbin and the side plate of the cover member and comprising first and second terminals;
a position sensor disposed on the circuit board and conductively connected to the circuit board and configured to detect a displacement of the bobbin in the optical axis direction; and
a first capacitor disposed on the circuit board and conductively connected in parallel to the first and second terminals of the circuit board,
wherein a power signal is supplied to the position sensor through the first and second terminals of the circuit board.

12. A camera module comprising:
a lens;
the lens moving apparatus according to claim 1; and
an image sensor.

13. The lens moving apparatus according to claim 3, wherein the position sensor is positioned higher than the first to fourth terminals of the circuit board.

14. The lens moving apparatus according to claim 6, wherein the position sensor comprises a Hall sensor and a driver,
wherein the position sensor comprises third to sixth terminals, and
wherein each of the third to sixth terminals of the position sensor is conductively connected to a corresponding one of the third to sixth terminals of the circuit board.

15. The lens moving apparatus according to claim 6, wherein the coil is conductively connected to the fifth and sixth terminals of the circuit board.

16. The lens moving apparatus according to claim 6, wherein the first capacitor is positioned higher than the first to fourth terminals of the circuit board.

17. The lens moving apparatus according to claim 11, wherein the circuit board comprises:
a third terminal through which a data signal is supplied to the position sensor;
a fourth terminal, through which a clock signal is supplied to the position sensor; and
fifth and sixth terminals to which a drive signal for driving the coil is supplied from the position sensor.

18. The lens moving apparatus according to claim 17, wherein the position sensor comprises third to fourth terminals, and
wherein each of the first to sixth terminals of the position sensor is conductively connected to a corresponding one of the first to sixth terminals of the circuit board.

19. The lens moving apparatus according to claim 11, wherein the position sensor comprises a Hall sensor and a driver.

20. The lens moving apparatus according to claim 17, wherein the position sensor and the first capacitor are positioned higher than the first to fourth terminals of the circuit board.

* * * * *